(12) United States Patent
Buschmann

(10) Patent No.: US 8,684,187 B2
(45) Date of Patent: Apr. 1, 2014

(54) SEMIPERMEABLE POLYMERS AND METHOD FOR PRODUCING SAME

(75) Inventor: Wayne E. Buschmann, Boulder, CO (US)

(73) Assignee: Eltron Research & Development, Inc., Boulder, CO (US)

(*) Notice: Subject to any disclaimer, the term of this patent is extended or adjusted under 35 U.S.C. 154(b) by 0 days.

(21) Appl. No.: 13/412,538

(22) Filed: Mar. 5, 2012

(65) Prior Publication Data

US 2012/0255898 A1 Oct. 11, 2012

Related U.S. Application Data

(63) Continuation of application No. 12/170,036, filed on Jul. 9, 2008, now Pat. No. 8,147,735.

(51) Int. Cl.
*B01D 39/00* (2006.01)
*B01D 29/00* (2006.01)
*B01D 39/14* (2006.01)
*B05D 5/00* (2006.01)

(52) U.S. Cl.
USPC ............. 210/500.38; 210/490; 210/500.37; 264/490; 427/244

(58) Field of Classification Search
USPC ............. 210/490, 500.38, 500.39, 500.37, 210/500.27; 427/244–245; 264/48, 49; 428/420
See application file for complete search history.

(56) References Cited

U.S. PATENT DOCUMENTS

| | | | | |
|---|---|---|---|---|
| 4,277,344 A * | 7/1981 | Cadotte | | 210/654 |
| 4,520,044 A * | 5/1985 | Sundet | | 427/244 |
| 4,744,039 A * | 5/1988 | Suzuki et al. | | 700/251 |
| 4,772,394 A * | 9/1988 | Swedo et al. | | 210/500.38 |
| 4,857,363 A * | 8/1989 | Sasaki et al. | | 427/245 |
| 4,983,291 A * | 1/1991 | Chau et al. | | 210/490 |
| 5,336,409 A * | 8/1994 | Hachisuka et al. | | 210/490 |
| 5,693,227 A * | 12/1997 | Costa | | 210/650 |
| 6,162,358 A * | 12/2000 | Li et al. | | 210/500.38 |
| 6,833,073 B2 * | 12/2004 | Agarwal | | 210/500.38 |
| 6,878,278 B2 * | 4/2005 | Mickols | | 210/500.38 |
| 6,913,694 B2 * | 7/2005 | Koo et al. | | 210/500.38 |
| 7,081,202 B2 * | 7/2006 | Ohara et al. | | 210/500.38 |
| 7,727,434 B2 * | 6/2010 | Kniajanski et al. | | 264/48 |
| 8,029,857 B2 * | 10/2011 | Hoek et al. | | 427/245 |
| 8,145,735 B2 * | 3/2012 | Manchester et al. | | 709/220 |
| 8,147,735 B2 * | 4/2012 | Buschmann | | 264/48 |

FOREIGN PATENT DOCUMENTS

EP    1283068    *  2/2003

* cited by examiner

*Primary Examiner* — Ana Fortuna
(74) *Attorney, Agent, or Firm* — Conley Rose, P.C.

(57) ABSTRACT

A polyamide membrane including reaction product of an anhydrous solution comprising an anhydrous solvent, at least one polyfunctional secondary amine and a pre-polymer deposition catalyst, and an anhydrous, organic solvent solution comprising a polyfunctional aromatic amine-reactive reactant having one ring. A composite semipermeable membrane including the polyamide membrane on a porous support.

29 Claims, 37 Drawing Sheets

X = Cl, Br, I
R = OCH₃, CH₃, H, F, CN

1:2.75 THF/Hexane, 89.8% MgSO$_4$ overall rejection, 37.0 mL/min permeate flow.

1:3 THF/Hexane, 88.8% MgSO$_4$ overall rejection, 16.5 mL/min permeate flow.

1:3.25 THF/Hexane, 77.4% MgSO$_4$ overall rejection, 40.0 mL/min permeate flow.

1:4 THF/Hexane, 59.6% MgSO$_4$ overall rejection, 22.0 mL/min permeate flow.

1:5.25 THF/Hexane, 73.8% MgSO$_4$ overall rejection, 37.0 mL/min permeate flow.

SEMIPERMEABLE POLYMERS AND METHOD FOR PRODUCING SAME

CROSS-REFERENCE TO RELATED APPLICATIONS

This application is a continuation of application Ser. No. 12/170,036, filed on Jul. 9, 2008 now U.S. Pat. No. 8,147,735.

STATEMENT REGARDING FEDERALLY SPONSORED RESEARCH OR DEVELOPMENT

This invention was made with government support under U.S. Army SBIR contract numbers DAAD19-02-0029 and DAAD19-03-C-0041; and Department of Energy SBIR contract numbers DE-FG02-05ER84228 and DE-FG02-05ER84230. The United States government has certain rights in the invention.

BACKGROUND

1. Technical Field

The present invention generally relates to semipermeable polymer membranes and methods for making same. The invention pertains still more particularly to semipermeable polyamide membranes having enhanced stability in the presence of strong oxidizers, such as chlorine, hydrogen peroxide, and concentrated and reactive metals and metallic particles; high water flux; enhanced thermal stability; and extended shelf life.

2. Background of the Invention

Reverse osmosis (hereinafter RO) utilizes a semipermeable membrane to separate water from particulate matter, colloids, dissolved salts, organics and other materials in solution or suspension. This is accomplished by feeding pressurized impure carrier water to one side of the RO membrane that allows only water molecules to pass. RO and NF are closely related selective membrane separation processes based on differences in solute-solvent permeabilities (solution-diffusion transport mechanisms) through a dense semipermeable barrier. The semipermeable barrier is typically a very thin polymer film deposited onto a microporous substrate, such as an ultrafiltration membrane, for mechanical support as illustrated. This composite architecture is the basis for the majority of commercial RO and NF membranes employed for water purification, which are produced as flat sheets for spiral wound filter modules.

Osmosis occurs when a semipermeable membrane is placed between two compartments, one containing pure solvent (water) and the other containing a solute solution (brine) with the solvent passing through the membrane to the solute-solution side. Transport occurs due to the chemical potential driving force that is caused by the presence of the solute. The exact pressure that must be applied to the solute-solution side to stop solvent flux is called the osmotic pressure. In RO, a hydrostatic pressure greater than the osmotic pressure is applied to the solute solution to reverse the osmotic flow and drive solvent back to the pure solvent side. For seawater this is near 848 ft of $H_2O$ (368 psi, 25.4 bar). In RO processes, high pressures are required to drive the solvent (water) through the membrane at an acceptably high flux rate to provide good selectivity. The water flux is proportional to applied pressure whereas the salt flux is independent of pressure.

The ability of RO filtration to produce potable water from seawater and brackish waters for a modest price is unequaled. RO treatment costs, however, remain approximately 100-1000 times higher than conventional municipal water and waste-water treatment plants. The quality of the product water in the RO process is highly dependent on the type of membrane used. RO membranes can be grouped into three main categories:

(1) Seawater membranes (3-5 wt % salt solutions operating at 800-1000 psi)
(2) Brackish water membranes (2000-10000 ppm salt solutions operating at 200400 psi)
(3) Low-pressure nanofiltration membranes (200-500 ppm salt solutions operating at 100-150 psi)

Similar membrane materials can be used in each category by tailoring the membrane preparation procedure and system design. RO membranes generally reject ions and small molecules greater than 2-15 angstroms in size with 99+% selectivity, however, high pressures are required depending on the application. NF membranes generally reject larger ions and small molecules greater than 10-50 angstroms in size and have much greater water permeabilities allowing for lower pressure operation and higher permeate flux. Salt rejections are typically tailored by attaching anionically or cationically charged groups (such as carboxylic acids or amines) onto the polymer backbone. The charged NF membrane creates Donnan exclusion effects resulting in high rejection (95-99+%) of divalent anions or cations, respectively, while monovalent ions are only modestly rejected (20-80%).

Semipermeable membranes used primarily in reverse osmosis (RO) and nanofiltration (NF) separations applications comprise a polymeric thin film (0.3-3 microns) semipermeable barrier layer (provides salt rejection) deposited onto a relatively thick (>50 microns) microporous substrate (provides mechanical support). This creates a thin film composite membrane architecture. The semipermeable thin film barrier layer is typically either cellulose based or polyamide based depending on the application. Polyamide based membranes have very good salt rejections (>99.5% typical for RO), are tolerant to degradation by microbes and extreme pH levels and can withstand exposure to strong solvents, but have low tolerance to strong oxidizers. Cellulose based membranes have good salt rejections (97-99% typical for RO), and better tolerance to oxidizers but are readily metabolized by microbes, or dissolved by strong organic solvents. Therefore polyamide based RO and NF membranes are typically required for separations applications in which the best salt rejections are required, the feed stream is biologically active, or extreme pH levels or organic solvents may be encountered.

As the demand rises for purifying contaminated surface water sources for consumption, reclamation and recycling of wastewater, and desalinating brackish and salt water sources, improvements in membrane performance is needed.

The most significant issues to address for reducing the cost of desalination and membrane filtration processes are to: increase membrane tolerance to chlorine and other strong oxidizers; prevent membrane fouling due to suspended particulates, mineral scaling, and biological growth; increase water permeability for higher production and recovery rates; and increase mechanical stability of composite membrane.

Currently, polyamide RO membranes require free chlorine levels to be less than 0.1 mg/L (ppm) in concentration for continuous contact without degrading the performance of the membrane. This is typically near 1000 ppm·h to 2000 ppm·h worth of total chlorine exposure tolerated by a membrane before a decline in salt rejection will occur (exposure to 1 ppm $Cl_2$, for 1 hour is 1 ppm-h; ppm=mg/L). Increasing the oxidative stability of RO and NF membranes so that they can tolerate continuous contact with chlorine and other strong oxidizers will result in substantial savings by reducing filter element replacement frequency, feed water pre-treatment, and increasing membrane lifetime. Increasing membrane chlorine tolerance will allow more frequent cleaning/disinfection treatments to mitigate biofouling without degradation. However, efforts over the past three decades have been unable to make significant improvements on chlorine tolerance for high rejection membranes while thermal disinfection of RO membranes is rarely an option due to modest thermal stability.

For example, the Army's ROWPUs are designed to treat any water source encountered in the world at production rates of 200 to 3000 gallons per hour, therefore RO membranes used in these systems need to be effective under a wide variety of feedwater conditions. ROWPUs incorporate commercially available polyamide spiral wound RO filter elements for removal of contaminants from water. Disinfection standards for ROWPU-purified water require a 2.0 ppm (ppm=mg/L) free available chlorine (FAC) residual after a 30 minute contact time. This level of chlorine is typically added after the filtration process to avoid excessive RO membrane damage due to chlorine degradation that results in frequent element replacement. However, the addition of chlorine as a disinfectant prior to the filtration process will prevent biofouling of the RO membrane, presently one of the most challenging and costly issues in RO element longevity. Commercially available composite membranes can tolerate very little chlorine in feed water for extended periods of time (<0.1 ppm).

Desalination membranes must be used with feed-water halogen ($Cl_2$, $Br_2$) levels at less than <0.1 ppm, thus requiring extensive water pre-treatment including pre-filtering and charcoal bed clarification to remove oxidizers such as halogens. For seawater desalination the feedwater pre-treatment costs and membrane replacement represent up to ~60% of the total desalination costs, around $1-$5/1000 gallons. Energy consumption for pumping, amortization and retentate treatment constitute most of the balance in cost.

Filter membrane fouling occurs when suspended solids collect, dissolved solids precipitate, or microbes attach and grow on a membrane surface leading to a decline in membrane performance. These foulants can be cleaned from RO and NF membranes by the use of flushing solutions containing cleansers and disinfectants. For example, acidic, caustic, and enzymatic cleansers often containing surfactants will remove various types of deposited organic solids or mineral scale while microbial growth can be eliminated by disinfectants such as chlorine or hydrogen peroxide.

Another problematic issue for thin film composite membranes used for RO and NF applications is delamination of the polyamide film from the porous substrate. Intermittent filter use that results in membrane pressurization/depressurization cycles as well as back-flushing promotes delamination causing filter failure. Large desalination plants are run continuously to extend membrane lifetime to 2-3 years. A standard 8 in. diameter by 40 in. long spiral-wound RO filter element costs about $790 each, or ~$3/ft$^2$, equating to $750,000 in membranes for a 6 million gallon per day desalination plant. In contrast, the Army's reverse osmosis water purification units (ROWPUs) have an average membrane lifetime of about 400 h, or about $9500 in RO membrane replacement every 1.2 million gallons of water produced for a 3000 gph ROWPU. Any increase in filter longevity or output will improve cost-effectiveness for filtration processes.

Typically, wetting agents are used to facilitate penetration of the thin film barrier layer into the pores of the substrate. The penetration of the polyamide film into the pores mechanically anchors the thin film in place. This mechanical anchoring, however, can weaken and fail after a filter membrane has compressed and compacted during use. It has also been found, however, that the use of wetting agents such as surfactants often results in reduced performance of the polyamide membrane. Increasing the bonding strength between the microporous substrate and the thin film barrier layer will provide longer filter element lifetimes, especially for systems used intermittently. Mechanical failure or delamination of membrane layers is another source of RO element attrition resulting from intermittent system operation. Typically, membrane replacement accounts for some 18% of desalination water treatment costs for large filter plants and can run as much as 30% for smaller units such as ROWPUs.

Polyamide-based semipermeable filter membranes are typically preferred over cellulose-based semipermeable filter membranes (cellulose acetate, cellulose acetate/nitrate blends) due to greater microbial stability and typically greater salt rejection performance. Cellulose-based membranes are susceptible to being metabolized and broken down by microbial growth. Polyamide membranes are generally fairly resistant to biological attack that leads to biofouling. They can be periodically cleaned by shock disinfection with chlorine, hydrogen peroxide or peracetic acid to minimize biofouling as well. Currently, polyamide-based membranes have very limited tolerance to chlorine (1000-2000 ppm·h) and this is the most significant drawback to general use.

The development of an all-aromatic crosslinked polyamide by Cadotte and FILMTEC has led to one of the most widely produced interfacial composite membrane types known as SW-30 that is useful in seawater and brackish water purification and is FDA-approved for food processing. The Dow Liquid Separations business manufactures the FILMTEC membranes. Spiral wound RO filter elements produced with these membranes have salt rejections of >99%. This polyamide RO membrane is based on the composition of meta-phenylenediamine (also known as 1,3-diaminobenzene; hereinafter MPD) crosslinked with trimesoyl acid chloride (also known as 1,3,5-tribenzoyltrichloride; hereinafter TAC). This polymer suffers from degradative chlorine sensitivity due to the presence of secondary amide linkages as well as aromatic ring positions that are activated toward chlorine attack by the amine/amide groups. Each of these sites susceptible to chemical attack by chlorine and other strong oxidizers leads to degradative amide bond cleavage or alteration of the aromatic ring polymer backbone structure.

Nearly all polyamide-based semipermeable filter membranes are based on the conventional polymer produced by reacting TAC with MPD and/or piperazine. Films composed of this polymer are deposited onto a microporous substrate by the interfacial polymerization method. Addition of amines or phosphates that act as acid scavengers, pH buffers, are typically used in an interfacial polymerization process to promote polymerization of polyamide polymers and achieve the performance required for various filtration applications including RO and NF. In many cases these amines and/or phosphates become incorporated into the resulting polymer to enhance membrane performance.

In the most general sense membrane preparation is a two step deposition and polymerization process. In the first step the amine starting material (monomer) is deposited onto a microporous substrate as a "liquid" or "hydrated" layer from a solution containing other amines, phosphates, and typically water as the primary solvent. The second step involves contacting the wet amine-coated substrate with a solution of TAC in an organic solvent that reacts with the amine at the contact interface ('interfacial polymerization') to produce a highly crosslinked polyamide/polyimide thin film membrane on the surface of the microporous substrate. Several types of reactive polyfunctional amines, acyl halides, alkyl halides, sulfonyl halides, or isocyanates can be incorporated into these films to increase membrane flux and/or rejection rates. Complexing agents such as phosphates are also incorporated to improve membrane flux and/or rejection rates. None of these approaches directly address increasing membrane stability to chlorine and other strong oxidizers. The general architecture of such a membrane may further comprise a reinforcing fabric support that is included for mechanical stability. Thin films of semipermeable polymers, such as polyamide, are formed on finely porous highly water-permeable support membranes in sheets for use in spiral wound filter elements.

Polyamide membranes based on TAC and MPD suffer from the aforementioned chlorine degradation sensitivity due to the presence of secondary amide linkages as well as aromatic ring positions that are activated toward chlorine attack by the amine/amide groups' nitrogen directly attached to the aromatic ring. Each of these reactive sites within the polymer film is susceptible to chemical attack by chlorine and other strong oxidizers leading to degradative amide bond cleavage, alteration of the polymer backbone structure or packing density, or alteration of the ionic charge distribution of the membrane.

Several studies on the chlorine degradation pathways have been reported in the art. The main results of these reported studies show that secondary amide linkages adjacent to aromatic groups allow irreversible chlorination and C—N bond cleavage of the polyamide backbone to occur. Replacement of the secondary amide proton by substitution with a tertiary amide eliminates the most facile pathway of chlorine attack and subsequent polymer breakdown. A higher degree of crosslinking also increases the polymer's resistance to chlorination by creating a larger number of bonds and creating steric hindrance that blocks reactive sites from chemical attack. Increasing water flux has been correlated with the presence of atoms with electron lone pairs that allow for better hydrogen bonding between the polymer and water. Increasing water flux has also been correlated with the incorporation of five- and six-member aliphatic ring structures that are thought to decrease the packing efficiency of the aromatic polymer backbone, which creates water-permeable microchannels in the polymer. Additives such as phenols are also known to enhance water flux due to favorable hydrophilicity.

As mentioned above, another approach to increase membrane stability is to increase the number of crosslinking bonds within the polymer structure, which can increase the steric hindrance to oxidative attack of the polyamide linkages. The current inventors examined this approach by replacing 1,3,5-tribenzoyltrichloride (three potential crosslinking sites) with all-trans-1,2,3,4-cyclopentanetetracarboxylic acid chloride (four potential crosslinking sites). This approach, however, does not reduce the number of secondary amide linkages or nitrogen-activated aromatic ring positions. U.S. Pat. No. 5,254,261 describes the use of cycloaliphatic acyl halides including 1-cis, 2-trans, 3-cis, 4-trans-cyclopentane tetracarboxylic acid chloride, 1-cis, 2-trans, 3-cis, 4-trans-cyclobutane tetracarboxylic acid chloride and 1-cis, 2-trans, 4-cis-cyclopentane tricarboxylic acid chloride.

Many other semipermeable membrane materials are known that are not amenable to the conventional fabrication process and fabrication infrastructure. To be viable, polyamide formulations must be commercially competitive and provide equivalent or superior performance characteristics over current state-of-the-art membrane materials. Semipermeable membrane materials known to exhibit better than industry standard performance either utilize cost prohibitive starting materials or do not possess large enough advantages to justify retooling for production thereof.

Increasing water permeability without decreasing salt permeability for RO membranes is also a great challenge, the current standards being on the order of 20-45 L/h/m$^2$ or 5-10% recovery for seawater desalination.

Many environmental remediation operations require treatment of water to remove contaminants that are incompatible with current membrane technology. Strong oxidizers such as chromium(VI), permanganate, many common heavy metals (e.g., nickel, copper, silver) present severe challenges for common membrane separations processes. Ion-exchange resins are typically used for capturing these types of materials, however the resins are a consumable that must be replenished (~$2.00/lb) or regenerated creating an additional waste stream. Reducing the treatment burden on exchange resins or eliminating use of such ion-exchange resins will help reduce consumable costs in remediation activities.

Consumer house-hold use of RO filtration for water softening or de-ionization can be made more practical and affordable by combining greater chlorine stability and increasing water permeation at low pressures. Chlorine stable membranes will allow filter pre-treatment equipment costs to be reduced, which is both an up-front cost savings and a cartridge replacement/maintenance cost savings. Reducing the operating pressure requirements for treated water production will also reduce system size/cost and reduce energy consumption. These general cost-saving features will benefit RO water purification activities in general, from house-hold consumer systems to municipal treatment operations.

Accordingly, there is a need for high performance polyamide thin film composite (TFC) membranes that are chlorine-tolerant, resistant to biofouling, and mechanically robust when used, for example, in reverse osmosis water purification systems and intermittently operated. Higher water fluxes at lower operating pressures are also desirable. Successful development of membranes with superior chlorine resistance and mechanical stability can save tens of millions of dollars each year by significantly reducing the field distribution logistics, equipment down-time, maintenance time, and costs associated with water pre- and post-treatment and frequent replacement of degraded and fouled membranes.

SUMMARY

Herein disclosed is a polyamide membrane comprising reaction product of (i) an anhydrous solution comprising an anhydrous solvent, at least one polyfunctional secondary amine and a pre-polymer deposition catalyst, wherein said polyfunctional secondary amine comprises at least two aromatic rings; and (ii) an anhydrous, organic solvent solution comprising a polyfunctional aromatic amine-reactive reactant comprising one ring. The polyamide membrane may further comprise a polymerization catalyst. In embodiments polymerization catalyst is selected from the group consisting of elemental chlorine, elemental bromine, elemental iodine, and combinations thereof.

In embodiments, the polyfunctional secondary amine comprises at least two aromatic rings tethered together by at least three bridging atoms that possess at least two secondary amine groups that are reactive for condensation with an acyl halide or alkyl halide. In certain embodiments, the polyfunctional secondary amine is selected from the group consisting of dianilinomethane; 1,2-dianilinoethane; 1,3-dianilinopropane; N,N'-dibenzylethylenediamine; 1,3-diphenylguanidine; 1,3-diphenylurea; 1,3-diphenyl-2-thiourea. In some embodiments, the polyfunctional secondary amine comprises, bonded to carbon atoms, functional groups or atoms of greater electronegativity than hydrogen from the group consisting of fluoride, chloride, bromide, iodide, trifluoromethane, cyanide, carbonyl, sulfonyl, nitro, oxygen, and sulfur. In embodiments, the anhydrous solution of (i) comprises a plurality of polyfunctional secondary amines.

The pre-polymer deposition catalyst of the anhydrous solution may be a polyfunctional secondary or tertiary amine that possesses structural features having similar geometric shape or size to the at least three bridging atoms of said polyfunctional secondary amine. The pre-polymer deposition catalyst may be selected from the group consisting of piperazine; 1,4-dimethylpiperazine; homopiperazine; pyrazine; 2,3-dimethylpyrazine; and combinations thereof.

The anhydrous solvent of the anhydrous solution may comprise a solvent selected from the group consisting of protic solvents, a-protic solvents, and combinations thereof. In embodiments, the protic solvent is selected from the group consisting of linear and branched chain alcohols comprising from one to twelve carbon atoms. In embodiments, an a-protic solvent is selected from the group consisting of polar organic solvents comprising from one to twelve carbons and one or more heteroatoms selected from the group consisting of hydrogen, oxygen, nitrogen, sulfur, fluorine, chlorine, and bromine, arranged in linear or branched chains or cyclic arrangements. In specific embodiments, the a-protic solvent is selected from the group consisting of non-polar organic solvents comprising from six to twelve carbons arranged in linear or branched chains or cyclic arrangements.

The amine-reactive reactant may comprise at least one component selected from the group consisting of polyfunctional aromatic acid halides and sulfonyl halides. In embodiments, polyfunctional aromatic acid halide is selected from the group consisting of trimesoyl chloride; 1,2,4,5-benzenetetracarboxylicacid chloride; 1,3-isophthaloyl dichloride; 2,6-pyridinedicarbonyl dichloride; and 1,3-benzenedisulfonyl chloride. In some embodiments, the polyfunctional aromatic amine-reactive reactant comprises at least three reactive groups.

The organic solvent solution may comprise an a-protic solvent selected from the group consisting of (i) polar organic solvents selected from the group consisting of a-protic solvents comprising from one to twelve carbons and one or more heteroatoms selected from the group consisting of hydrogen, oxygen, nitrogen, sulfur, fluorine, chlorine, and bromine, arranged in linear or branched chains or cyclic arrangements; and (ii) non-polar organic solvents comprising from six to twelve carbons arranged in linear or branched chains or cyclic arrangements.

Also disclosed herein is a composite semipermeable membrane comprising: (1) a porous support, and (2) a polyamide membrane comprising reaction product of: (i) an anhydrous solution comprising an anhydrous solvent, at least one polyfunctional secondary amine and a pre-polymer deposition catalyst, wherein said polyfunctional secondary amine comprises at least two aromatic rings; and (ii) an anhydrous, organic solvent solution comprising a polyfunctional aromatic amine-reactive reactant comprising one ring on said porous support. The composite semipermeable membrane may be impregnated with nanoparticles. In embodiments, the porous support comprises a polymer from the group consisting of polysulfone, polyethersulfone, polyvinyldifluoride, polytetrafluoroethylene, polyamide, polyimide, and polycarbonate. In some embodiments, the porous support comprises a ceramic selected from the group consisting of silica, alumina, aluminosilicate, zirconia, titania, and combinations thereof. The composite semipermeable membrane may have suitable performance as a nanofiltration membrane; reverse osmosis membrane; a catalytic membrane for filtration, desalination, gas separation, pervaporation, catalysis; and combinations thereof. The semipermeable membrane may further comprise at least one type of nanoparticle selected from the group consisting of heavy metals, oxides of heavy metals and combinations thereof. The at least one type of nanoparticle may comprise a heavy metal having a density greater than about 4 g/cm$^3$ selected from the group consisting of chromium, manganese, iron, cobalt, nickel, copper, zinc, molybdenum, ruthenium, rhodium, palladium, silver, cadmium, indium, tin, tantalum, tungsten, rhenium, osmium, iridium, platinum, gold, lead, and the lanthanides (lanthanum, cerium, praseodymium, neodymium, samarium, europium, gadolinium, terbium, dysprosium, holmium, erbium, thulium, ytterbium, lutetium).

In embodiments, the nanoparticles are produced by thermal or chemical treatment of heavy metal precursors diffused or adsorbed into the polyamide membrane.

The heavy metal precursor may be selected from the group consisting of chemical complexes of heavy metal cations soluble in aqueous, alcoholic and organic solutions to be applied in the liquid state; and chemical complexes of heavy metal cations with sufficient vapor pressure to be applied in the vapor state.

In embodiments, the stability of the disclosed membrane to chlorine exposure is greater than about 20,000 ppm-h. In embodiments, the stability of the membrane to chlorine exposure is greater than about 80,000 ppm-h. In embodiments, the disclosed membrane has a water permeability greater than 0.1 gfd/psi. In some embodiments, the membrane has a water permeability greater than 1 gfd/psi.

Also disclosed herein is a method of making a composite semipermeable membrane, the method comprising the steps of: coating a porous support with an anhydrous solution comprising an anhydrous solvent, a polyfunctional secondary amine and a pre-polymer deposition catalyst, so as to form an activated pre-polymer layer on said porous support; and contacting said activated pre-polymer layer with an anhydrous, organic solvent solution comprising a polyfunctional amine-reactive reactant so as to interfacially condense said amine-reactive reactant with said polyfunctional secondary amine, thereby forming a cross-linked, interfacial polyamide layer on said porous support.

In embodiments of the method of making a composite semipermeable membrane, the anhydrous, organic solvent solution comprising a polyfunctional amine-reactive reactant further comprises a polymerization catalyst. The method of making a composite semipermeable membrane may further comprise drying the activated pre-polymer layer, partially or completely, in the absence of water vapor prior to contacting the activated pre-polymer layer with the anhydrous, organic solvent solution. In some embodiments, the method comprises drying the semipermeable membrane at a temperature below 50° C. In some embodiments, the method further comprises rinsing the composite semipermeable membrane in an alcoholic solution. In some embodiments, the method comprises rinsing the composite semipermeable membrane in an aqueous solution having a pH in the range of from about 4 to about 11. In embodiments, the composite semipermeable membrane is rinsed in an aqueous solution comprising a polyalcohol and/or a polyetheralcohol.

Also disclosed herein is a method of impregnating a composite semipermeable membrane with nanoparticles selected from heavy metals, oxides of heavy metals and combinations thereof, said method comprising: diffusing a nanoparticle precursor in liquid solution or vapor state into said composite semipermeable membrane; rinsing excess nanoparticle precursor from the composite semipermeable membrane with a solvent; and thermally converting the nanoparticle precursor to solid nanoparticles in the presence of an inert, reducing, or oxidizing atmosphere. In embodiments of the method of impregnating a composite semipermeable membrane with nanoparticles, the liquid solution is selected from water, alcohol, organic solvent, and combinations thereof. The vapor state may comprise elevated temperature, reduced pressure, or a combination thereof.

In embodiments of the method of impregnating a composite semipermeable membrane with nanoparticles, rinsing excess nanoparticle precursor from the composite semipermeable membrane comprises a solvent selected from water, alcohol, organic solvent, and combinations thereof. In embodiments thermally converting the nanoparticle precursor to solid nanoparticles comprises heating the nanoparticle precursor by action selected from convection, induction, radiation, microwave radiation, radio frequency radiation, and combinations thereof.

These and other embodiments, features and advantages will be apparent in the following detailed description and drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1:
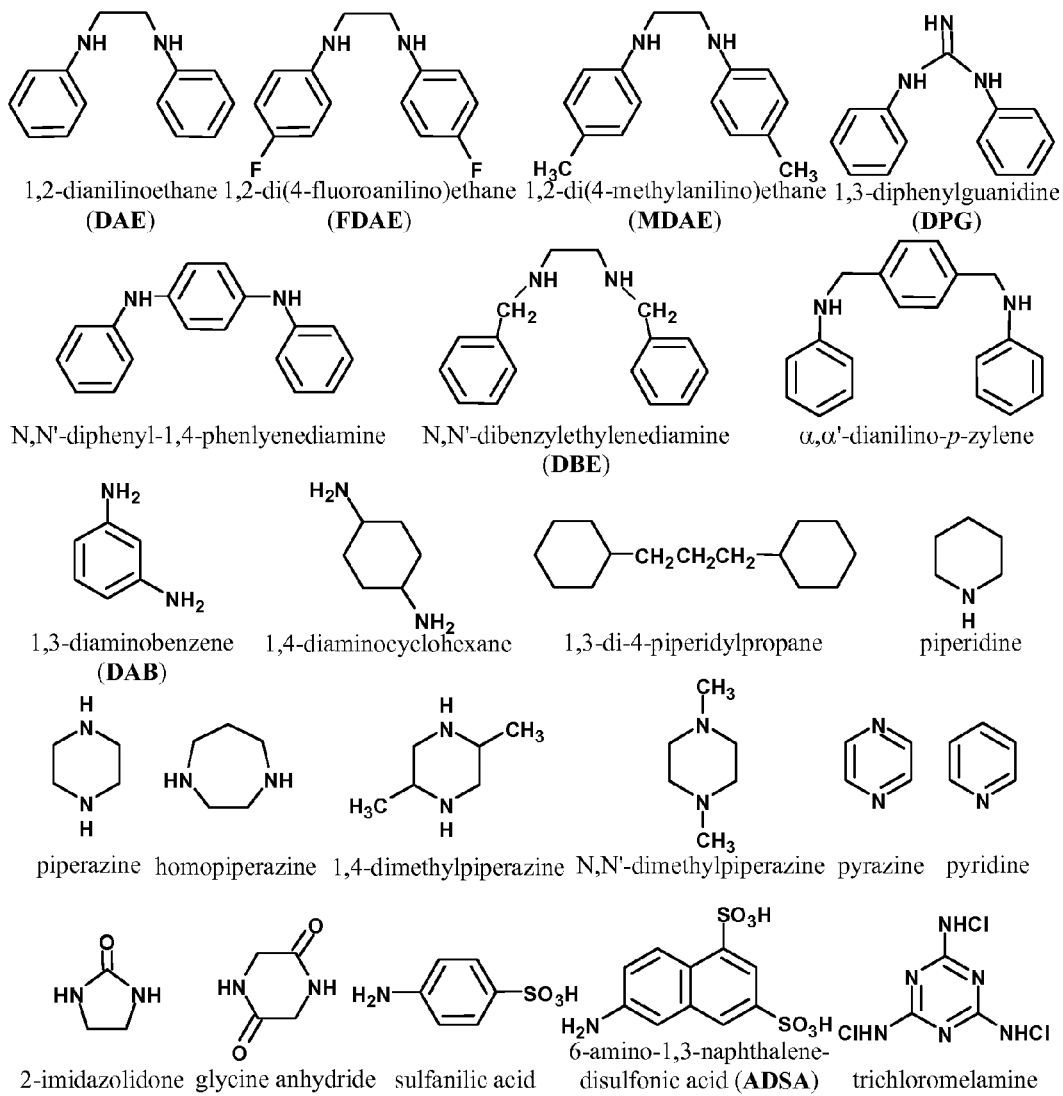
FIG. 1 is a schematic of the structures of some suitable polyfunctional secondary amines and other relevant amine-containing compounds.

Chlorine exposure is reported as a concentration-time product in ppm-h. For example, 500 ppm chlorine exposure for two hours equates to 1000 ppm-h. This assumes a linear response to chlorine concentration, which was found to be a reasonable approximation based on the ratings of commercial membranes tested in control experiments.

DETAILED DESCRIPTION

I. Overview

Herein disclosed are semipermeable polymer membranes and methods for synthesis and deposition onto microporous substrates. Without limitation, the membranes are suitable for use in membrane separations and catalytic membrane applications. The semipermeable membranes comprise a unique family of polymers that exhibit high tolerance to mechanical stress and strong oxidizers, such as chlorine, hydrogen peroxide, and catalytic metals and can be fabricated as substrate-supported thin films by an anhydrous interfacial polymerization process. The unique molecular structure of the polymer materials imparts superior chemical stability to filter membranes relative to the current state of the art. The polymer materials contain the necessary structural characteristics to maintain high selectivity and permeate flux that is equivalent to or better than the current state of the art when deposited onto microporous substrates. The disclosed semipermeable membrane has an unprecedented combination of stability and salt rejection and water permeability.

This membrane is composed of a new family of highly crosslinked polyamide/polyimide co-polymers that have unprecedented stability to chlorine and very long shelf life. The polymer materials can also be selectively impregnated with catalyst particles to manipulate selectivity and permeability and impart catalytic activity. A specific method is used to deposit the polymer materials as thin films onto microporous substrates to produce membranes with composite membrane architecture. This method includes unique synthesis conditions that allow less reactive, and subsequently more stable, polymer constituents to be incorporated into the polymer structure. The deposition method enables production of semipermeable membranes having the desired structure and performance characteristics.

The process is compatible with conventional production lines used for producing current state of the art thin film composite membranes. The stability of the polymer membranes produced allows for metal-based nanoparticles to be imbedded within the pore structure of the semipermeable membranes without degradation. These imbedded particles impart different permeability properties for gases, liquids, and dissolved solids to the membranes. The imbedded particles can be catalytic in nature for use in chemical synthesis and transformations when the disclosed membranes are incorporated into a catalytic membrane reactor.

This family of membranes is the foundation for the current program that has determined how to strategically manipulate polymer structure and performance to produce membranes with markedly superior stability and unique capabilities over current state-of-the-art technology.

The general development strategy pursued was to incorporate a chlorine-tolerant base polymer or "host" that provides a functional structure that bears water-permeable pores, eliminates sites of degradative chlorine attack, and imparts greater mechanical flexibility. The "host" polymer also possesses the desirable smooth surface morphology on the microscopic scale that will reduce particle and microbe trapping and make them easier to clean. Water permeable, hydrophilic pores are built into the "host" polymer by incorporating several functional constituents such as unique crosslinking agents, polyaromatic amines, and hydrophilic additives that promote pore formation in the polyamide membrane while maintaining regions of structural order to obtain high levels of salt rejection. Thus, by tailoring the composition of the membrane, performance characteristics can be optimized.

The new TFC membranes developed in this program consist of a unique polyamide polymer film deposited by interfacial polymerization onto a microporous support membrane. The resulting composite membranes are tested for salt rejection, water flux, chlorine tolerance, and mechanical stability.

The new approach is to develop new "host" polymers that can be chemically manipulated by the use of additives or chemical substitutions to tailor polymer stability, density, permeability, hydrophilicity, and selectivity. Fabricating composite membranes by standard interfacial polymerization methods to produce polyamide thin films on microporous substrates will allow for complete process development to facilitate rapid implementation of the new membrane technology. Increasing the polyamide/substrate bonding and chemical stability will prevent membrane delamination that also severely limits RO membrane lifetime.

The immediate needs for these applications are greater water permeability, greater stability to strong oxidizers and cleansers, greater resistance to fouling, greater mechanical stability to withstand pressure cycling, and greater thermal stability to allow for heat sterilization. The primary technical challenge is to obtain these improvements without compromising salt rejection performance. Table 1 is an overview of the advantages of the disclosed membranes.

activated aromatic rings and deactivates the amide linkages to attack by oxidizers. This objective is achieved by producing polyamide membranes based on 1,2-dianilinoethane, chemically substituted derivatives of 1,2-dianilinoethane, and/or 1,3-diphenylguanidine and/or similarly structured amines, ureas, thioureas, etc., reacted with 1,3,5-tribenzoyltrichloride (also known as triacetyl chloride, 1,3,5-tricarbonyl trichloride, trimeric acid trichloride, and other names). The resulting polymer films are highly crosslinked, contain tertiary amide linkages of low reactivity, the nitrogen-bound aromatic ring is positioned as a side-group of the polymer backbone. These polymer film features reduce the reactivity of the nitrogen-bound aromatic ring and allows the nitrogen-bound aromatic rings to be substituted with chemical groups that further stabilize both the nitrogen-bound aromatic ring and the nitrogen-containing amide linkage to oxidative attack. The resulting polymer membranes incorporating these features have been demonstrated to be more stable to oxidizers, more thermally and mechanically stable, and have smoother surfaces (less prone to fouling and easier to clean) than current state of the art polyamide membranes.

A two step interfacial polymerization process, similar to conventional practice, is used to produce thin film composite membranes.

II. Composition

Polyfunctional Secondary Amine

Herein disclosed is a polyamide/polyimide membrane comprising reaction product of (i) an anhydrous solution comprising an anhydrous solvent, at least one polyfunctional secondary amine and a pre-polymer deposition catalyst; and (ii) an anhydrous, organic solvent solution comprising a polyfunctional aromatic amine-reactive reactant.

The polyfunctional secondary amine of (i) comprises at least two aromatic rings. In embodiments, the polyfunctional secondary amine comprises at least two aromatic rings tethered together by at least three bridging atoms that possess at least two secondary amine groups that are reactive for con-

TABLE 1

Summary of Performance of Disclosed Thin Film Composite Membranes and Benefits

| Feature | Available Technology | Performance | Advantages |
| --- | --- | --- | --- |
| Chlorine Resistance | 1000-2000 ppm-h | 21,000 ppm-h | Reduced water pre-treatment costs, longer membrane lifetime |
| Water Permeation | 0.02 gfd/psi, RO-seawater 0.1-0.2 gfd/psi, RO-brackish 0.2-0.53 gfd/psi, NF | 0.4-0.8 gfd/psi, NF | Greater water production at lower pressures, lower operating power cost |
| Salt Rejection | NF: 96-98% $MgSO_4$ 50-90% NaCl RO: >99% NaCl | 96-99% $MgSO_4$ 55-60% NaCl | Water softening and desalination applications |
| Thermal Stability | below 50° C. continuous (90° C. periodic for Osmonics' Duratherm ™ RO) | 80° C. periodic (preliminary) | Hot water sterilization compatible, hot processing (>65° C.) prevents microbial growth |
| Chemical Stability | Limited | Moderate stability to transition metals with oxidizers | Metal/catalyst recovery, waste treatment, reduced pre-treatment costs |
| Substrate Compatibility | Polysulfone, polyethersulfone | Polysulfone, polyethersulfone, polyvinyldifluoride, PTFE | Variety of cost and stability options for numerous applications |
| Shelf Life | <1 year dry | >1 year dry | More reliable after storage |

The primary objective of the invention is to increase polyamide membrane stability to chlorine and other strong oxidizers by a unique approach that eliminates reactive secondary amide linkages, removes the nitrogen-activated aromatic rings from the polymer backbone, deactivates the nitrogendensation with an acyl halide or alkyl halide. Without wishing to be limited by theory, it is believed that the polymer structure is partitioned into two regions. It is proposed that the hydrophobic aromatic rings of the polyfunctional secondary amine (e.g., DAE, FDAE and/or MDAE) are packed together and provide the localized domains of high structural order thought to be a required component of RO membranes. This is made possible by the aromatic rings for the two secondary amine groups being merely side-group to the polymer backbone thus creating the proper polymer packing structure.

In embodiments, the polyfunctional secondary amine is selected from the group consisting of dianilinomethane (hereinafter DAM); 1,2-dianilinoethane (hereinafter DAE); 1,2-di(fluoroanilino)ethane (hereinafter FDAE); 1,2-di-(4-methylanilino)ethane (hereinafter MDAE); 1,2-di(4-methoxyanilino)ethane (ODAE); 1,2-di(4-nitrileanilino)ethane (NDAE); 1,3-dianilinopropane (hereinafter DAP); N,N'-dibenzylethylenediamine (hereinafter DBE); N,N'-diphenyl-1,4-phenylenediamine; 1,3-diphenylguanidine (hereinafter DPG); 1,3-diphenylurea (hereinafter DPU); 1,3-diphenyl-2-thiourea (hereinafter DPT); α,α'-dianilino-p-xylene. FIG. 1 shows the structures of some suitable polyfunctional secondary amines.

Figure 2:
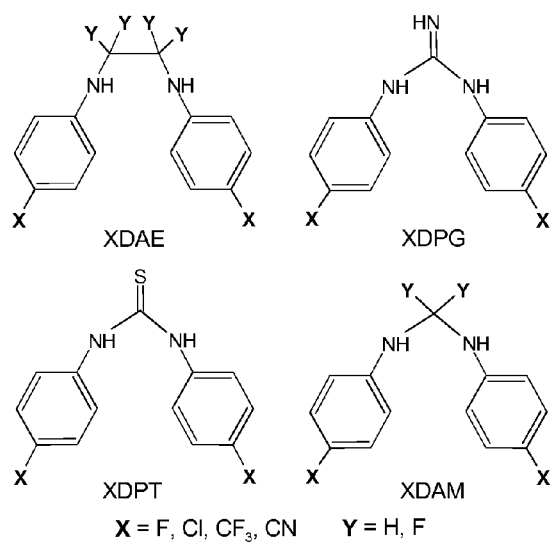
FIG. 2 is a schematic showing the "X" and "Y" nomenclature and some stabilized polyfunctional secondary amines examined.

In some embodiments, the polyfunctional secondary amine comprises at least two aromatic rings tethered together by three bridging atoms that possess at least two secondary amine groups that are reactive for condensation with an acyl halide or alkyl halide. FIG. 2 is a schematic showing the "X" and "Y" nomenclature and some stabilized polyfunctional secondary amines examined. As seen in the schematic of FIG. 2, polyfunctional secondary amines comprising ortho or para substituted derivatives are herein referred to with the prefix "X", such as XDAM. Polyfunctional secondary amines having substituted bridging groups are referred to with a "Y", for example YDAE.

Suitable polyfunctional secondary amine comprises at least two aromatic rings tethered together by three bridging atoms comprise dianilinomethane (DAM); ortho or para substituted derivatives thereof (XDAM); derivatives of DAM having substituted bridging groups, FDAM; derivatives having substituted bridging groups and ortho or para substitutions XYDAM; DPG; DPT; XDPG; XDPT; XYDPG; XYDPT; YDPT; YDPG; or a combination thereof. DAM and derivatives thereof may be particularly desirable because, without wishing to be limited by theory, it is postulated that reducing the spatial separation between amide linkages to a single carbon atom (similar to DPG and DPT), but without adding an "extra" NH group or S atom to the pore structure, contracts the pore size/volume and increases the charge density in a smaller volume, thus increasing salt rejection selectivity. Salt rejection may be enhanced by decreasing pore volume/size and/or increasing charge density around the pores. In embodiments, a diamine constituent similar to DAE, but having a single bridging atom in addition to the two bridging nitrogens such as dianilinomethane (DAM) mentioned above allows contraction of the pore volume.

In embodiments, salt rejection for NaCl is increased by (1) adding select chemical fragments or atoms to the polymer structure and/or (2) filling the pores of the membranes with small particles such as nanoparticles of metals, metal oxides, semimetals or organic materials, which will be discussed further hereinbelow. For example, the halogenation of DAM to XDAM may increase chlorine stability.

Figure 3:
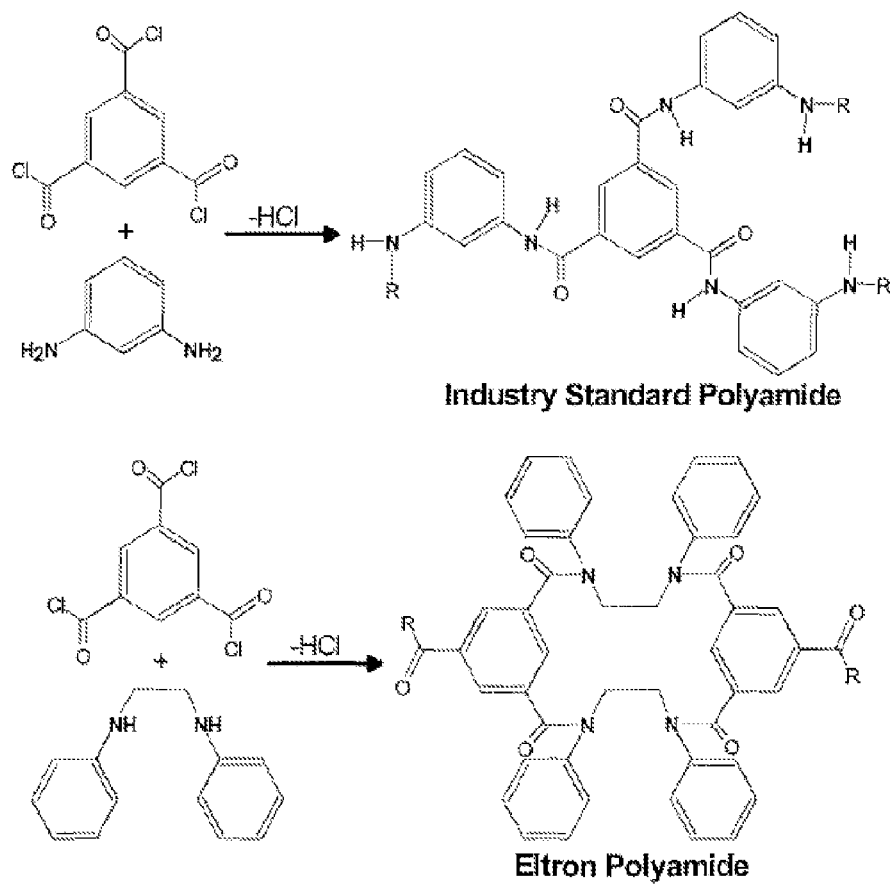
FIG. 3 is a schematic comparison of industry standard polymer with reactive secondary amide linkages to the herein disclosed polymer with stable tertiary amide linkages.

Without wishing to be limited by theory, secondary amines are desirable for reaction with acid chlorides to produce polyamide materials with stable tertiary amide linkages rather than chlorine-reactive secondary amide linkages as illustrated in FIG. 3. FIG. 3 is a schematic comparison of industry standard polymer with reactive secondary amide linkages to the herein disclosed polymer with stable tertiary amide linkages.

In embodiments, the polyfunctional secondary amine comprises, bonded to carbon atoms, functional groups or atoms of greater electronegativity than hydrogen from the group consisting of fluoride, chloride, bromide, iodide, trifluoromethane, cyanide, carbonyl, sulfonyl, nitro, oxygen, and sulfur. As discussed in Example 5 hereinbelow, ortho or para substituted (e.g., halogenated) polyfunctional secondary amines may increase chlorine stability. Substitution of substituents on the bridging carbon(s) may alter the water permeability.

For example, Example 5 hereinbelow discusses membranes comprising XDAE.

Additional Amine(s)

In some embodiments, the polyfunctional secondary amine is a mixture of a plurality of polyfunctional secondary amines. See, for example, Examples 4, 5C, 7, 9, and 10 hereinbelow. In this case, the polyamide comprises co-polymer constituents. The primary polymer formulation with which to develop a membrane with even greater chlorine stability is the FXDAE/XDPG+TAC formulation (XDAE with fluorinated ethylene carbons).

Pre-Polymerization Deposition Catalysts

The anhydrous solution of (i) of the disclosed polyamide membrane comprises a pre-polymer deposition catalyst. The pre-polymer deposition catalyst provides positive structural and functional effects on membrane performance. In embodiments, the pre-polymer deposition catalyst is a polyfunctional secondary or tertiary amine that possesses structural features having similar geometric shape or size to the at least three bridging atoms of said polyfunctional secondary amine.

In embodiments, the pre-polymer deposition catalyst comprises smaller amines. Without wishing to be limited by theory, these smaller amine additives may serve to enhance the polymerization reaction. In embodiments, the pre-polymerization catalyst (or 'deposition catalyst') comprises piperazine or structurally similar variants of piperazine. The pre-polymerization catalyst imparts the desired performance characteristics such as high salt rejections and high chlorine tolerance to the polyamide membrane. The pre-polymerization catalyst may assist in creating a reactive pre-polymer state of the polyfunctional secondary amine of (i) for reaction with the polyfunctional aromatic amine-reactive reactant of (ii). Unlike previous related work, the additional amines (such as piperazine) are not acting as acid scavengers during polymerization and are not incorporated into the final membrane materials or polymer structure in this invention. They instead serve to create a pre-polymer state that may be structural or chemical in nature during the interfacial polymerization process that provides the correct functionality and/or structure to the polymer after cross linking with an acid chloride such as 1,3,5-tribenzoyltrichloride. This is neither obvious nor conventional practice.

In embodiments, (i) further comprises non-reactive acid scavengers which may be smaller amine(s) to scavenge the HCl acid byproduct produced during interfacial polymerization.

In embodiments, the pre-polymerization catalyst amines are selected from pyridine, pyrazine, piperidine, piperazine, homopiperazine, 2,3-dimethylpyrazine; 1,4-dimethylpiperazine, N,N'-dimethylpiperazine, 1,3-di-4-piperidylpropane, 2-imidazolidone; glycine anhydride; and combinations thereof. In embodiments, the pre-polymerization catalyst is not incorporated into the polyamide membrane. Several pre-polymerization catalysts are shown in FIG. 1.

In embodiments, deposition "catalyst" comprises piperazine. In embodiments, the pre-deposition catalyst does not co-deposit with DAE (see Example 14 hereinbelow)) yet serves to create the proper pre-polymer state of surface-deposited amines.

Anhydrous Solvent of (i)

The anhydrous solution of (i) comprises an anhydrous solvent. In embodiments, the anhydrous solvent comprises a solvent selected from the group consisting of protic solvents, a-protic solvents, and combinations thereof. In embodiments, the protic solvent is selected from the group consisting of linear and branched chain alcohols comprising from one to twelve carbon atoms. In embodiments, the a-protic solvent is selected from the group consisting of polar organic solvents comprising from one to twelve carbons and one or more heteroatoms selected from the group consisting of hydrogen, oxygen, nitrogen, sulfur, fluorine, chlorine, and bromine, arranged in linear or branched chains or cyclic arrangements. In some embodiments, the a-protic solvent is selected from the group consisting of non-polar organic solvents comprising from six to twelve carbons arranged in linear or branched chains or cyclic arrangements. In embodiments, the aprotic solvent comprises tetrahydrofuran (THF). In embodiments, the anhydrous solution of (i) comprises hexane and THF. In embodiments, the anhydrous solution of (i) comprises hexane and chloroform.

Polyfunctional Aromatic Amine-Reactive Reactant

Figure 4:
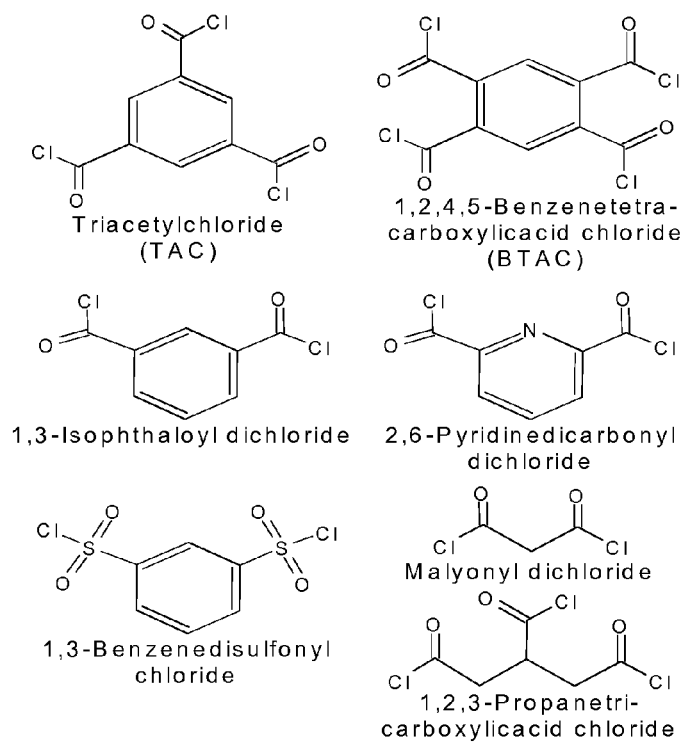
FIG. 4 is a schematic of some suitable amine reactive reactants.

The anhydrous, organic solvent solution of (ii) comprises a polyfunctional aromatic amine-reactive reactant. In embodiments, the amine-reactive reactant comprises at least one component selected from the group consisting of polyfunctional aromatic acid halides and sulfonyl halides. For example, in embodiments, the polyfunctional aromatic acid halide is selected from the group consisting of trimesoyl chloride (also known as tribenzoyl acid chloride; TAC); 1,2,4,5-benzenetetracarboxylicacid chloride (BTAC); 1,3-isophthaloyl dichloride; 2,6-pyridinedicarbonyl dichloride; and 1,3-benzenedisulfonyl chloride; sulfanilic acid, 6-amino-1,3-naphthalenedisulfonic acid (ADSA), trichloromelamine, and combinations thereof. FIG. 4 is a schematic of some suitable amine reactive reactants.

In certain embodiments, the polyfunctional aromatic amine-reactive reactant comprises at least three reactive groups. In embodiments, the organic solvent solution of (ii) comprises BTAC and at least one other amine-reactive reactant. As discussed further in Examples 8 and 9 hereinbelow, BTAC may serve to increase the degree of crosslinking and thus the salt rejection performance of the semipermeable membrane.

Other amines and acid chlorides bearing hydrophilic functional groups were examined for increasing water permeability of membranes, including diaminocyclohexane; 1,3-diaminobenzene (MPD); 2,6-pyridinedicarbonyl dichloride, 1,3-benzenedisulfonyl chloride, sulfanilic acid, 6-amino-1,3-naphthalenedisulfonic acid (ADSA), and trichloromelamine.

In embodiments, the formulation comprises BTAC/DAE/piperazine, as further discussed in Example 8 hereinbelow.

Anhydrous Organic Solvent of (ii)

The anhydrous organic solvent of (ii) comprises an a-protic solvent selected from the group consisting of (a) polar organic solvents selected from the group consisting of a-protic solvents comprising from one to twelve carbons and one or more heteroatoms selected from the group consisting of hydrogen, oxygen, nitrogen, sulfur, fluorine, chlorine, and bromine, arranged in linear or branched chains or cyclic arrangements; and (b) non-polar organic solvents comprising from six to twelve carbons arranged in linear or branched chains or cyclic arrangements.

Polymerization Catalyst

In embodiments, the organic solvent of (ii) further comprises a polymerization catalyst. In embodiments, the polymerization catalyst is selected from the group consisting of elemental chlorine, elemental bromine, elemental iodine, and combinations thereof. The polymerization catalyst promotes reactivity of the starting materials leading to polymer formation. Typically, the use of halogens (chlorine, bromine, iodine) as "catalysts" is avoided in conventional practice of producing polyamides and similar types of amide linkages in a polymer backbone due to the fact that the high oxidizing power of halogens leads to degradation of polyamide structures currently produced for semipermeable membranes. As discussed further in Example 3 hereinbelow, this is not the case found in the present method and semipermeable membrane produced thereby.

In embodiments, the polymer quality and salt rejection for the polymer is improved by adding $Cl_2$ or $Br_2$ to the polymerization reaction. In embodiments, halogen, for example bromine, is added to amine solution as a liquid, in known quantities (compared to handling chlorine gas). In embodiments, the polymerization catalyst provides accuracy for controlling polymer synthesis. This investigation was based on previous initial observations of a surprising beneficial effect of halogens on membrane performance. In embodiments, a sub-stoichiometric concentration of $Cl_2$ or $Br_2$ is added to the amine (DAE) solution and increases the reproducibility of performance for the resulting polymers. Without wishing to be limited by theory, it is believed that a catalytic amount of $Cl_2$ or $Br_2$ added to the amine deposition solution promotes a radical reaction mechanism between the polyfunctional secondary amine, for example DAE, and the amine reactive reactant, for example TAC, at room temperature resulting in improved membranes.

In embodiments, use of halogen as polymerization catalyst improves membrane color (essentially colorless films may be obtained instead of a light tan hue resulting from unreacted polyfunctional secondary amine, for example DAE), improved membrane quality (exfoliation of polymer "flakes" after deposition may be eliminated) and improvement in salt rejection. The use of halogens $Cl_2$ or $Br_2$ is not a replacement, however, to the use of piperazine. Piperazine acts uniquely as a deposition "catalyst" (piperazine does not co-deposit with DAE, see Example 14 hereinbelow) and serves to create the proper pre-polymer state of surface-deposited amines.

Again without wishing to be limited by theory, the beneficial effect obtained by the addition of halogen may be to re-chlorinate any acid chloride groups that have been hydrolyzed to carboxylic acid groups. There may also be some synergistic effect of chlorine on the reactivity of the polyfunctional secondary amine (e.g., DPG) with amine reactive reactant (e.g., acid chloride). Example 2 hereinbelow describes how the addition of a small amount (millimolar concentrations) of anhydrous chlorine or bromine to the acid chloride solution enhanced performance of the resulting semipermeable membrane (e.g., ER HF membranes, such as those formed from TAC+DAE/DPG/piperazine).

Nanoparticles

In some embodiments, salt rejection is improved by adding select chemical fragments or atoms to the polymer structure, such as by using polyfunctional secondary amines comprising aromatic rings, para or ortho-substituted aromatic rings, and/or bonded to carbon atoms of the polyfunctional secondary amines (referred to here as bridging group substituents), functional groups or atoms of greater electronegativity than hydrogen.

In embodiments, salt rejection is improved by impregnating a membrane with stable, inexpensive metal oxide particles that will fill pore volume and potentially carry charge, have greater dipole moment and hydrogen bonding character. In embodiments, the salt rejection performance of the semipermeable membrane is enhanced by small particles within the pore structure. In embodiments, the semipermeable membrane comprises small particles, such as nanoparticles of metals, metal oxides, semi-metals, halide-coated metals, and organic-coated metals, incorporated within the pores of the semipermeable membrane. In embodiments, the semipermeable membrane comprises nanoparticles. In embodiments, the semipermeable membrane comprises at least one type of nanoparticle selected from heavy metals, oxides of heavy metals and combinations thereof. In embodiments, the nanoparticle comprises a heavy metal having a density greater than about 4 $g/cm^3$. In embodiments, the heavy metal having a density greater than about 4 $g/cm^3$ is selected from chromium, manganese, iron, cobalt, nickel, copper, zinc, molybdenum, ruthenium, rhodium, palladium, silver, cadmium, indium, tin, tantalum, tungsten, rhenium, osmium, iridium, platinum, gold, lead, the lanthanides (lanthanum, cerium, praseodymium, neodymium, samarium, europium, gadolinium, terbium, dysprosium, holmium, erbium, thulium, ytterbium, lutetium), and combinations thereof.

In embodiments, the formulation comprises DAE/DPG with nanoparticles, as further discussed in Example 10 hereinbelow. In embodiments, the nanoparticle impregnated membranes have catalytic activity. Catalytic membranes and membrane reactors are, in general, rapidly growing areas of research due to potentially important role in simplifying chemical transformation and isolation into a single step (e.g., amination of aldehydes and ketones). Benefits to membrane-mediated chemical processing approaches include removal of products or byproducts from a reaction to increase yield, shifting the reaction equilibrium toward the desired products, and preventing product decomposition. There is interest in membrane reactors for bio-based product transformations and isolations as well (e.g., biofuel production, enzymatic catalysis). The new nanocomposite catalytic membranes will be useful in such applications.

Sample Combinations

In embodiments, the formulation comprises TAC/DAE/piperazine (also known as type ER HR1), as further discussed in Example 3 hereinbelow. In embodiments, the formulation comprises TAC/DAE/DPG/piperazine (also known as type ER HF1A), as further discussed in Example 4 hereinbelow. In embodiments, the formulation comprises TAC/MDAE/piperazine (also known as type ER-HR3), as further discussed in Example 5A hereinbelow. In embodiments, the formulation comprises TAC/FDAE/piperazine (also known as type ER-HR2), as further discussed in Example 5B hereinbelow. In embodiments, the formulation comprises TAC/FDAE/DPG/piperazine (also known as type ER-HF2A), as further discussed in Example 5C hereinbelow. In embodiments, the formulation comprises TAC/DPG/piperazine, as further discussed in Example 6 hereinbelow. In embodiments, the formulation comprises TAC/DAE/DPT/piperazine, as further discussed in Example 7 hereinbelow. In embodiments, the formulation comprises BTAC/DAE/piperazine, as further discussed in Example 8 hereinbelow. In embodiments, the formulation comprises DAE/DPG+TAC/BTAC, as further discussed in Example 9 hereinbelow.

Selective Cation Rejection Membrane

Also disclosed herein is a membrane having selective cation rejection. In embodiments, the selective cation rejection membrane (SCRM) is based on the DAE+BTAC formulation (see Examples 8 and 9 hereinbelow). In embodiments, the SCRM is based on the use of FXDAE+BTAC.

In embodiments, the disclosed SCRM has greater than about 70% to 80% selectivity to cation rejection over anions.

III. Membrane Structure

In embodiments, the polyamide comprises no reactive secondary amide linkages to react with chlorine. Through systematic chemical substitution of the para position of the aromatic rings of DAE (see Example 5 and Examples 5A-5C hereinbelow) it was determined that the aromatic rings govern the polymer packing structure while the polyamide linkages around the TAC occupy or create the membrane pore structure.

The aromatic rings of the polyfunctional secondary amines are positioned as side groups to the polymer backbone, which puts the more flexible bridging fragment (ethylene in DAE, for example) in place of the conventional diaminobenzene. This produces a more flexible polymer that is more mechanically robust (less brittle). It is also expected that direct chlorination of the aromatic rings will not strongly affect the polymer's pore structure. This appears to be the case from comparative chlorination studies between membranes containing DAE or para-substituted DAE (see Examples 5A-5C hereinbelow).

In embodiments of the disclosed semipermeable membrane, there is a clear partitioning between the polymers' structural matrix and the hydrophilic water-permeable pores. Thus, strategic design of the polymer's pore structure (for permeation properties) is independent of the polymers' structural matrix design (for chlorine and mechanical stability). This unique membrane structure provides a revolutionary approach to polyamide/polyimide membrane performance.

As further discussed hereinbelow, the herein disclosed polyamide materials have increased chlorine tolerance compared to industry standard membranes. The disclosed membranes are very (mechanically) stable, have good fouling resistance, have a moderately wide pH range for cleaning, and have unprecedented resistance to strong oxidizers.

A. Chemical Stability

In embodiments, the composite semipermeable membrane of the present disclosure has increased chemical stability when compared to conventional polyamide membranes. In embodiments, the disclosed membrane has increased chemical stability to strong oxidizers, such as chlorine, hydrogen peroxide, and reactive metals. In embodiments, thin film composite membranes produced by the disclosed method and incorporating the herein disclosed new family of polymers demonstrate from 10 to greater than 20 times the chlorine tolerance compared to the industry standard polyamide materials. In some embodiments, the membranes demonstrate chlorine tolerance greater than 30 times the chlorine tolerance of industry standard polyamide membranes. Alternatively, greater than 40 times. Alternatively, greater than 50 times. Alternatively, greater than 60 times. Alternatively, greater than 70 times. Alternatively, greater than 80 times.

In embodiments, stability of the membrane to chlorine exposure of greater than about 2500 ppm-h chlorine. In embodiments, stability of the membrane to chlorine exposure of greater than about 5,000 ppm-h chlorine. In embodiments, stability of the membrane to chlorine exposure of greater than about 10,000 ppm-h chlorine. In embodiments, stability of the membrane to chlorine exposure of greater than about 15,000 ppm-h chlorine. In embodiments, stability of the membrane to chlorine exposure of greater than about 19,000 ppm-h chlorine. In embodiments, tolerance of the disclosed membrane to chlorine is greater than 20,000 ppm-h. In embodiments, the stability of the disclosed composite semipermeable membrane to chlorine exposure is greater than about 80,000 ppm-h. Stability of the disclosed membranes to chlorine is further discussed in Example 15 hereinbelow.

B. MgSO$_4$ Rejection/NaCl Rejection

In embodiments, the disclosed membrane provides salt rejection of greater about 55-60%. In some embodiments, the tolerance of the new nanofiltration membranes exceeds 19,000 ppm-h for MgSO$_4$, rejection. In embodiments, salt rejections are 91%-94% for Mg$^{2+}$ and 97%-99.4% for SO$_4^{2-}$ at 2000 mg/L dissolved solids concentrations. In embodiments, the rejection of Ca$^{2+}$ and Mg$^{2+}$ by the disclosed membrane are nearly equivalent. In embodiments, the separation of SO$_4^{2-}$ from seawater (40,000 mg/L) is little affected by the presence of NaCl and other ions.

C. Cost

In embodiments, the cost of the disclosed membrane is similar to that of conventional RO/NF membranes. In embodiments, the polymer starting materials utilized are inexpensive (comparable to industry standard) and either commercially available or readily made on tens of grams scale.

Current costs for reverse osmosis systems range from $1 to $3 per 1000 gallons of delivered water. Between 30 to 60% of that cost is in either membrane replacement or pre-treatment of the feed water to lower membrane cleaning and replacement costs. Current membranes can tolerate about 500 to 2,000 ppm-h of chlorine and a design decision is made where pretreatment costs versus membrane replacement costs are optimized for each system. The other 40 to 70% of water production costs are due to capital cost recovery and operating power costs which include primarily the water pumping costs. Each installation has a different tradeoff. The use of the disclosed membranes may have economic benefits due to longer membrane life and/or lower pre-treatment costs. Because of higher flux, the use of the disclosed membranes enables lower energy usage (pumping costs). In embodiments, the cost per square foot of the disclosed membrane is comparable to current materials. Since the flux through the disclosed membrane can be significantly higher (5× or so) than through conventional membranes, the number of pressure vessels can be significantly reduced; this could reduce capital costs.

D. Mechanical Stability

In embodiments, the disclosed semipermeable membrane has good mechanical stability. In embodiments, the disclosed membrane is tolerant of intermittent or abusive use (abrupt pressure and/or flow changes), as further discussed in Example 17 hereinbelow.

E. Operable pH Range

In embodiments, the disclosed membrane is stable for use over a pH range of from about 2 to about 11. In embodiments, the stability to pH extremes is comparable to conventional technology, as discussed in Example 4 hereinbelow.

F. Fouling Resistance

In embodiments, the resistance of the disclosed semipermeable membrane to fouling is comparable to current technology, as discussed further in Example 16 hereinbelow.

G. Thermal Stability

In embodiments, the thermal stability of the disclosed semipermeable membranes is greater than conventional polyamide membranes. In embodiments, the disclosed membranes are stable to temperatures greater than 55° C. In embodiments, the disclosed membranes are stable to temperatures greater than 60° C. In embodiments, the disclosed membranes are stable to temperatures greater than 70° C. In embodiments, the disclosed membranes are stable to temperatures greater than 80° C. In embodiments, the disclosed membranes are stable to temperatures greater than 90° C. In embodiments, the disclosed membranes are stable to temperatures greater than 100° C. In embodiments, the disclosed membranes are stable to temperatures greater than 110° C. In embodiments, the disclosed membranes are stable to temperatures greater than 120° C. In embodiments, the disclosed membranes are stable to temperatures greater than 130° C. In embodiments, the disclosed membranes are stable to temperatures greater than 140° C. In embodiments, the thermal stability of the disclosed membranes enables the use of sterile processing, heat sterilization, and/or high temperature separations, as discussed in Example 20 hereinbelow.

H. Storage

In embodiments, the disclosed semipermeable membranes have a shelf life greater than one year. In embodiments, the disclosed membranes have a shelf life greater than 2 years, as discussed in Example 20 hereinbelow.

I. Water Permeation Rates

In embodiments, the disclosed membranes have higher water flux than nanofiltration membranes and up to 1.5 orders of magnitude higher flux than conventional RO membranes. In embodiments, the disclosed membranes have water permeation about 8 times greater than conventional membranes.

In embodiments, the composite semipermeable membrane of the present disclosure has a water permeability greater than about 0.1 gfd/psi. In some embodiments, the composite semipermeable membrane has a water permeability greater than about 1 gfd/psi.

In embodiments, recovery rates are as much as 50% greater than current industry specifications for spiral-wound filter modules.

In embodiments, the disclosed semipermeable membranes have water permeation rates 15-20% greater than conventional membranes at low pressures while maintaining salt rejection for NF applications (for example, nearly 10% recovery at 75 psi, >99% SO$_4^{2-}$ rejection).

In embodiments, the disclosed polyamide semipermeable membranes minimize chlorine degradation while maintaining high water flux and salt rejection J. Membrane Thickness In embodiments, the composite membrane is between about 0.3 μm and about 1.2 μm thick as shown by scanning electron microscopy (SEM) images in FIG. 5. The substrate in this example is an asymmetric microporous polysulfone ultrafiltration membrane.

K. Membrane Surface Morphology and Fouling

Figure 5:
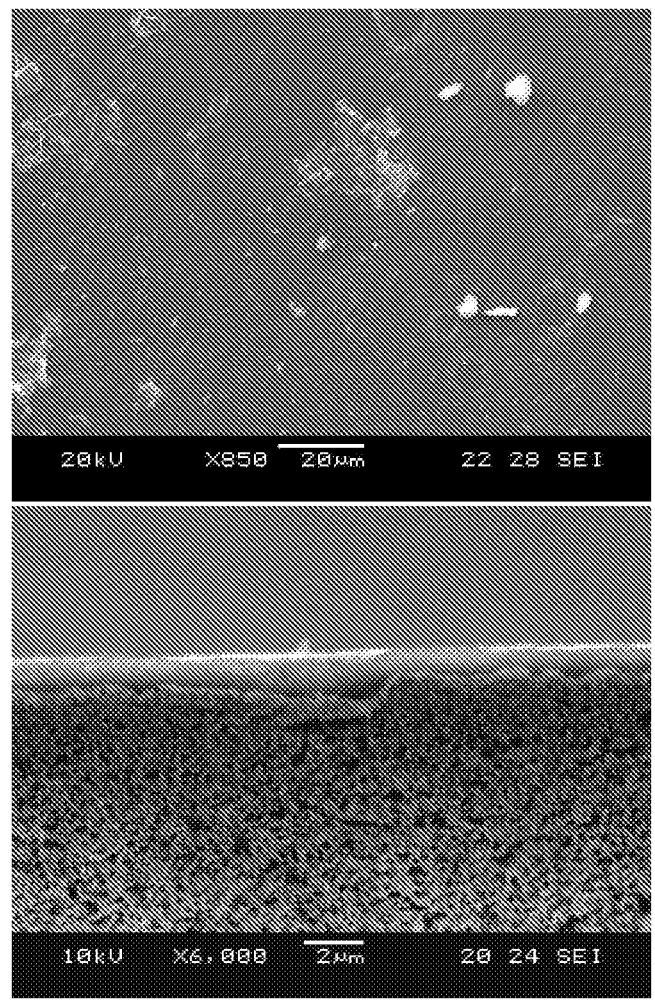
FIG. 5 shows SEM images of surface (upper) and cross-section (lower) portions of disclosed TFC membrane.

In embodiments, the composite membrane is relatively smooth in surface morphology as shown by scanning electron microscopy (SEM) images in FIG. 5. The substrate in this example is an asymmetric microporous polysulfone ultrafiltration membrane.

The SDI is calculated by the following equation:

$$SDI=[100(1-\text{final flow rate/initial flow rate})]/\text{total time} \quad (1)$$

In embodiments, the disclosed membranes have superior fouling resistance when compared with industry standard materials. In embodiments, the disclosed membranes are safe to use with a feed solution SDI of 5 or less, as further discussed in Examples 12 and 16 hereinbelow.

L. Uses

In embodiments, the disclosed semipermeable membrane is suitable for use in an application selected from reverse osmosis, nanofiltration, pervaporation, gas separations and catalytic membranes for use in filter plants and membrane reactors for desalination, water purification, waste water treatment, chemical separations, gas separations, dairy processing, food and beverage processing, pharmaceuticals production, chemicals production, biofuels production, and environmental remediation, and combinations thereof. In embodiments, the disclosed membrane is useful for reverse osmosis seawater desalination.

The durable membrane technologies disclosed herein will benefit a number of industries including chemical, petrochemical, semiconductor, food and dairy, pharmaceutical, and environmental remediation.

The immediate needs for these applications are greater water permeability, greater stability to strong oxidizers and cleansers, greater resistance to fouling, greater mechanical stability to withstand pressure cycling, and greater thermal stability to allow for heat sterilization, all while maintaining salt rejection performance.

In embodiments, the membranes will be useful for non-traditional process and separation applications with conditions too harsh for current semipermeable membrane technology; such applications include, but are not limited to, reactive gas separations, higher temperature separations, catalyst recovery, remediation activities, and bioreactor separation processes.

In embodiments, the herein disclosed oxidatively stable cation rejecting, or anion perm-selective membrane, will be useful for, in addition to filtration applications, applications including electrodialysis and certain membrane reactors for electrolytic hydrogen peroxide generation.

IV. Method

A. General

Herein disclosed is a method of making a composite semipermeable membrane. The thin film deposition process follows the general procedure for interfacial polymerization. In interfacial deposition, amine starting materials in one phase (solid or liquid) are reacted with amine reactive reactant starting material contacted in a separate phase. The disclosed method comprises: coating a porous support with an anhydrous solution comprising an anhydrous solvent, a polyfunctional secondary amine and a pre-polymer deposition catalyst, so as to form an activated pre-polymer layer on said porous support; and contacting said activated pre-polymer layer with an anhydrous, organic solvent solution comprising a polyfunctional amine-reactive reactant so as to interfacially condense said amine-reactive reactant with said polyfunctional secondary amine, thereby forming a cross-linked, interfacial polyamide layer on the porous support. Experimental apparatus and description of membrane formation is further elaborated in Example 1 hereinbelow. Experimental results are tabulated in Example 2 and further discussed in the Examples which follow.

The method minimizes or eliminates potential failure mechanisms for composite membranes including solvent degradation of substrates (embrittlement, loss of porosity), leaching of non-polymeric additives from substrates into the polyamide membranes (contamination) during deposition, and concentrating non polymeric compounds from the substrates at the substrate-polymer film interface (poor adhesion).

In embodiments, the disclosed membrane fabrication process follows standard interfacial polymerization processes for commercial polyamide composite RO membranes. In embodiments, existing commercial processes for interfacial polymerization may be readily adapted for the production of the disclosed semipermembranes, thus making transformation to this new membrane economically desirable.

The deposition process is generally carried out by deposition of amines onto a substrate and reacting the amines with acid chlorides to form the polymer membrane on the surface of the substrate. Typically, growth of the polymer into the substrate pores mechanically anchors the thin film in place.

Figure 6:
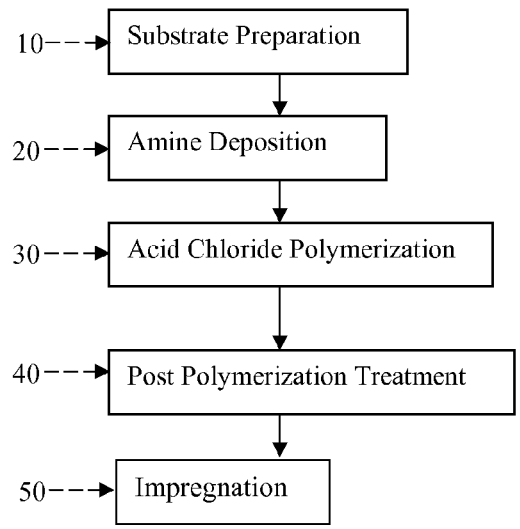
FIG. 6 is a flow diagram of the interfacial deposition process.

FIG. 6 is a flow diagram of the membrane deposition procedure. At 10, a substrate is prepared for deposition of amine thereon.

B. Substrate Preparation

Herein disclosed is a method for producing a composite semipermeable membrane comprising: a porous support, and the disclosed polyamide membrane on the porous support. In embodiments, the substrate is microporous. In embodiments, porous support comprises a polymer from the group consisting of polysulfone, polyethersulfone, polyvinyldifluoride, polytetrafluoroethylene, polyamide, polyimide, and polycarbonate. In some embodiments, the porous support comprises a ceramic selected from the group consisting of silica, alumina, aluminosilicate, zirconia, titania, and combinations thereof.

In embodiments, between the polyamide membrane and the substrate is increased by surface activation of the substrate to prevent delamination during intermittent use at high operating pressures (~800 psi). In embodiments, substrate preparation for amine deposition thereon is essentially alcohol-free. It has been discovered that the elimination of alcohol during substrate preparation leads to a membrane having a greater flux. In some embodiments, the substrate comprises a fluorinated polymer substrate. Such fluorinated polymer substrates may be desirable, for example, to produce organic solvent/vapor stable membranes.

In embodiments, the support comprises polysulfone. Polysulfone compounds are conventionally employed as membrane supporting substrates due to good pore-forming capabilities, strength and wear-resistance, biocompatibility, and chemical inertness to compounds such as bleach, disinfectants, and salt solutions.

In embodiments, the disclosed polyamide (semipermeable polymer formulations and synthesis thereof) is used for thin film composite (TFC) membranes. In embodiments, the TFC membrane is in planar or flat sheet form suitable for configuration in plate-and-frame membrane stacks or spiral-wound filtration cartridges. In embodiments, the polyamide is used for hollow-fiber thin film composite membranes. Membranes can be deposited onto a wide variety of microporous substrate materials.

The amount of amine deposited onto the substrates depends on the porosity and substrate type. Substrate preparation may provide a favorable surface onto which the amines may deposit and/or remove excess non-polymeric residue from the substrate manufacturing process to promote a uniform and consistent coverage of amines. In embodiments, the substrate preparation is selected from, for example, exposure of the substrate to UV/ozone, soaking in alcohol followed by water soak, water soak, and combinations thereof. In preferred embodiments, substrate preparation is undesirable.

C. Amine Deposition to form Activated Pre-Polymer Layer

At 20, amine is deposited onto the substrate. Amine deposition is carried out without water, and the conventional hydrated amine layer is not desired. Moisture is excluded from the deposited amines prior to and during the polymerization reaction.

Variables that impact membrane deposition parameters and the resulting membrane performance include the porosity, pore structure, hydrophilicity, or additives/stabilizers of the substrate used, amine solution contact time, amine solution concentration, binary/ternary amine combination and ratios, solvent system, and amine coat drying time and gas purge flow rate.

Starting materials are dissolved in the respective solvents in concentrations of percent weight to volume (% wt/v). In embodiments, the anhydrous solution of (i) comprises amines are typically in the range of 0.1-3% wt/v.

The amount of amine deposited, the composition of the deposited amines, the pre-polymer amine deposition state, additives in the substrate all have a strong influence on the outcome and membrane performance. The amine deposition solution concentration and contact time with the substrate control the amount of amine deposited onto a given membrane substrate. The amount of amine is important to substrate surface coverage and stoichiometry of the polymerization reaction (as discussed further in Example 11 hereinbelow). Too much amine deposition may result in incomplete reaction/polymerization with acid chlorides while too little amine results in incomplete surface coverage.

In embodiments, the anhydrous solution of (i) comprises amines in THF/hexane. The anhydrous solution should allow good solubility of amines, anhydrous conditions, and preclude or minimize extraction of substrate additives and stabilizers into or under the formed amine layer. The strength of the solvent system in (i) may be adjusted by the THF:hexane ratio to assist in amine deposition (adjust solubility) and preserve the integrity of the substrate (prevent dissolving of the polymer, collapsing the pore structure or extracting stabilizers). In embodiments, alcohols are not present during the deposition process. This has been found to increase mechanical stability and increase (by about four times) the permeate flux of the resulting membrane. Alcohols such as methanol and ethanol proved to be detrimental to the substrate integrity (leading to membrane failure due to cracking or rupturing of the substrate and/or delamination), extracted water-soluble substrate additives and did not allow the proper amine pre-polymer state to be fully preserved for polymerization.

The reactive polyfunctional secondary amines employed to form the disclosed membranes are not conventionally used because they are not water soluble, and conventional practice uses aqueous amine solution. The anhydrous solution of (i) comprises non-aqueous and non-alcoholic solvents. This breakthrough in using non-traditional solvent media also avoids extracting water/alcohol soluble additives (plasticizers) from the microporous substrates, which contaminate the polymer, degrade performance and reduce thin film-substrate adhesion. Extraction of additives and/or stabilizers from the microporous substrates along with exposure to alcohols (methanol, ethanol) was found to degrade the mechanical stability and pore structure of the substrates making them more delicate and less porous. As such, the herein disclosed method comprises the use of non-aqueous solvent systems with lower solvating strength avoids these issues.

In embodiments, the amine solution is contacted with the substrate surface for an amine contact time sufficient for deposition of the amine thereon. In embodiments, the amine contact time is in the range of from about 5 to about 15 minutes. In general, for a given substrate polymer type, polysulfone (PS) or polyethersulfone (PES), the pore size influences the amount of amine deposited or absorbed. For example, approximately the same amount of amine (at the same concentration) deposits on a PS substrate with 60 k Dalton molecular weight cutoff (MWCO) porosity in about half the exposure time the same amount of amine is deposited onto a 30 k Dalton MWCO PS substrate. The same trend was observed for PES substrates.

The amount of amine deposited or absorbed also depends on the substrate polymer type. The difference in pore structure may influence the capillary effect of drawing amine deposition solution into the membrane pores. For example, more open PES sub-surface porosity may have a weaker capillary effect relative to PS membranes. Additionally, substrate surface hydrophilicity may affect the amine deposition. The contact angle, which is a relative measure of surface hydrophilicity, of PS is nearly 10 degrees greater than the contact angle of PES. The polyfunctional secondary amines in (i) have low solubility in water and may be less attracted to hydrophilic surfaces. They are soluble, however, in alcohols and the same trends are observed. In embodiments, the contact angles for the disclosed polyamide membrane surfaces are in a range similar to that of PS substrate.

Following amine deposition, residual amine solution is drained from the membrane. This draining is done under anhydrous conditions.

In embodiments, following amine deposition onto the substrate, the activated pre-polymer layer (amine coat) is dried. In embodiments, the method further comprises comprising drying the activated pre-polymer layer, partially or completely, in the absence of water vapor prior to contacting the activated pre-polymer layer with the anhydrous, organic solvent solution.

The amine coat drying step has an important influence on how the polymerization reaction proceeds (see Example 19 hereinbelow). Too much or too little drying may reduce the performance of the final membrane. In embodiments, drying is moisture-free to prevent hydrolysis of the amine coating's pre-polymer state. In embodiments, amine coat drying is performed under inert gas purge. In embodiments, amine coat drying is performed under argon purge. In embodiments, amine coat drying time is from about 2 to about 10 minutes. In embodiments, a volume of argon is passed over the amine coated membrane during amine coat drying. In embodiments, the volume of purge gas is from about 1 L to about 6 L at standard temperature and pressure. In embodiments, the inert gas purge volume is passed over the membrane at a lower flow rate for a longer time; alternatively, the inert gas purge volume is passed over the amine coated membrane at higher flow for shorter time. In embodiments, amine deposition is conducted in a single deposition frame with virtually all air exposure eliminated between deposition steps.

D. Acid Chloride Deposition/Polymerization

Referring again to FIG. 6, at 30 is acid chloride polymerization. In embodiments, acid chloride solution comprises acid chlorides in the range of from about 0.1% to about 2% wt/v in anhydrous organic solvent. When more than one amine or acid chloride is used in a respective solution the ratio of one starting material to another is given in wt %. In embodiments, the acid chloride solution comprises acid chloride in THF/hexane mixture. The acid chloride solution is contacted with the amine coated membrane for an acid chloride contact time sufficient for complete reaction to take place. In embodiments, the acid chloride contact time is in the range of from about 2 minutes to about 5 minutes.

In embodiments, the acid chloride solution concentration is kept above a minimum value. Below this critical concentration the polymer quality and performance declines. In embodiments, the acid chloride solution comprises a slight excess of acid chloride and reaction rate is controlled by the solvent ratios (discussed below). A deficit of acid chloride results in non-uniform areas of the deposited membranes that are very susceptible to chlorine degradation. These areas are rapidly visualized by immersing a membrane to a bleach solution for 30-60 min. (see Example 12 hereinbelow). The chlorine-oxidized areas turn pink in color indicating an excess of unreacted amines present. This can be used as a diagnosis for the uniformity of membrane polymerization.

In embodiments, following polymerization, residual solution is drained from the membrane.

E. Post Polymerization Treatment

As shown in FIG. 6, in embodiments, the polymerized membrane undergoes post-deposition (hereinafter PD or post-polymerization) treatment 40.

In embodiments, post deposition treatment 40 further comprises a post drying/annealing. This post drying/annealing may be beneficial for allowing the polymer crosslinking reactions to complete (see Example 19 hereinbelow). In embodiments, the method for making a composite semipermeable membrane further comprises drying the semipermeable membrane. In embodiments, the PD drying temperature is a temperature below about 50° C. In embodiments, PD treatment comprises PD drying for a PD drying time. In embodiments, PD drying is performed under moisture-free conditions. In embodiments, the PD drying time is in the range of from about 0 minutes to about 5 minutes. In embodiments, PD drying is performed under inert gas. In embodiments, PD drying is performed with argon. Post-polymerization treatment may further comprise, following PD drying, PD rinsing of the PD dried membrane. In embodiments, PD rinsing comprises rinsing the membrane in an alcoholic solution. In embodiments, the alcoholic solution comprises alcohol; alternatively, the alcoholic solution comprises alcohol/water. In embodiments, the method further comprises rinsing the composite semipermeable membrane in an aqueous solution comprising a polyalcohol and/or a polyetheralcohol. In embodiments, alcohol washing removes excess amines, particularly from the back side of the membrane to which it may have permeated during amine deposition. In embodiments, the resulting membrane is soaked in water. In embodiments, PD treatment comprises rinsing the composite semipermeable membrane in an aqueous solution having a pH in the range of from about 4 to about 11.

In embodiments, water exposure during post deposition treatment serves to maintain high salt rejection and permeation. Without wishing to be limited by theory, soaking in an aqueous alcohol solution may provide a stabilization effect that prevents collapse of the polyamide pore structure as the polyamide membrane desolvates upon drying.

In embodiments, post deposition treatment of the semipermeable membranes enables long term storage and prevents loss of performance, as discussed further in Example 19 hereinbelow. In embodiments, post treatment method for storage comprise a 4-6 hour soak in a 10% (by vol.) glycerol/water solution followed by air drying. Again without wishing to be limited by theory, glycerol appears to help to stabilize the membrane and prevents depletion of the substrate's stabilizing glycerol content. In embodiments, the membrane is exposed to glycerol and serves as a pore stabilizer during storage. Glycerol is immiscible with THF/hexane solvent mixtures and works well as the amine deposition solvent. In embodiments, glycerol is removed from the substrate prior to amine deposition.

F. Nanoparticle Impregnation

In embodiments, as shown in the flow diagram of FIG. 6, the semipermeable membranes are impregnated at 50 with small particles, e.g. metal or metal oxide nanoparticles. The nanoparticle impregnated membranes can be used for filtration or as catalytic membranes for chemical production or transformations.

Current state of the art membranes do not have the stability to survive impregnation and production processes and membrane reactor conditions demonstrated under both highly oxidizing and reducing conditions.

Disclosed herein is a method of impregnating a composite semipermeable membrane with nanoparticles. In embodiments, the semipermeable membrane is impregnated with a metal selected from gold, platinum, palladium, and combinations thereof. The method of impregnating the semipermeable membrane comprises diffusing a nanoparticle precursor in liquid solution or vapor state into the composite semipermeable membrane; rinsing excess nanoparticle precursor from the composite semipermeable membrane with a solvent; and thermally converting the nanoparticle precursor to solid nanoparticles in the presence of an inert, reducing, or oxidizing atmosphere. In embodiments, the nanoparticles are heavy metals, oxides of heavy metals or combinations thereof. In embodiments, an impregnated membrane of the present disclosure is suitable as a seawater desalination membrane with superior water permeability. In embodiments, the impregnated membrane comprises platinum. In embodiments, other metals, or preferably stable metal oxides are used rather than platinum. For example, the use of zinc oxide may provide better charge exclusion effects, be less expensive, and non-toxic, while immobilized copper oxide provides biocidal benefits reduce or prevent biofouling of the membranes. In embodiments, semipermeable membranes comprising other metal oxides, such as copper oxide, are produced.

In embodiments, the nanoparticle precursor is in liquid solution and the liquid solution comprises water, alcohol, organic solvent, or a combination thereof. In alternative embodiments, the nanoparticle precursor is in a vapor state, and the vapor state comprises elevated temperature, reduced pressure, or a combination thereof. In embodiments, rinsing excess nanoparticle precursor from the composite semipermeable membrane comprises rinsing with a solvent selected from water, alcohol, organic solvent, and combinations thereof.

In embodiments, the metal oxide precursor is a water-soluble metal ion complex that can permeate the membrane pores. In embodiments, the metal oxide is zinc oxide, which is inexpensive, non-toxic and relatively stable. In embodiments, the precursor is zinc acetate dihydrate. In embodiments, the precursor is zinc sulfate heptahydrate. In embodiments, the precursor metal salt is dissolved in water at molar concentrations of from about 0.01M to 0.1M and contacted with the polyamide surface of the membrane using a two-chamber impregnation cell. The impregnation cell comprises two recessed plates between which a planar membrane is sealed with planar rubber gaskets. The recessed plates act as isolated fluid chambers disposed on either side of the membrane faces. Each fluid chamber has an inlet and outlet to allow the addition and removal of fluids. In embodiments, precursor solutions fill the first chamber in contact with the polyamide side. In embodiments, deionized water fills the second chamber on the substrate side. In embodiments, the membrane is left in the impregnation cell for a time in the range of from about 2 h to about 4 h. In embodiments, the membrane is left in the impregnation cell for a time in the range of from about 1 h to about 2 h. In embodiments, following impregnation, the membrane is removed from the impregnation cell. In some embodiments, the impregnated membrane is washed to remove bulk salt (e.g., zinc salt) from the surfaces and substrate. In embodiments, the impregnated membrane is washed with water. In embodiments, the washed metal impregnated membrane is air dried prior to metal reduction.

In embodiments of the method of impregnating a composite semipermeable membrane with nanoparticles, thermally converting the nanoparticle precursor to solid nanoparticles comprises heating the nanoparticle precursor by convection, induction, radiation, microwave radiation, radio frequency radiation, or a combination thereof.

In embodiments, the impregnated membrane is calcined under dry conditions at moderate temperature (below 160° C.) to form metal oxide particles in-situ. In embodiments, the reduction temperature is in the range of from about 130° C. to about 150° C. In embodiments, the reduction temperature is in the range of from about 140° C. to about 150° C. The process may be monitored by energy dispersive X-ray (EDX) elemental analysis. In embodiments the nanoparticle impregnated membrane is thermally reduced under dry hydrogen atmosphere. In embodiments, the 5% hydrogen (balance may be Ar) is used for thermal reduction. In embodiments, 10% hydrogen is used. In embodiments, the impregnated semipermeable membrane is reduced under air.

In embodiments, the temperature is ramped to a reduction temperature over a ramp time. In embodiments, ramp time is from about 1 hour. In embodiments, following ramp up to reduction temperature, the membrane is held at reduction temperature for a reduction time. In embodiments, the reduction time is about 3 hours. In embodiments, the membrane is cooled down under hydrogen or inert gas. In embodiments, the progress of the thermal reduction is visually followed by increase in membrane depth of color.

V. Examples

Example 1

Membrane Fabrication

Figure 7:
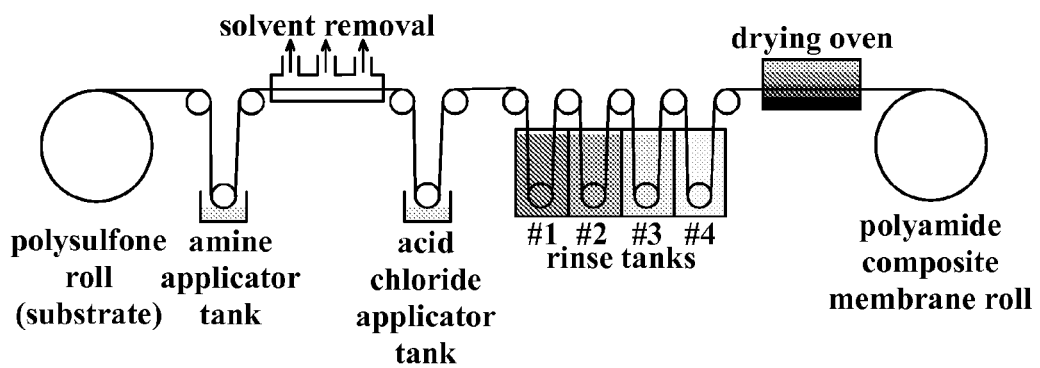
FIG. 7 is a schematic of an automated composite membrane deposition process.

Thin film composite membrane samples were made for cross-flow filtration and chlorine tolerance testing following the disclosed method for interfacial polymerization on a microporous substrate. The deposition process emulates the general approach for large-scale thin film composite membrane fabrication which is illustrated in FIG. 7. Substrate 110, for example polysulfone, is fed to amine applicator tank 120. Solvent removal 130 is performed prior to entering acid chloride applicator tank 140. The substrate is rinsed at 150 by, for example, a series of rinse tanks #1, #2, #3, and #4. Following rinsing 150, drying is effected in one or more drying ovens 160. The polyamide composite membrane 170 may be rolled as shown in FIG. 7.

Flat sheet membrane samples for this program were fabricated using a deposition chamber apparatus. The deposition frame consists of an aluminum base plate and hinged pressure plate. Between the plates is clamped the polypropylene deposition chamber, which consists of a flat backing with alignment pins and a recessed top chamber plate with an inlet and outlet on either end. A 14 cm×19 cm microporous substrate was mounted on the deposition chamber base and a gasket placed on top to seal against the top chamber plate around the entire edge of the membrane substrate. Substrates used include polysulfone, polyethersulfone and polyvinyldifluoride ultrafiltration membranes purchased from GE-Osmonics. The gasket also confined the area of polymer deposition to the substrate surface. The recessed deposition chamber plate is placed on top and had a volume of approximately 260 mL. A second version was made from 316 stainless steel, which allowed the deposition chamber to be combined with the pressure plate design (no separate deposition chamber). Deposition solutions were added into the deposition chamber through the bottom inlet port under argon or dry air at a constant rate from an addition funnel. The chamber was held vertically and solutions filled and drained through the bottom port of the chamber. Filling and draining solutions simulated a continuous roller tank casting process as illustrated in FIG. 7. Argon purge was used for drying steps. The membrane could be dried in between solution deposition steps without opening the deposition frame by purging with a dry gas at a set flow rate. Only the top surface of the membrane substrate was coated with the polyamide thin film. All deposition and drying steps were carried out at room temperature as outlined here. The general procedure is outlined below:

Amine Deposition
Add amine solution (0.5-3% wt/v in THF/hexane mixture).
Solution left in contact with the membrane surface for 5-15 min.
Drain solution, briefly crack cell open to drain residual liquid.
Dry Step
Argon purge for 2-10 min.
The dry step is moisture-free to prevent hydrolysis of amine coating's "pre-polymer" state.
Acid Chloride Deposition/Polymerization
Add acid chloride solution (0.2-2% wt/v in THF/hexane mixture).
Solution is left in contact with the amine-coated surface for 2-5 min.
Drain solution.
Post-Treatment Step
The "green" membrane is dried for a specific amount of time under argon and washed with methanol/water and soaked in water.

Example 2

RO Membrane Testing

Membranes were fabricated numerous times (more than 700 total) and nearly all of these were laboratory tested in cross-flow filtration apparatus for desalination, chemical separations, metal ion filtration, and catalytic production of hydrogen peroxide directly from oxygen and hydrogen in a catalytic membrane reactor.

Membrane performance is typically characterized in terms of water flux and impurity rejection. Water flux is the rate of water volume per unit membrane area, and rejection is the relative change in impurity solute concentration from the feedwater stream to the permeate stream. Water permeation is driven by a pressure differential across the membrane greater than the osmotic pressure. Impurity rejection or membrane selectivity is measured as the rejection coefficient, $R=[1-(C_p/C_f)] \times 100\%$, where $C_p$ is the solute concentration of the permeate and $C_f$ is the solute concentration of the feed solution.

Figure 8:
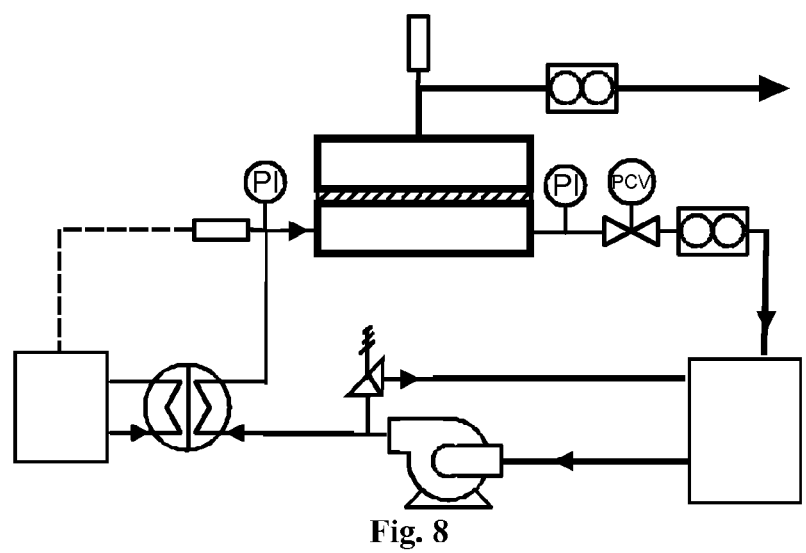
FIG. 8 is a picture of an automated cross-flow filter membrane test system.

The performance testing of membranes, with 155 cm² active membrane area, was carried out to determine performance characteristics of polymer formulations and verify the polymer deposition process. Membrane performance was determined by standard salt rejection performance testing used for reverse osmosis and nanofiltration membranes. A planar cross flow membrane cell, Sepa CF™ membrane cell from GE-Osmonics, was used to test filter performance under conditions similar to that encountered in a spiral-wound configuration. FIG. 8 is a schematic of the automated cross-flow filtration test system 200. Feed solution 290 from feed solution reservoir 230 was pumped with feed pump 330 as stream 295 into cross flow membrane filter press 220. Cross flow membrane filter press 220 comprised two cross flow membrane filter cells 221 and 222 and membrane 225 to be tested. Pressure relief valve 300 and recycle stream 310 were used to maintain desired pressure of the feed solution. Pressure indicator 245 and 246 and pressure control valve 275 were used to maintain desired pressure in cross flow membrane filter press 220. Filter press 220 was automated with flow, pressure, conductivity and temperature sensors interfaced with a computer for continuous monitoring were employed for membrane testing. Flow meters 265 and 280 were used to measure the flow of the permeate 260 and the filtrate 285, respectively, from filter press 220. Conductivity probe 255 was used to measure the conductivity of permeate 250. Overall salt rejections were continuously monitored with a flow-through conductivity cell 265 in the permeate line. Leak sensors were interfaced with the power distribution module for safety shutdown. A computer controlled chiller/heater unit 210 maintained the temperature via heat exchanger 340 and thermocouple 240 which was used to determine the temperature of inlet feed stream 296.

Membranes salt rejection performance was tested for NaCl, $MgSO_4$, $CaCl_2$, and $CuSO_4$. Rejection of hydrophilic molecules was examined with hydrogen peroxide ($H_2O_2$) and ethanol. Testing for chlorine tolerance was conducted on the disclosed membranes and on commercial polyamide RO membranes under the same conditions for direct comparison. Rejection versus feed flow velocity and pressure was determined and the effect of pH was examined to determine the safe pH range for the new membranes. The silt density index (SDI) was also determined for the disclosed membranes with humic acid and cheese whey to determine the maximum level of turbidity that could be accommodated without continual loss of permeate flux.

The high pressure filter cell system in FIG. 8 delivers a feed flow rate of ~6.4 L/min (50-800 psi) or a linear face velocity of approximately 0.68 m/s with a 65 mil (1.65 mm) feed spacer. The low pressure filter system had a maximum feed flow rate of ~6.0 L/min (at 200 psi) or a linear face velocity of 0.64 m/s (65 mil feed spacer). The feed spacers in both systems can be changed to 34 mil (0.86 mm) to nearly double the flow velocity for lower feed flow rates. (A 32 to 36 mil feed spacer is standard in spiral wound RO filter modules.) The feed spacer induces turbulence in the feed flow across the membrane to reduce concentration polarization and fouling. High pressure feed lines were Teflon™ lined braided stainless steel hose with stainless steel (316 alloy) NPT fittings rated to 2000 psi. All other wetted parts were either 316 stainless steel, Nylon™, polypropylene, Kynar™, carbon (graphitic), Viton™, or EPDM rubber.

Overall salt rejections were continuously monitored with a flow-through conductivity cell in the permeate line and permeate was returned to the feed solution reservoir to maintain constant concentration. Digitally controlled chillers were used to maintain constant feed temperature (±0.1° C.) with a 316 stainless steel heat exchange coil immersed in the feed reservoir. Individual ion rejections were determined by standard titration, colorometric, or turbidity analysis methods purchased from Hach, Inc. Individual ions monitored were $Cl^-$, $SO_4^{2-}$, $Mg^{2+}$, $Ca^{2+}$ and $Cu^{2+}$.

Standard membrane performance test experiments used feed solutions of 2000 ppm (mg/L) NaCl (pH~6.8), 2000 ppm $MgSO_4$ (pH~5.4-6.2), 2000 ppm $CaCl_2$, and 200 ppm $CuSO_4$ in $H_2SO_4$ (pH 5.1) typically circulated at hydrostatic pressures of 200, 400 and 600 psi at a constant temperature of 20° C. Seawater (Instant Ocean™ salt water mix) at 40,000 ppm (4% salinity) was also used as a feed solution. Solutions of $H_2O_2$ (8,000 ppm, 0.80 wt %) and ethanol (10 wt %) were tested with and without a salt. The test range of hydrostatic feed pressures was sometimes expanded to 50-800 psi.

The results of membrane testing are tabulated in Table 2. A review of the membranes formed from the different formulations (Examples 3-10), formation conditions (Examples 11-14 and 19) along with membrane performance to chlorine tolerance (Example 15), salt rejection (throughout examples), harsh conditions (Example 16-17 and 20), and permeability constants (Examples 18) are discussed in the examples which follow.

TABLE 2

Summary of Membrane Formulation and Test Results. (Tested at 200 psi unless otherwise noted.)

| Sample No. | Diamine | Solution Conc. (wt/vol) | Acid Chloride | Solution Conc. | $SO_4^{2-}$ ($Cl^-$) Rejection (%) | $Mg^{2+}$ ($Na^+$) Rejection (%) | Total Salt Rejection (%) | Permeate Flow Rate (mL/min) |
|---|---|---|---|---|---|---|---|---|
| 280-BTAC-RRR | DAE/DPG + Piperazine | 0.7% (0.5:0.5) + 0.18% | BTAC | 0.30% | 99.7 | 99.0 | 99.4 | 27.5 |
| 280-F89-7 | DAE/DPG + Piperazine | 0.7% (0.5:0.5) + 0.18% | TAC | 0.30% | 97.0 | 96.2 | 96.5 | 31.0 |
| 280-F89-11 | DAE/DPG + Piperazine | 0.7% (0.5:0.5) + 0.18% | TAC + BTAC (50:50 chloride basis) | 0.30% | 79.4 | 94.6 | 85.0 | 36.0 |
| 280-F89-12 | DAE/DPG + Piperazine | 0.7% (0.5:0.5) + 0.18% | TAC + BTAC (50:50 mole basis) | 0.30% | 65.5 | 51.9 | 59.5 | 33.0 |
| 280-F89-13 | DAE/DPG + Piperazine | 0.7% (0.5:0.5) + 0.18% | TAC + BTAC (50:50 mole basis) | 0.30% | 71.4 | 47.4 | 59.0 | 28.0 |
| 280-F89-14 | DAE/DPG + Piperazine | 0.7% (0.5:0.5) + 0.18% | TAC + BTAC (50:50 chloride basis) | 0.30% | 77.8 | 44.9 | 60.0 | 29.0 |
| 280-F89-15 | DAE/DPG + Piperazine | 0.7% (0.5:0.5) + 0.18% | TAC + BTAC (75:25 chloride basis) | 0.30% | 84.6 | 91.9 | 87.0 | 31.0 |
| 280-F89-17 | DAE/DPG + Piperazine | 0.7% (0.5:0.5) + 0.18% | TAC + BTAC (75:25 chloride basis) | 0.30% | 39.3 | 19.7 | 28.0 | 10.0 |

TABLE 2-continued

Summary of Membrane Formulation and Test Results. (Tested at 200 psi unless otherwise noted.)

| Sample No. | Diamine | Solution Conc. (wt/vol) | Acid Chloride | Solution Conc. | $SO_4^{2-}$ ($Cl^-$) Rejection (%) | $Mg^{2+}$ ($Na^+$) Rejection (%) | Total Salt Rejection (%) | Permeate Flow Rate (mL/min) |
|---|---|---|---|---|---|---|---|---|
| 280-F89-19 | DAE/DPG + Piperazine | 0.7% (0.5:0.5) + 0.18% | TAC + BTAC (75:25 chloride basis) | 0.30% | 92.0 | 78.8 | 85.3 | 35.0 |
| 280-F89-21 | DAE/DPT + Piperazine | 0.7% (0.5:0.5) + 0.18% | TAC | 0.30% | 75.9 | 53.0 | 64.0 | 40.0 |
| 280-F89-22 | DAE/DPT + Piperazine | 0.7% (0.5:0.5) + 0.18% | TAC | 0.30% | 76.0 | 77.5 | 76.5 | 24.0 |
| 280-F89-23 | DAE/DPT + Piperazine | 0.6% (0.5:0.5) + 0.18% | TAC | 0.30% | 84.6 | 72.6 | 78.0 | 46.0 |
| 280-F89-24 | DAE/DPT + Piperazine | 0.9% (0.5:0.5) + 0.18% | TAC | 0.30% | 66.7 | 58.5 | 62.0 | 22.0 |
| 280-F89-25 | DAE/DPT + Piperazine | 0.5% (0.5:0.5) + 0.18% | TAC | 0.30% | 100 (70.3$Cl^-$) | 94.8 (54.8$Na^+$) | 97.4 (63.3NaCl) | 41 (40NaCl) |
| 280-F89-26 | DAE/DPT + Piperazine | 0.4% (0.5:0.5) + 0.18% | TAC | 0.30% | 100.0 | 94.9 | 97.5 | 50.0 |
| 280-F89-27 | DAE/DPT + Piperazine | 0.3% (0.5:0.5) + 0.18% | TAC | 0.30% | 100.0 | 95.8 | 97.9 | 44.0 |
| 280-F89-28 | DAE/DPT + Piperazine | 0.3% (0.5:0.5) + 0.18% | TAC | 0.30% | 100.0 | 96.2 | 96.9 | 44.0 |
| 280-F89-29 | DAE/DPT + Piperazine | 0.3% (0.5:0.5) + 0.18% | TAC | 0.15% | 80.8 | 64.1 | 72.0 | 29.0 |
| 280-F89-30 | DAE/DPT + Piperazine | 0.3% (0.5:0.5) + 0.18% | BTAC | 0.15% | 6.9 | 2.6 | 5.0 | 108.0 |
| 280-F89-31 | DAE/DPT + Piperazine | 0.3% (0.5:0.5) + 0.18% | TAC | 0.30% | 98.2 | 93.9 | 96.7 | 36.0 |
| 280-F89-32 | DAE/DPT + Piperazine | 0.3% (0.5:0.5) + 0.18% | TAC | 0.30% | 98.6 | 95.9 | 97.3 | 26.0 |
| 280-F89-33 | DAE/DPT + Piperazine | 0.4% (0.5:0.5) + 0.18% | TAC | 0.30% | 97.9 | 95.5 | 96.4 | 14.0 |
| 280-F89-34 | DAE + Piperazine | 0.7% + 0.18% | BTAC | 0.10% | 3.7 | 75.9 | 9.0 | 124.0 |
| 280-F89-35 | DAE + Piperazine | 0.7% + 0.18% | BTAC | 0.10% | 0.0 | 77.4 | 16.0 | 152.0 |
| 280-F89-36 | DAE + Piperazine | 0.9% + 0.18% | BTAC | 0.10% | 6.9 | 78.3 | 18.0 | 234.0 |
| 280-F89-37 | DAE + Piperazine | 0.4% + 0.18% | BTAC | 0.10% | 0.0 | 79.0 | 16.0 | 278.0 |
| 280-F89-38 | DPG + Piperazine | 0.4% + 0.18% | TAC | 0.10% | 94.2 | 87.0 | 90.6 | 50.0 |
| 280-F89-39 | DPG + Piperazine | 0.9% + 0.18% | TAC | 0.10% | 97.8 | 99.3 | 98.5 | 34.0 |
| 280-F89-40 | DPG + Piperazine | 0.9% + 0.18% | TAC | 0.10% | 91.3 | 76.3 | 83.0 | 43.0 |
| 280-F89-41 | DPG + Piperazine | 0.9% + 0.18% | TAC | 0.10% | 72.7 | 56.4 | 64.0 | 51.0 |
| 280-F89-42 | DPG + Piperazine | 0.4% + 0.18% | TAC | 0.10% | 82.6 | 67.9 | 75.0 | 52.0 |
| 280-F89-43 | DPG + Piperazine | 0.4% + 0.18% | TAC | 0.10% | 84.6 | 65.8 | 75.0 | 51.0 |
| 280-F89-44 | DPG + Piperazine | 0.9% + 0.18% | TAC | 0.10% | 87.0 | 67.9 | 74.2 | 41.0 |
| 280-F89-45 | DAE + Piperazine | 0.7% + 0.18% | TAC | 0.10% | 98.0 | 93.8 | 95.5 | 42.0 |
| 280-F89-46 | DAE + Piperazine | 0.7% + 0.18% | TAC | 0.20% | 98.0 | 91.0 | 94.5 | 19.0 |
| 280-F89-47 | DAE + Piperazine | 0.4% + 0.18% | TAC | 0.10% | 91.7 | 81.0 | 86.0 | 50.0 |
| 280-F89-48 | DAE + Piperazine | 0.9% + 0.18% | TAC | 0.10% | 92.3 | 86.0 | 89.0 | 40.0 |

TABLE 2-continued

Summary of Membrane Formulation and Test Results. (Tested at 200 psi unless otherwise noted.)

| Sample No. | Diamine | Solution Conc. (wt/vol) | Acid Chloride | Solution Conc. | $SO_4^{2-}$ ($Cl^-$) Rejection (%) | $Mg^{2+}$ ($Na^+$) Rejection (%) | Total Salt Rejection (%) | Permeate Flow Rate (mL/min) |
|---|---|---|---|---|---|---|---|---|
| 280-F89-49 | DAE + Piperazine | 0.55% + 0.18% | TAC | 0.10% | 96.0 | 87.8 | 91.9 | 15.0 |
| 280-F89-50 | DAE + Piperazine | 0.55% + 0.18% | 1,3-Benzene disulfonyl chloride | 0.20% | 16.0 | 9.8 | 10.4 | 21.0 |
| 280-F89-51 | DAE + Piperazine | 0.55% + 0.18% | Pyridine dicarbonyl dichloride | 0.20% | 4.0 | 0.0 | 5.0 | 250.0 |
| 280-F89-52 | DAE + Piperazine | 0.55% + 0.18% | Isophthaloyl chloride | 0.20% | 0.0 | 4.9 | 6.0 | 84.0 |
| 280-F89-53 | DAE | 0.55% | TAC | 0.10% | 4.2 | 7.3 | 5.2 | 76.0 |
| 280-F89-54 | DAE + Piperazine | 0.7% + 0.18% | TAC | 0.10% | 54.2 | 36.6 | 47.0 | 31.0 |
| 280-F89-55 | DAE + Piperazine | 0.7% + 0.18% | TAC | 0.10% | 52.2 | 40.5 | 47.0 | 63.0 |
| 280-F89-56 | DAE + Piperazine | 0.7% + 0.18% | TAC | 0.10% | 100.0 | 93.8 | 95.3 | 26.0 |
| 280-F89-57 | DAE + Piperazine | 0.7% + 0.18% | TAC | 0.10% | 93.8 | 86.7 | 90.2 | 32.0 |
| 280-F89-58 | DAE + Piperazine | 1% + 0.18% | TAC | 0.20% | 80.0 | 65.5 | 73.0 | 33.0 |
| 280-F89-59 | DAE + Piperazine | 1% + 0.18% | TAC | 0.30% | 96.0 | 90.7 | 93.3 | 19.0 |
| 280-F89-60 | DAE + DPG Piperazine | 0.7% + 0.7% + 0.18% | TAC + BTAC 75:25 | 0.20% | 80.0 | 63.1 | 71.0 | 14.5 |
| 280-F89-62 | DAE + DPG Piperazine | 0.7% + 0.7% + 0.18% | TAC + BTAC 75:25 | 0.35% | 60.0 | 51.2 | 55.0 | 15.0 |
| 280-F89-63 | DAE + Piperazine | 0.7% + 0.18% | BTAC | 0.10% | 0.0 | 7.1 | 3.5 | 300.0 |
| 280-F89-64 | DAE + Piperazine | 0.7% + 0.18% | TAC | 0.10% | 100.0 | 88.1 | 93.0 | 8.5 |
| 280-F89-65 | DAE + DPT Piperazine | 0.3% + 0.18% | TAC | 0.30% | 100.0 | 97.4 | 98.0 | 31.0 |
| 280-F89-66 | DAE + DPG Piperazine | 0.7% + 0.18% | TAC + BTAC 75:25 | 0.35% | 47.8 | 43.9 | 46.0 | 26.0 |
| 280-F89-67 | DAE | 0.7% + 0.18% | TAC | 0.10% | 39.1 | 29.3 | 34.0 | 90.0 |
| 280-F89-68 | DAE Piperazine | 0.6% + 0.18% | TAC | 0.20% | 78.3 | 62.2 | 70.0 | 24.0 |
| 282-F90-55 | DAE + DPG Piperazine | 1.5% + 0.18% | TAC | 0.30% | 98 @200spi 100@500 psi and above (79.2 Cl⁻, 400 psi) | 92 @200 psi 98 @500 psi and above (54.0 Na⁺, 400 psi) | 95 @ 200 psi 99 @500 psi and above (65.2 NaCl, 400 psi) | 2.2 @ 200 psi 9 @ 600spi (8.5 NaCl, 400 psi) |
| 280-F89-72 | F-DAE + DPG Piperazine | 1.5% + 0.18% | TAC | 0.30% | 8.7 | 12.2 | 10.0 | 192.0 |
| 280-F89-74 | DAE + DPG Piperazine | 1.5% + 0.18% | TAC | 0.30% | 87.0 | 81.2 | 84.0 | 40.0 |
| 236-F6-114 | DAE + DPG Piperazine | | TAC | | 97.8 | 92.2 | 94.5 | 72.0 |

Example 3

TAC/DAE Piperazine (Type ER-HR1)-Effect of Polymerization Catalyst

The TAC+DAE/piperazine formulation (type ER-HR1, High Rejection type 1) gave high NaCl rejections of up to 82% and 10,340 ppm-h of chlorine tolerance (for NaCl rejection) with competitive permeate flux.

Figure 9:
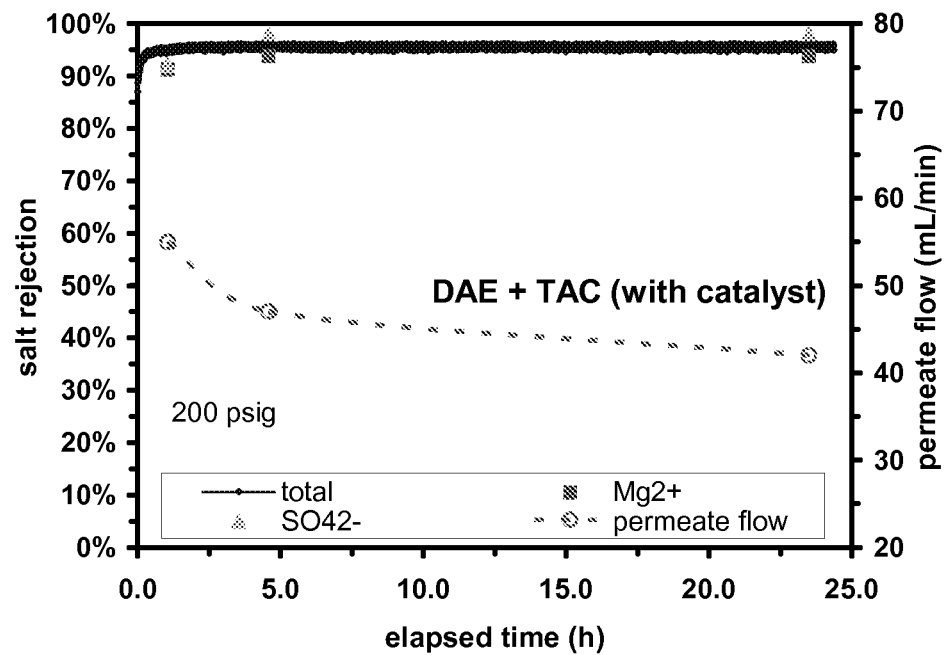
FIG. 9 is a plot of $MgSO_4$ Performance data for the DAE+TAC formulation made with catalyst, F89-45 (upper panel), and without catalyst (lower panel). Feed conditions: 2000 mg/L $MgSO_4$, 20° C., 200 and 600 psig.
Figure 9:
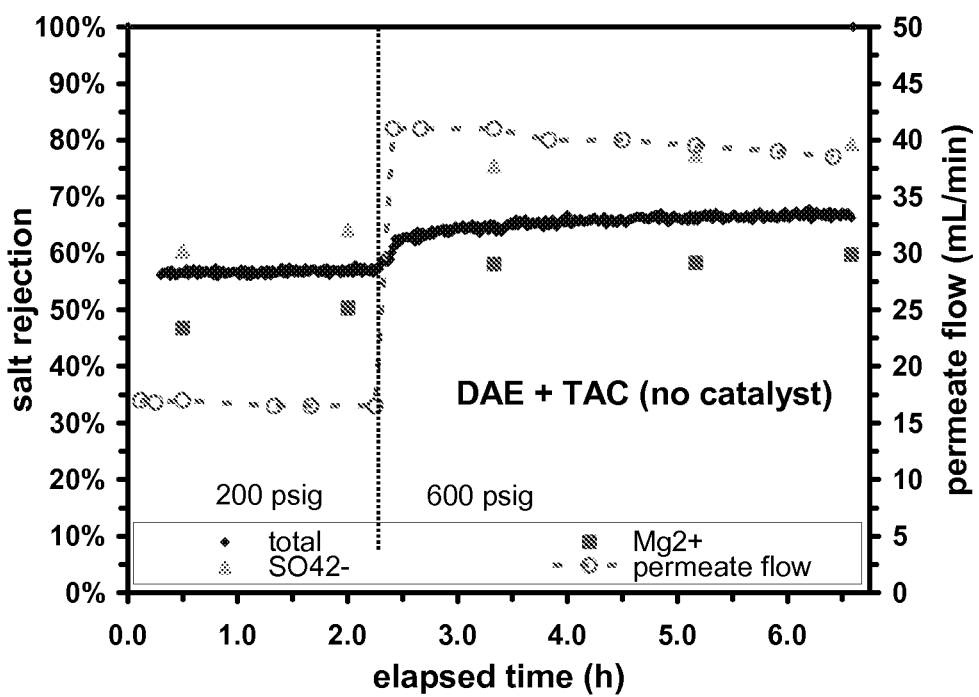

Membranes made using the DAE+TAC formulation showed the catalytic role halogens play in promoting the polymerization reaction as discussed earlier. FIG. 9 is a plot of MgSO$_4$ Performance data for the DAE+TAC formulation made with catalyst, F89-45 (upper panel), and without catalyst (lower panel). Feed conditions: 2000 mg/L MgSO4, 20° C., 200 and 600 psig.

The results in FIG. 9 show a comparison of filter performance between membrane F89-45 produced with bromine catalyst and a DAE+TAC membrane made without bromine catalyst. Average salt rejection values (from continuous conductivity meter monitoring) are given as the high-density data points while separate analysis of individual ion rejection for Mg$^{2+}$ and SO$_4^{2-}$ are given as the labeled points. The salt rejection values are clearly greater for the membrane made with bromine catalyst. Permeate flow rate was significantly greater for F89-45 at 200 psig feed pressure compared to the previous membrane at 600 psig feed pressure (at 200 psig permeate flow was only 16 mL/min).

Figure 10:
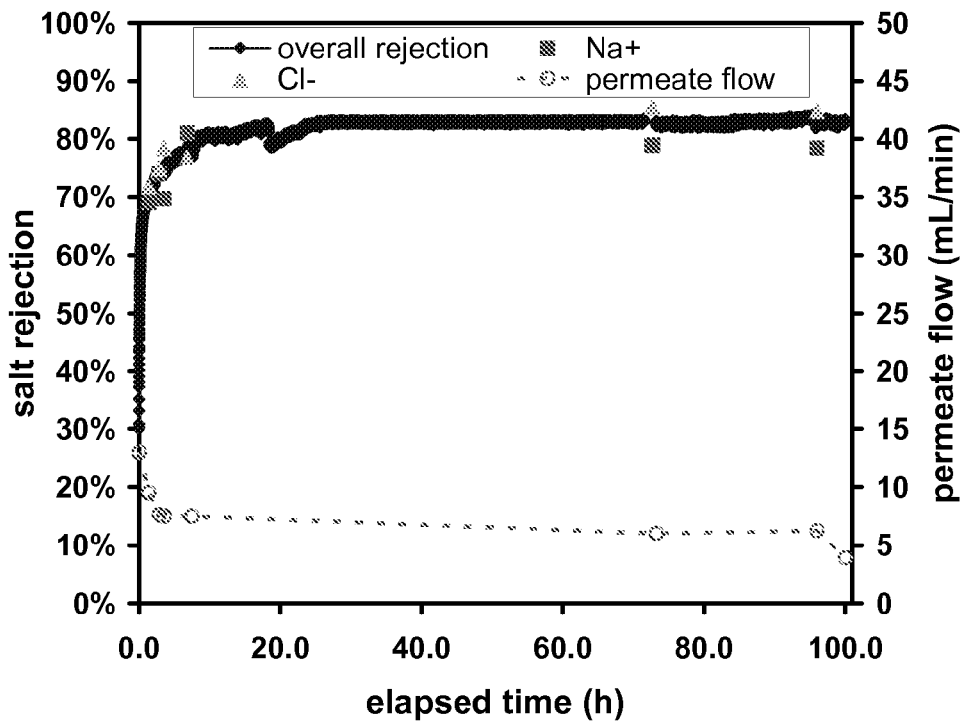
FIG. 10 is a plot of NaCl performance data for the DAE+TAC formulation, 236-E18-60. Feed conditions: 2000 mg/L, 25° C., and 200 psig.

The DAE/piperazine membrane provided the greatest potential for desalination with up to 82% NaCl rejection (2000 ppm feed concentration) with very high permeate flow. This membrane was mechanically robust and could be reliably operated at feed pressures up to 800 psi. One example given in FIG. 10 for membrane 236-E18-60 that was operated for 100 hours before continuing with other tests. This showed stable salt rejection (82%) and permeate flow (29.0 L/h/m$^2$) at 200 psi for the duration of the test. Membrane failure during testing was very rare and did not occur using the disclosed fabrication method.

Figure 11:
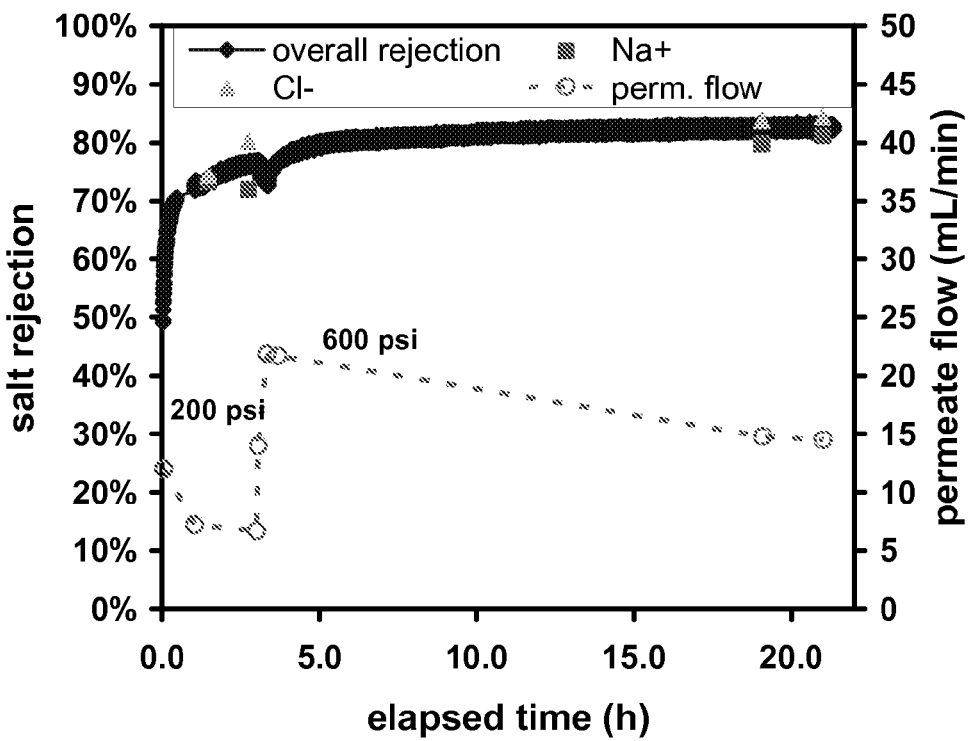
FIG. 11 is a plot of NaCl performance data for the DAE+TAC formulation, 236-E67-64. Feed conditions: 2000 mg/L NaCl, 25° C., 200 and 600 psig.
Figure 12:
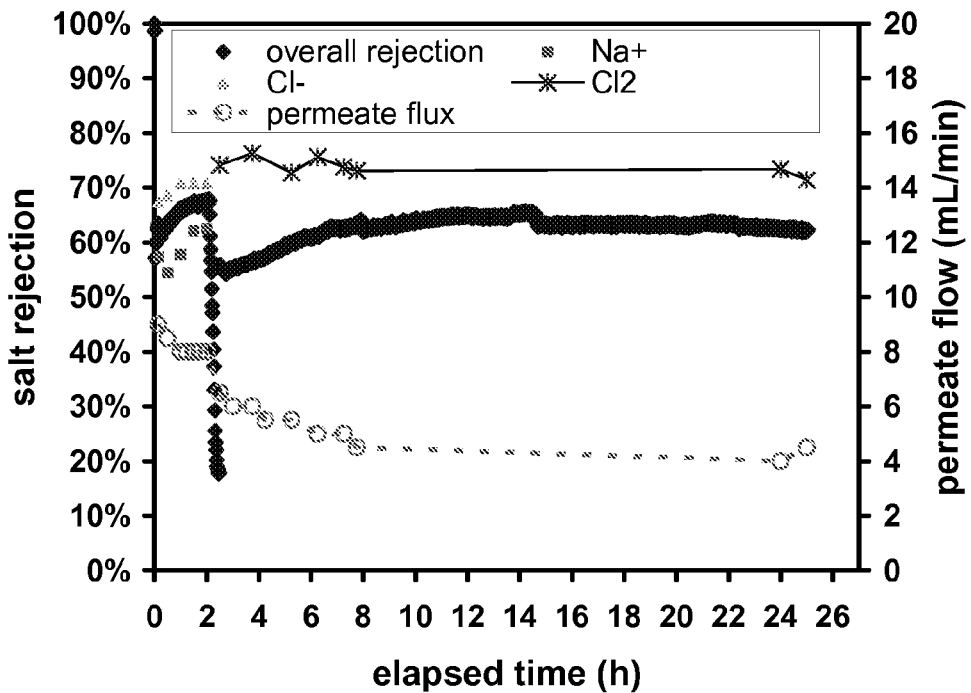
FIG. 12 is a plot of chlorine stability test data for the DAE+TAC formulation, 236-E67-109. Feed conditions: 2000 mg/L NaCl, 25° C., 200 psig, spiked with 507 mg/L free available chlorine (from bleach).

Another example of membrane type ER-HR1 is shown in FIG. 11 for membrane 236-E67-64. This membrane showed 82% NaCl rejection and 56 L/h/m$^2$ permeate flux at 600 psi over a 21.4 hour test period. A separate membrane fabricated in the same way, 236-E67-109, was tested for chlorine tolerance and is shown in FIG. 12. In this experiment the membrane was conditioned for 2 hours until it stabilized near 67% NaCl rejection. The feed solution was then slowly spiked with 507 ppm equivalents of Cl$_2$ as a bleach solution. The membrane re-stabilized and maintained constant NaCl and Cl$_2$ rejections (~62.8% and 73%, respectively) for 20.4 h (23.2 h total time) before gradual loss of salt rejection began. The upward jumps in salt rejection data were due to air bubbles collecting around the conductivity probe during unattended overnight hours of operation. The result was 10,340 ppm-h of chlorine tolerance demonstrated under these accelerated conditions.

Figure 13:
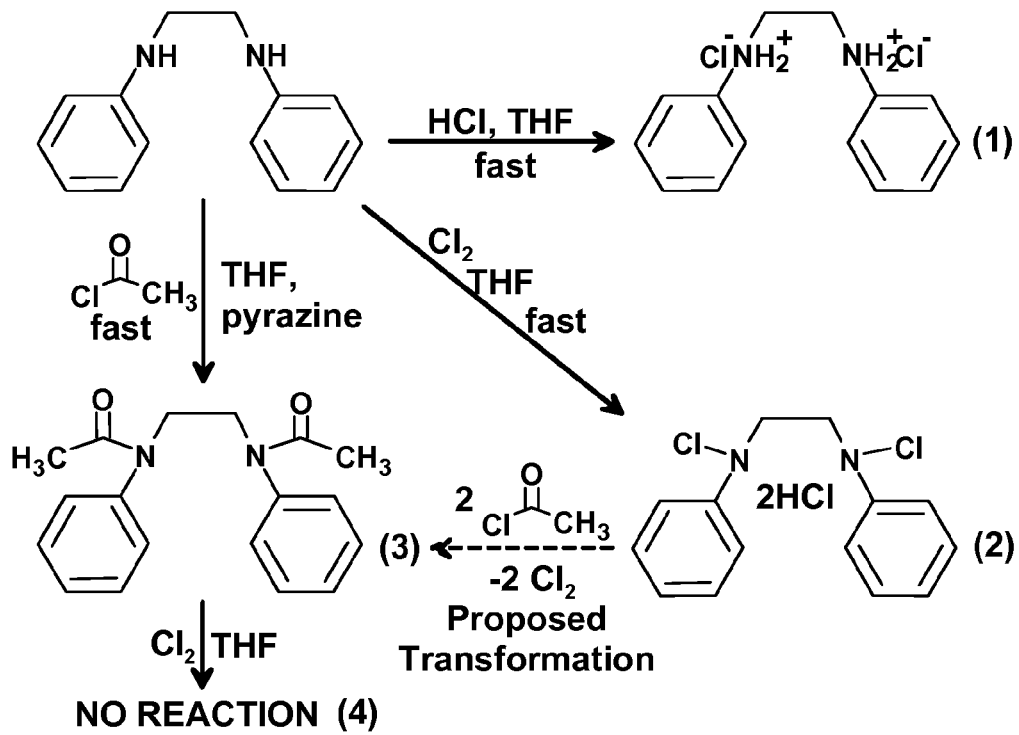
FIG. 13 is a schematic of the reactivity of DAE and proposed transformation from (4) to (5).

The effect of bromine as a polymerization catalyst was further examined in solution on oligomers composed of DAE, DPG, DPT and DAM reacted with acetyl chloride or benzoyl chloride. In previous studies there were distinct differences in reactivity between the different amines and acetyl chloride. The mechanism for halide reactivity enhancement is proposed to be a radical mechanism based on previous reactivity investigations with DAE. A brief summary of the results of the DAE reactivity study is shown in FIG. 13. The reaction scheme in FIG. 13 is based on H$^1$-NMR and IR studies. In this study acetyl chloride was used so that the reaction products could be isolated and characterized by infrared spectroscopy (IR) and nuclear magnetic resonance (NMR) spectroscopy. A similar set of experiments was also conducted with DPG showing that the reaction analogous to (2) would not occur unless Cl$_2$ was present in the reaction mixture. The empirical results suggest that the presence of halogen during the reaction between an amine and an acid chloride essentially closes the catalytic loop by converting product (1) to (2). This reaction proceeds by a radical mechanism yielding Cl$_2$ as the byproduct, which is then available to react with the next amine. This may be done using sub-stoichiometric amounts of halogen relative to amine (about 10 times less). Stoichiometric amounts of halogen cause undesirable precipitation of amine from solution.

Additional reactivity studies were conducted on molecular fragments of the polyamide structure to explore chlorination effects. These results are summarized in FIGS. 13 and 14 for DAE and DPG respectively. All reaction products shown were isolated as crystalline solids and identified by H$^1$-NMR and IR spectroscopic analysis.

The DAE molecule forms an ammonium salt very rapidly in the presence of a strong acid such as HCl shown in FIG. 13 reaction (1). This salt is a white crystalline solid that is soluble in water, but insoluble in tetrahydrofuran (THF). Formation of the ammonium salt proceeds more rapidly than its reaction with an acid chloride, such as acetyl chloride, without an acid scavenging amine such as pyrazine or the addition of a catalytic amount of halogen that presumably promotes a radical reaction mechanism. (This was found to be important in forming a polymer by reaction of TAC with DAE.) The chemical reaction between DAE and Cl$_2$, shown in FIG. 13 reaction (2) was also very rapid. Without wishing to be limited by theory, it appears that chlorinating the nitrogen of the secondary amine leads to one of the most potentially degradative intermediates related to the polyamide degradation pathways. In a polyamide, this can lead to polymer bond cleavage or chlorination of the phenyl ring. Converting the DAE to the diacetyl derivative in FIG. 13 reaction (3) produces a tertiary amide fragment that simulates the tertiary amide linkage in the polymers based on DAE. This fragment did not react with chlorine in solution, demonstrating the importance of eliminating reactive secondary amide groups, —C(=O)NH— in the new membrane polymers to increase chlorine stability.

Figure 14:
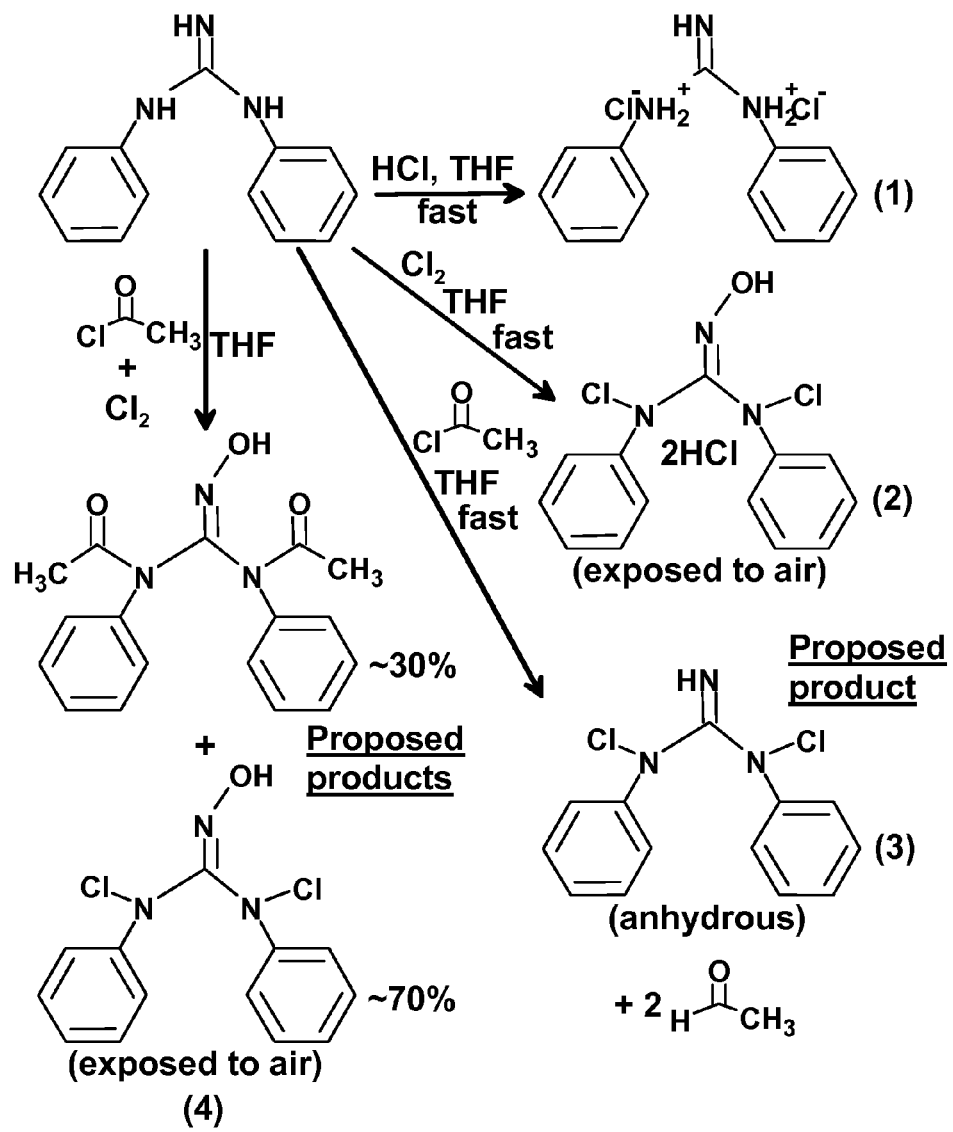
FIG. 14 is a schematic of reactivity studies for DPG.

The DPG molecule forms an ammonium salt very rapidly in the presence of a strong acid such as HCl shown in FIG. 14 reaction (1). This salt is a white crystalline solid that is somewhat soluble in THF as well as water. The chemical reaction between DAE and Cl, shown in FIG. 14 reaction (2) was found to produce a product similar to that of DAE above, but was converted to the oxime-like (C=NOH) form by exposure to moisture (H$_2$O) in air during the recrystallization and isolation process. Reaction of DPG with an excess of acetyl chloride under strict anhydrous conditions lead to what appears to be the product in FIG. 14 reaction (3). This must form by a different mechanism than reaction (2) where the guanidine group (N$_2$C=NH) may behave as a nucleophile and presumably acetaldehyde forms as the reaction byproduct that is removed during the purification process. The reaction of DPG with acetyl chloride mixed with a low concentration of chlorine in anhydrous conditions lead to a crystalline material that turned more "waxy" upon exposure to the air. The NMR and IR analyses show a mixture of two products that are illustrated in FIG. 14 reaction (4). The chlorine appears to compete with and partially block the reaction mechanism active in reaction (3) allowing some of the diacetyl compound to form. The overall conclusions that can be made from these results are that the amine groups adjacent to the phenyl rings are reactive to chlorine, but also react with acid chlorides to form the unreactive tertiary amide linkages similar to that in FIG. 13 reaction (3). The C=NH group can form the oxime-like derivative, but does not appear to react with acid chlorides and, therefore, is not expected to be crosslinked into the polymer backbone.

The above results combined with observations that chlorine tolerance was reduced by poor polymer quality strongly suggest that the amide linkages and guanidine functional groups are exposed to or create the pore structure in these membranes. Therefore, elimination of primary amide linkages and unreacted amine groups in the polymer membranes was the most important goal to achieve for better chlorine tolerance. This approach to making chlorine tolerant membranes was successfully demonstrated in the disclosed family of polyamides.

Example 4

DAE/DPG/Piperazine (Type ER HF1A); Operable pH Range

One method investigated to increase salt rejection was the addition of chemical structure into the pores of the membrane. For example, in embodiments, the amine solution of (i) comprises DPG and DAE. The addition of the guanidine functional group (N$_2$C=NH) to the membrane was found to enhance to sulfate rejection. Additionally, the guanidine group provided a surprising membrane response to chlorine (and bromine). That is an irreversible increase in ion rejection (2%-10%) and decrease in water permeation (25%-40%). This response was not observed for the "host" DAE/piperazine membranes. Based on these observations, and without wishing to be limited by theory, it is believed that the guanidine functional group of DPG is located in the membrane pore structure. The hydrophilic polyamide linkages and guanidine groups constitute the pore structure that provides water permeability.

Table 3 displays performance specifications for membrane based on DAE/DPG/piperazine. This is an excellent nanofiltration membrane that exceeds commercial performance specifications for ion rejections, pressure range, permeate flux (% recovery) and, especially, chlorine tolerance.

This membrane type is 10-20 times more tolerant to chlorine than the current industry standard and responds to chlorine exposure with an increase in salt rejection and an irreversible 10-30% decrease in permeate flux. Resistance to fouling is good. A description of membrane fouling experiments to determine the maximum SDI is presented in Example 16 hereinbelow.

TABLE 3

ER-HF1A (High Flow Type I), DAE/DPG/piperazine

| Operating Limits | |
|---|---|
| Membrane Type | thin film composite |
| Operating pressure | 75-200 psi |
| Maximum operating pressure | 600 psi |
| Free Chlorine Tolerance: (150 ppm $Cl_2$) | 10,000 ppm·h (overall rejection) 17,900 ppm·h ($MgSO_4$) |
| Maximum Feed SDI: | 5 (humic acid, cheese whey) |
| pH Range | 2-11 |
| Minimum Feed Flow Velocity | 0.5 m/s at 100 psi |
| Shelf Life | indefinite |

| Stabilized Salt Rejection (feed flow velocity 0.68 m/s, 200 psi, 20° C.) | | |
|---|---|---|
| $MgSO_4$ (2000-4000 ppm): | $Mg^{2+}$ | 92-97% |
|  | $SO_4^{2-}$ | 94-99.4% |
| $CaCl_2$ (2000 ppm): | $Ca^{2+}$ | 96-97% |
|  | $Cl^-$ | 94-96% |
| NaCl (2000 ppm): | $Na^+$ | 52-65% |
|  | $Cl^-$ | 58-68% |
| $CuSO_4$ (200 ppm, pH 5.1): | $Cu^{2-}$ | 77-81% |
|  | $SO^{4-}$ | 73-75% |
| $H_2O_2$ (8,000 ppm) |  | 30% |
| Ethanol (10 wt %): |  | 6% |
| Seawater (4% salinity. 400-600 psi): | $Mg^{2+}$ | 82-84% |
|  | $Ca^{2+}$ | 78-83% |
|  | $SO_4^{2-}$ | 97.4-98% |
|  | $Cl^-$ | 45-47% |

| Stabilized Permeate Flow (2000 ppm $MgSO_4$, 20° C.) | | | |
|---|---|---|---|
| 200 psi | 135 L/h/m² | (79.5 gfd) | 19.0% recovery* |
| 100 psi | 68.1 L/h/m² | (40.1 gfd) | 9.4% recovery* |
| 75 psi | 51.5 L/h/m² | (30.3 gfd) | 7.2% recovery* |
| 50 psi | 34.8 L/h/m² | (20.5 gfd) | 4.8% recovery* |

*% Recovery estimated for a 40 in. spiral wound module with 34 mil feed spacer and 38 inch feed flow path length. gfd = gal/day per ft².

Figure 15:
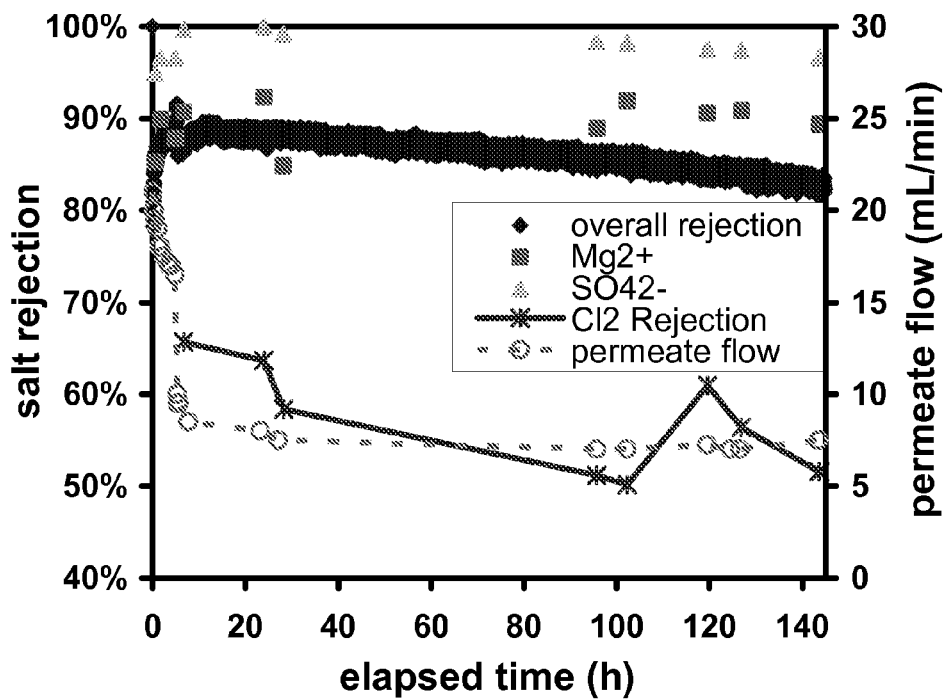
FIG. 15 is a plot of the results of a chlorine tolerance test for membrane 236-E101-89 (ER-HF1A) at 200 psi feed pressure, 2000 ppm $MgSO_4$, 20° C.

As seen in Table 3, the DAE/DPG/piperazine (type ER-HFIA) membrane provided salt rejections of up to 93% $Mg^{2+}$ and 97% $SO_4^{2-}$ before chlorine exposure and 94% $Mg^{2+}$ and 99.4% $SO_4^{2-}$ after chlorine exposure, 19,200 ppm·h chlorine tolerance (for $MgSO_4$ rejection), and high permeate flux. An example is given in FIG. 15. FIG. 15 is a plot of the results of chlorine tolerance test for membrane 236-E101-89 (ER-HF1A) at 200 psi feed pressure, 2000 ppm $MgSO_4$, 20° C. This increase in salt rejection performance is an unusual response for a polyamide membrane. This appears to be an effect in the bulk of the membrane, not just the surface, because exposing only the surface to chlorine (bleach) does not provide the full effect. The pores must be exposed to chlorine, therefore, a reactive functional group (such as C=NH of DPG) is believed to be within the pores. Chlorine tolerance is high and permeate flux is stable. The example shown in FIG. 15 for membrane 236-E101-89 showed stable $MgSO_4$ rejection until 121.6 h (126.8 h total elapsed time) for 17,875 ppm·h chlorine tolerance (decrease in chlorine concentration during experiment taken into account). The overall rejection (including $Na^+$, $OCl^-$, $Cl_2$) began to fall after 33.3 h (38.5 h total elapsed time) for 5660 ppm·h chlorine tolerance. Later chlorine tolerance testing on membranes with more optimized deposition conditions show 10,000 ppm-h tolerance for overall rejections such as for membrane 236-F6-57.

Rejection of $Ca^{2+}$ is very comparable to $Mg^{2+}$ under standard conditions for both membrane types ER-HF1A and ER-HF2A (for ER-HF2A, see Example 5C hereinbelow), which is a significant achievement for a NF membrane. Typically only one of these ions is rejected well. Rejection of $Cu^{2+}$ (77-81%) at 200 ppm $CuSO_4$, is very similar to rejection of $Mg^{2+}$ (82-83%) at 200 ppm $MgSO_4$. Monovalent ions, NaCl, are rejected much less, which is typical behavior for NF membranes.

Figure 16:
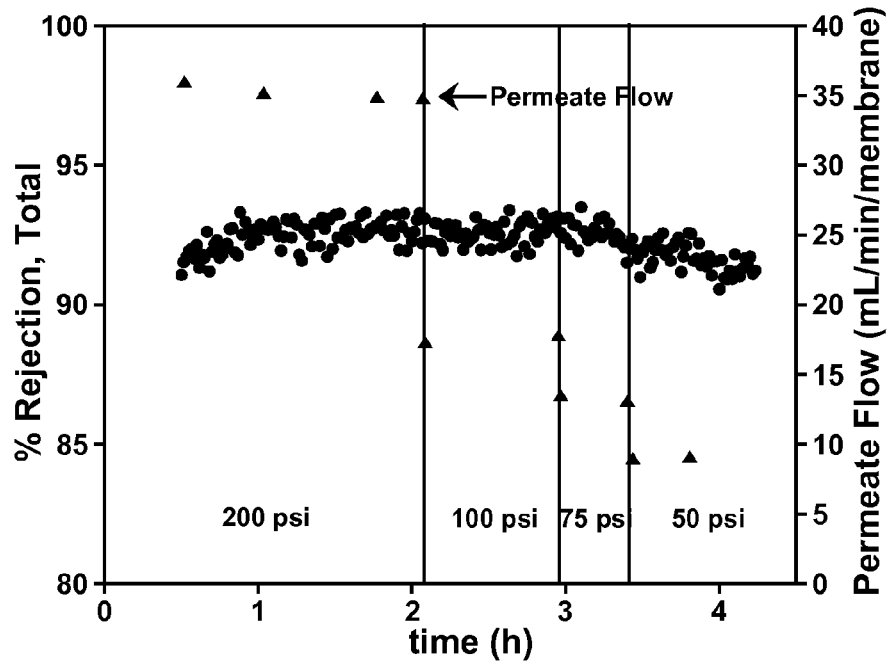
FIG. 16 is a plot of the pressure-dependent $MgSO_4$ rejection and permeate flow for membrane 236-E101-112 (ER-HF1A), 2000 ppm $MgSO_4$, 20° C.

Pressure dependence of membrane type ER-HF1A was examined to determine the optimal operating pressure range. The salt rejection and permeate flow response (2000 ppm $MgSO_4$) is shown in FIG. 16 for decreasing feed pressures of 200, 100, 75, and 50 psi. The best working range is 75-200 psi, although good salt rejection was attained even at 50 psi. Salt rejection at 400-600 psi is essentially the same as at 200 psi with about a 2-fold and 3-fold increase in permeate flow, respectively. The membranes can withstand 800 psi, but the salt rejection decreases some.

Feed flow rate for membrane type and permeate flow for membrane 236-E101-112 (ER-HF1A) has a much stronger influence on salt rejection below a critical velocity. At 100 psi and 2000 ppm $MgSO_4$ using a 34 mil feed spacer the flow rate could be reduced to around 0.42-0.48 m/s linear flow velocity for membrane 236-E101-112 (in FIG. 16) before observing a significant decrease in salt rejection. Concentration polarization becomes too strong below 0.5 m/s, leading to very high concentration gradients at the membrane surface that result in a loss in the observed salt rejection.

Concentration dependence of salt rejection for membrane type ER-HF1A was examined at 200 psi for 200, 2000, and 4000 ppm $MgSO_4$ feed concentrations. There was no change in rejection between 2000 and 4000 ppm feed solutions. The $SO_4^{2-}$ rejection decreased by 4-5% at 200 ppm feed concentration.

Figure 17:
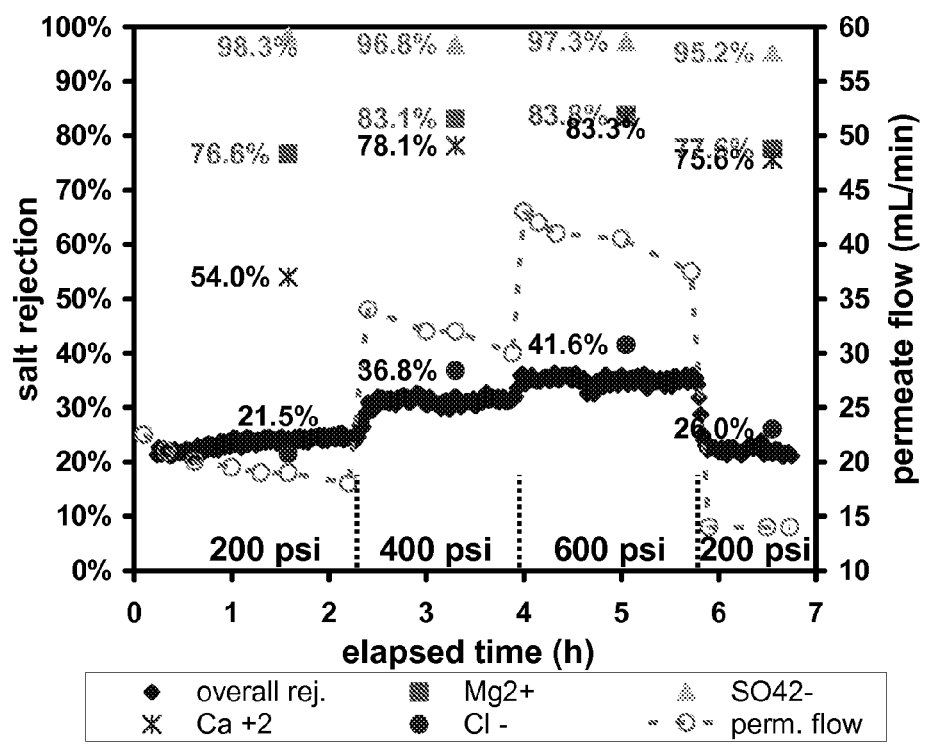
FIG. 17 is a plot of the performance test result for membrane 236-F6-96 (ER-HF1A), 40,000 ppm seawater mix, 20° C.

Pressure and concentration dependence for membrane type ER-HF1A was also explored with seawater to determine the effects of ion mixtures for $Mg^{2+}$, $Ca^{2+}$, $SO_4^{2-}$, and $Cl^-$ ion rejections. An experiment shown in FIG. 17 shows the response of membrane 236-F6-96 to 4% salinity feed solution at 200, 400, and 600 psi. The $SO_4^{2-}$ rejection is very similar to the 2000 ppm $MgSO_4$ feed experiments, but with a 40-50% reduction in permeate flow due to the higher osmotic pressure of seawater (~15 times greater). The pH dependence of membrane type ER-HF1A was investigated. In general, the salt rejection decreased by a few percent at lower pH<5, indicating that these membranes are slightly anionic in character. The permeate flow rates also increased at low pH. At higher pH>8 there was no discernable effect on salt rejection and little effect on permeate flow. One experiment conducted at very high pH 12.8-13 irreversibly degraded the membrane (salt rejections continually declined and permeate flow increased). The effects of cleaning membranes by standard acid and base flushing and chlorine disinfection protocol were examined as well. One such experiment that illustrates membrane response is tabulated in Table 4 for membrane 236-F6-63. Based in such experiments the safe pH range for these membranes was determined to be pH 2-11.

Separation of hydrophilic molecules from water with membrane type ER-HF1A was briefly surveyed for ethanol and hydrogen peroxide. Ethanol rejection was tested with a 10 wt % ethanol solution (no salt in feed) with membrane 236-F6-30 that had 93% $SO_4^{2-}$ and 80% $Mg^{2+}$ rejection. The result was removal of up to 6.7% ethanol (measured by specific gravity) at 200 psi feed pressure. Rejection of hydrogen peroxide from an 8000 ppm $H_2O_2$ solution (no salt in feed) with the same membrane reached 30% (by iodometric titration). This was in contrast to only 7.5% peroxide rejection from a 2000 ppm $MgSO_4$ feed solution containing 8000 ppm $H_2O_2$, (membrane 236-F6-97 with 96% $SO_4^{2-}$ and 92% $Mg^{2+}$ rejection). The presence of ions in solution appears to have a strong effect on hydrogen peroxide rejection.

Figure 18:
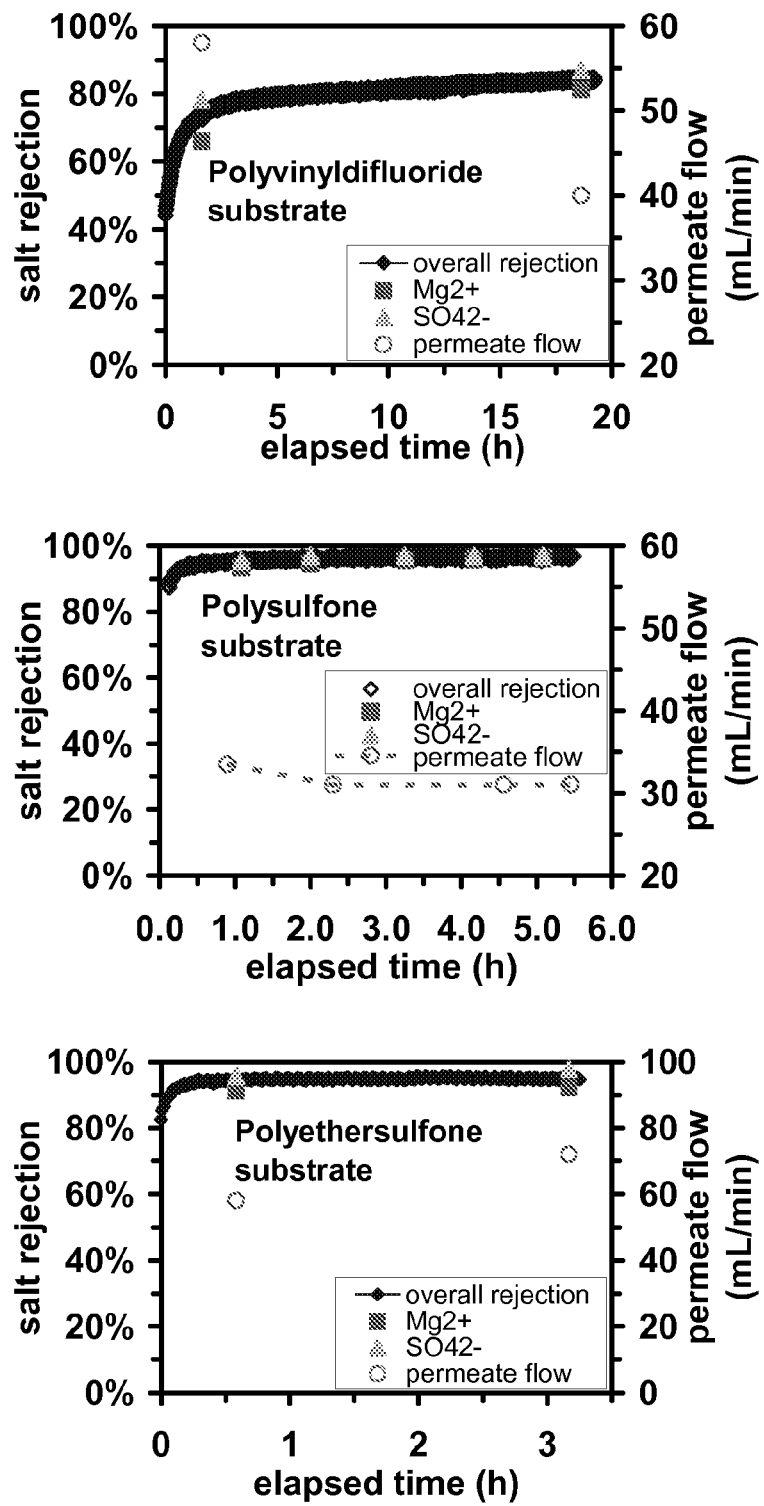
FIG. 18 is a plot of performance data for the DAE/DPG+TAC formulation deposited onto PVDF, F89-74 (upper panel), PS, F89-7 (middle panel), and PES, 236-F6-114 (bottom panel). Feed conditions: 2000 mg/L MgSO4, 20° C., 200 psig.

The compatibility of DAE/DPG+TAC formulation with deposition onto fluorinated, microporous polyvinyldifluoride (PVDF) substrates was determined. FIG. 18 shows data for membrane F89-74 compared to tests of the DAE/DPG+TAC formulation deposited onto substrates of polysulfone (PS), membrane F89-7, and polyethersulfone (PES), membrane 236-F6-114 (last entry in Table 2). Amine deposition solution concentration and contact time may be optimized to increase salt rejection performance.

DPG acting as a proton acceptor and forming a positively charged amine salt complex. Additionally, the deposited DAE/DPG composition favors a 1:1 molar ratio even when the amount of DPG is in excess of DAE by 5-10% in the deposition solution. This is a pre-polymer state that is important to membrane performance. The presence of bromine as a polymerization catalyst is believed to alter these pre-polymer states.

Example 5

XDAE Formation/Testing

Figure 19:
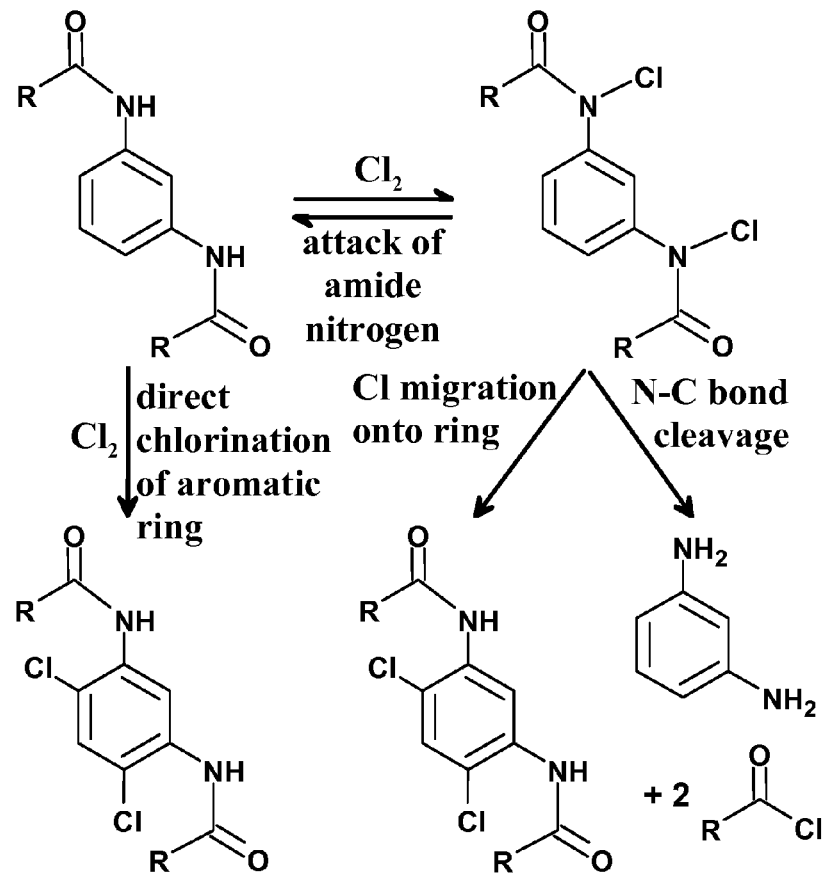
FIG. 19 is a schematic of chlorination-induced degradation pathways for industry standard polyamide RO membrane material adapted from J. Glater, S. Hong, and M. Elimelech, Desalination 95, 325 (1994).

Comparative stability studies have been possible using XDAE to determine how chlorine tolerance can be improved over DAE by strategic chemical modifications to the polymer. Several chlorine degradation pathways are possible in traditional aromatic polyamide RO membranes as illustrated in FIG. 19. Three strategies were pursued to minimize these degradation mechanisms. The first was blocking the most reactive phenyl ring site on the aromatic polyfunctional secondary amine to electrophilic chlorine substitution. The second was deactivating the reactive sites on the aromatic polyfunctional secondary amine to electrophilic substitution by reducing electron density in the ring. The third was eliminating secondary amide linkages.

The most reactive site to chlorination is the para position of the aromatic ring relative to the amine. The amine group activates the para aromatic ring position, and the ortho posi-

TABLE 4

Acid/Base pH Cycling for Membrane 236-F6-63 (ER-HF1A), 20° C.

| Test Description | Operating Pressure, psig | Salt Analyte | Max. % $SO_4^{2-}$ Rejection | Max. % $Mg^{2+}$ Rejection | Flow Rate, mL/min | Result Summary |
|---|---|---|---|---|---|---|
| 236-F6-63 on fresh feed | 200 | 2000 ppm MgSO4 | 98.9 | 95.9 | 12 | Good performance |
| Acid Flush (HCl-20 min) | 200 | -none- (pH = 2.62) | — | — | 18 | Increased water flux |
| Rinse (twice, 10 min. ea.) | 200 | -none- | — | — | 21 | Increased water flux |
| 236-F6-63 on original feed again | 200 | 2000 ppm MgSO4 | 96.3 | 92.5 | 17.5 | Almost 50% greater water flux than original test; rejections ~3% lower. |
| Base Flush (NaOH-20 min) | 200 | -none- (pH = 10.55) | — | — | 12 | Reduced water flux |
| Rinse (twice, 10 min ea.) | 200 | -none- | — | — | 15; 20 | Water flux increased |
| 236-F6-63 on original feed again | 200 | 2000 ppm MgSO4 | 97.1 | 93.8 | 18 | 1.)% Separations partially rebounded toward originals. 2.) Regained the high permeate water flux seen after acid treatment. |
| 236-F6-63 on doped original feed with 50 ppm $Cl_2$ (in bleach) | 200 | 2000 ppm MgSO4 | 99.4 | 98.2 | 9 | 1.)After $Cl_2$ reacted with flushed amines, feed analyzed @ 37 ppm $Cl_2$. 2.) Water flux dropped by half. 3.) Best salt rejections. |

The use of bromine had the beneficial effect on the DAE/DPG+TAC formulation of increasing reproducibility. Amine composition was examined by $H^1$-NMR spectroscopy for the DAE/DPG deposition process. There was a complex formation between the DAE and DPG when deposited onto a substrate surface. Observations found are consistent with the tions to a lesser extent, by donation of electron density from the nitrogen lone pair into the aromatic pi-electron system.

A series of substituted 1,2-dianilinoethane compounds was made with a range of substituents to determine the relative importance of blocking the para position of the aromatic rings to chlorine attack in activating or deactivating the ortho positions of the aromatic rings to direct chlorination or migration of Cl from the adjacent amine nitrogen (see FIG. 19 for examples of polyamide degradation pathways). Electron withdrawing strength of the para-substituting groups analyzed are in the order $OCH_3$, <$CH_3$, <H<F<CN where H (native DAE) is considered the electronic zero point between electron-donating ($CH_3$, $OCH_3$) and electron-withdrawing (F, CN).

Figure 20:
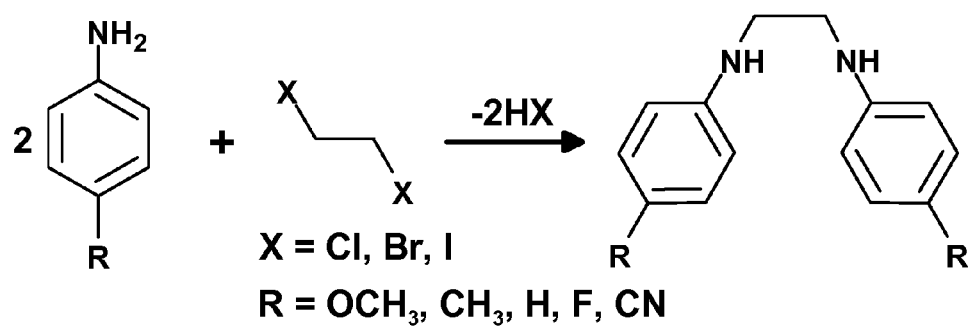
FIG. 20 is a schematic of synthesis of para-substituted 1,2-dianilinoethane derivatives.

Synthesis efforts were also aimed at producing chemical derivatives of DAE, specifically variants of DAE that are substituted on the aromatic rings in the para position relative to the amine group. FIG. 20 is a schematic of the synthesis of 1,2-dianilinoethane derivatives from para-substituted aniline and a 1,2-dihaloethane. The halogen is the leaving group that is displaced by the amine nitrogen in a $S_N2$-type nucleophilic substitution reaction. The solvent of choice was the substituted aniline starting material.

The para-substitution was pursued for three primary reasons: (1) substituting the aromatic ring in the para position blocks one of the chlorine-sensitive sites, (2) electron-withdrawing groups (i.e., nitrile, trifluoromethyl, fluoro) deactivate the chlorine-sensitive ortho aromatic ring positions, and (3) addition of hydrophilic (or hydrophobic) side groups to the polymer affect water permeation, polymer structure and/ or polymer packing density.

The successful substitution of fluorine and methyl groups onto DAE and the performance results obtained from membranes made with FDAE and MDAE provided valuable insight into the structure of the new polymers. Substituting the para position of the DAE (FIG. 20) did not significantly change the membrane performance. The best example of this is for the DAE/DPG/piperazine (ER-HFIA) and FDAE/DPG/piperazine (ER-HF2A) membranes. The performance of these two formulations were nearly identical for salt rejection, water permeation and chlorine tolerance. Therefore, it was concluded that the fluorinated aromatic ring is not involved with the pore structure environment. This conclusion is supported by the similar performance of the DAE/piperazine, MDAE/piperazine, and FDAE/piperazine membranes.

Figure 33:
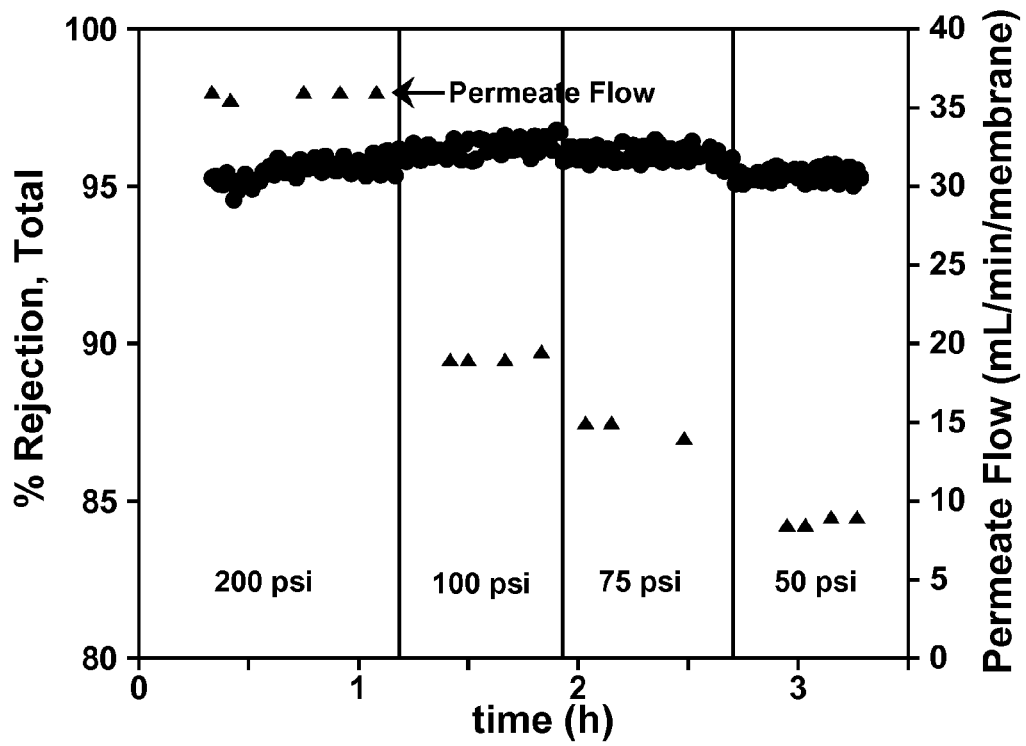
FIG. 33 is pressure-dependent $CaCl_2$ rejection and permeate flow for membrane 236-E101-108 (ER-HF2A), 2000 ppm $CaCl_2$, 20° C.

The addition of electron withdrawing groups to the aromatic ring of DAE in the para position to the amine nitrogen has been found to enhance the overall chlorine stability of the polymer. Even greater stability enhancement is obtained by putting an electron withdrawing group adjacent to the amine nitrogen. This enhancement of amide stability is thought to be due to nitrogen being made less electronegative by the electron withdrawing group, such as a halogen, trifluoromethyl, cyano (C≡N), C=NH or C=S, which removes some electron density from the amide nitrogen. FIG. 33 is a schematic of para-substituted (shown by 'X') and bridging group substituted (shown by 'Y') DAE.

Both the aromatic rings and the bridging group can be substituted with halogens. Fluorine is preferred for the ethylene bridge of DAE since it is the smallest atom substitution (least perturbation for the structure) with the strongest inductive electronic effect on the neighboring amide nitrogen. Fluorine has been utilized thus far for substituting the para position of the aromatic rings, but chlorine has a stronger electron-withdrawing influence (bromine and iodine are stronger yet) while being relatively non-reactive. The halogenated amines will be synthesized since they are not commercially produced. Fluorine-substitution will be investigated first it has been found to provide the cleanest reactions, highest yields, and inexpensive starting materials. Other strong electron-withdrawing groups such as trifluoromethyl and nitrile are better electron-withdrawing groups, but are more difficult to work with and have poor yields.

Figure 21:
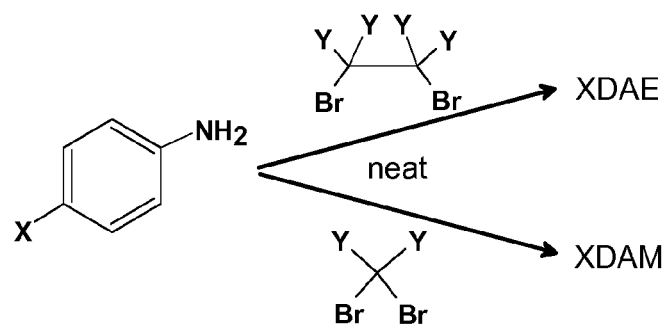
FIG. 21 is a schematic of general one-pot synthesis method for FDAE and FDAM.
Figure 22:
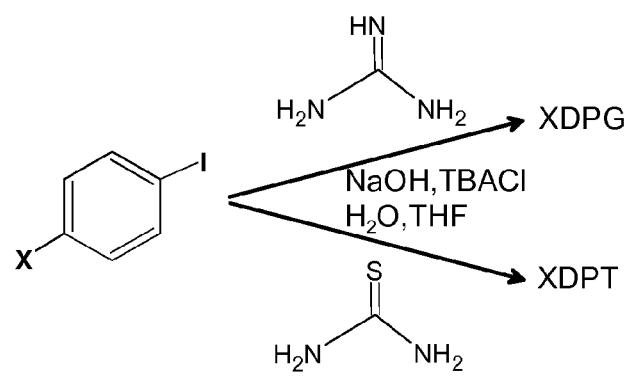
FIG. 22 is a schematic of a general one-pot, two phase synthesis method for XDPG and XDAM (TBACl=tetrabutylammonium chloride, THF=tetrahydrofuran).

The synthesis of FDAE was performed on the 10-gram scale as illustrated in FIG. 21. The synthesis of FDAM (its use discussed below) is very similar. The synthesis of FDPG and FDPT (its use discussed below) proceed by a different reaction mechanism due to the starting materials available (FIG. 22), but is straight forward as well. All starting materials are inexpensive. (Small scale production of FDAE has previously been estimated at $0.70/g inclusive of materials and labor.) Materials produced in-house were analyzed by nuclear magnetic resonance (NMR) spectroscopy (facilities at the University of Colorado, Boulder, Colo.) and infrared spectroscopy (in-house) for product identification and purity analysis. Elemental microanalysis services were obtained from Galbraith Laboratories, Inc., Knoxville, Tenn.

Fluorination of the ethylene carbons bridging between the nitrogen atoms of DAE (or methylene carbon of DAM) provides a strong electron-withdrawing effect to stabilize the adjacent amide bonds and residual unreacted amine groups assuming the structure is not significantly affected. The 1,2-dibromotetrafluoroethane starting material necessary to make the fluorinated ethylene bridge (for the reaction in FIG. 21 above) is available from ABCR, Inc. for $0.33/g.

The reaction in FIG. 20 has been successful for the synthesis of 1,2-di(4 methylenethylanilino)ethane (MDAE); 1,2-di(4-methoxyanilino)ethane (ODAE), 1,2-di(4-fluoroanilino) ethane (FDAE), and 1,2-di(4-nitrileanilino)ethane (NDAE) in a one-step reaction and straight forward isolation and purification. The 1,2-di(4-isopropylanilino)ethane (IDAE) was briefly examined but not pursued. Each of these compounds is a stable dark tan-colored crystalline solid. Monitoring the synthesis and purity of each of these compounds was done using infrared (IR) spectroscopy and $H^1$-NMR spectroscopy. Examples of IR and NMR spectra for DAE (Aldrich), MDAE, FDAE, ODAE, and NDAE are given in FIGS. 23-28. Energy dispersive X-ray analysis (EDX) was used to determine the amount of residual bromine or bromide from the reaction. Purity of these materials was estimated to be about 98% or better based on the NMR spectra. Elemental analyses (Atlantic Microlabs, Inc.) of these materials confirmed the chemical compositions to be correct and the results listed in Table 5. The primary impurity was the respective N,N'-di(4-substituted phenyl)piperazine, a byproduct that was unreactive and not detrimental to polymer synthesis in small amounts. The two most easily made and isolated compounds of this series are MDAE and FDAE. Synthesis of these was increased to multi-gram scale. Yields of MDAE are 60-70% (based on 1,2-dibromoethane) making the materials cost about $0.10/g (4-methylaniline, $28/kg; 1,2-dibromoethane, $16/kg). About 4 hours of labor are currently required to run a 5-10 gram reaction. Yields of FDAE are 65-75% (based on 1,2-dibromoethane) making the materials cost about $0.70/g (4-fluoroaniline, $200/kg; 1,2-dibromoethane, $16/kg) and labor is similar to before. The FDAE is the most useful derivative as it has the electronic and structural features desired for improved chlorine tolerance, is readily synthesized in larger batches with reasonable yields, is relatively inexpensive, has good solubility, and consistently produces good quality polymer films. About 94 g of FDAE and 38 g of MDAE were produced for membrane synthesis. The yields for ODAE and NDAE are more sensitive to scale-up and required more effort to optimize syntheses to produce bulk quantities. The starting materials are also relatively inexpensive, $82/kg for 4 methoxyaniline and $1000/kg for 4-aminobenzonitrile. These were successfully made in high purity, but low yield and characterized by NMR, IR, and elemental analysis. Several grams of the ODAE were produced while only about 1 g of the pure NDAE was obtained. These were not pursued further for membrane synthesis due to the scale up issues.

TABLE 5

Elemental Analysis Results for XDAE Derivatives

| Compound | Element | Theoretical, mol % | Found, mol % (avg. of 2) |
|---|---|---|---|
| ODAE | C | 70.00 | 66.49 |
|  | H | 8.08 | 7.59 |
|  | N | 10.21 | 9.58 |
| MDAE | C | 79.29 | 79.93 |
|  | H | 9.15 | 8.40 |
|  | N | 11.56 | 11.58 |
| FDAE | C | 67.18 | 66.78 |
|  | H | 6.44 | 5.71 |
|  | N | 11.19 | 11.13 |
| NDAE | C | 72.70 | 69.05 |
|  | H | 6.10 | 5.09 |
|  | N | 21.20 | 20.29 |

Example 5A

TAC/MDAE/Piperazine (Type ER-HR3)

Figure 29:
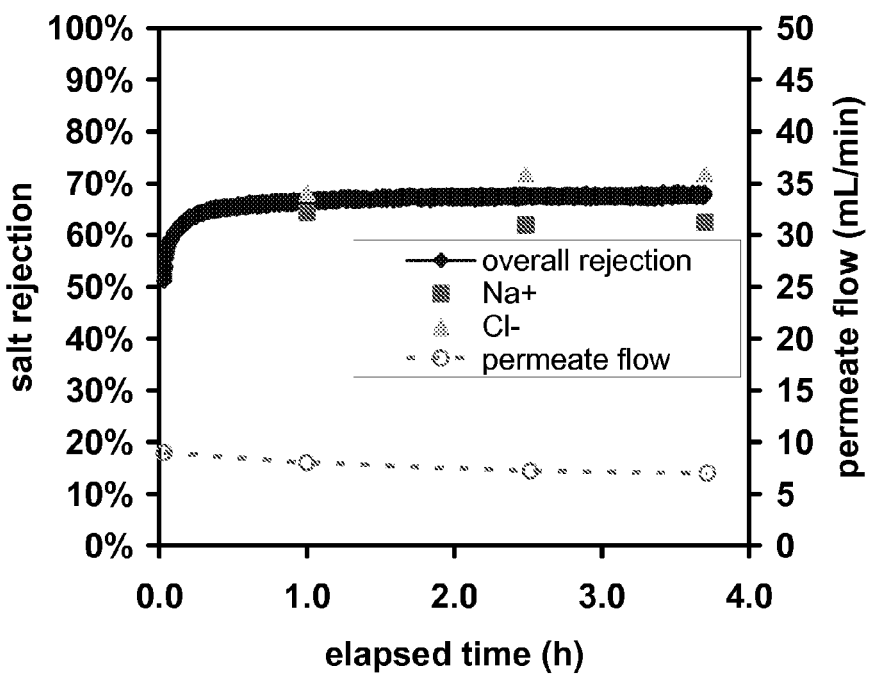
FIG. 29 is a plot of salt rejection performance of membrane 236-E67-68 (ER-HR3), 2000 ppm NaCl, 200 psi, 25° C.
Figure 30:
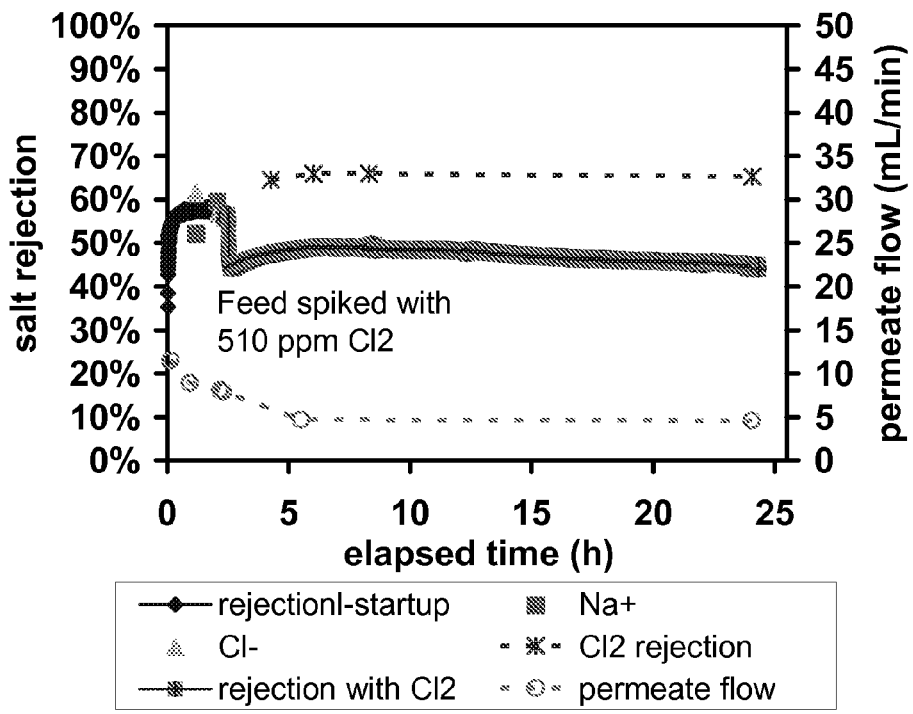
FIG. 30 is a plot of salt rejection performance of membrane 236-E67-76 (ER-HR3), 2000 ppm NaCl, 200 psi, 25° C., spiked with 510 mg/L free available chlorine (from bleach).

The MDAE/piperazine membrane type ER-HR3 (deposited under similar conditions to the DAE/piperazine membrane) gave up to 68% NaCl rejection at 200 and 600 psi. An example is shown in FIG. 29 for membrane 236-E67-68 tested at 200 psi. Chlorine tolerance testing was conducted. Another membrane, 236-E67-76 in FIG. 30, was conditioned for 3 hours until it stabilized near 58% NaCl rejection. The feed solution was then slowly spiked with 510 ppm equivalents of $Cl_2$, as a bleach solution. The membrane re-stabilized and maintained constant NaCl and $Cl_2$, rejections for 5100 ppm-h (13 h total time) with high permeate flux before gradual loss of salt rejection began. Deposition parameters were not fully optimized for 236-E67-76 or 236-E67-68.

Example 5B

TAC/FDAE/Piperazine (Type ER HR2)

Figure 31:
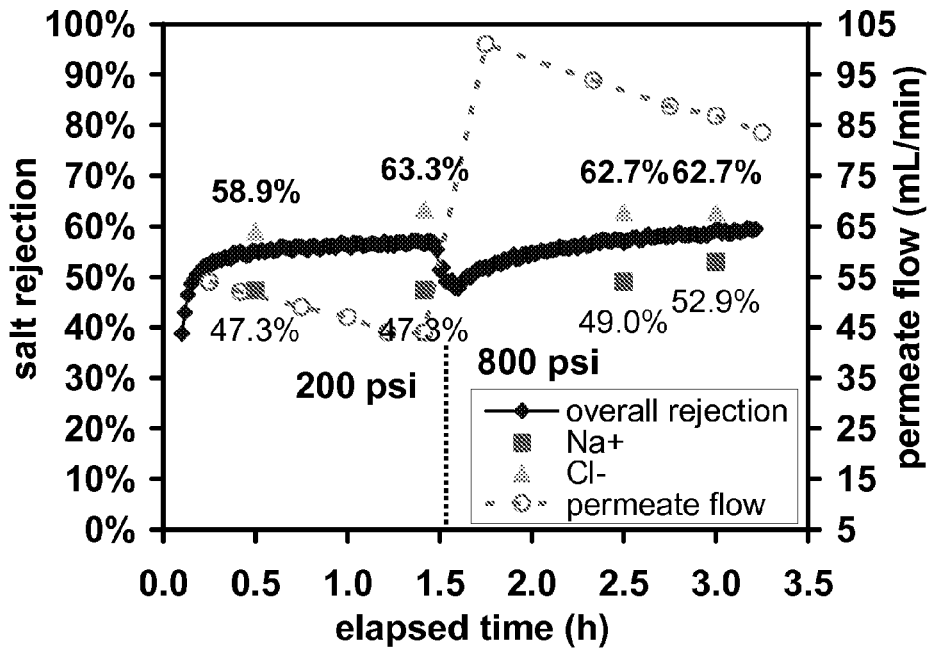
FIG. 31 is a plot of salt rejection performance of membrane 236-E101-84 (ER-HR2), 2000 ppm NaCl, 20° C.

The FDAE/piperazine membrane type ER-HR2 (deposited under similar conditions to the DAE/piperazine membrane) gave 53-59% NaCl rejection and very high permeate flux (166 L/h/m² 200 psi). An example is shown in FIG. 31 for membrane 236-E1O1-84 tested at 200 and 800 psi. The deposition parameters were not fully optimized for this formulation.

Example 5C

FDAE/DPG/Piperazine TAC (Type ER-HF2A)

Membrane formulations comprising FDAE/DPG/piperazine were created. Table 6 displays performance specifications for membrane based on FDAE/DPG/piperazine. This is an excellent nanofiltration membrane that exceeds commercial performance specifications for ion rejections, pressure range, permeate flux (% recovery) and, especially, chlorine tolerance. This membrane type is 10-20 times more tolerant to chlorine than the current industry standard and responds to chlorine exposure with an increase in salt rejection and an irreversible 10-30% decrease in permeate flux. Resistance to fouling is good. A description of membrane fouling experiments to determine the maximum SDI is presented in Example 16 hereinbelow.

TABLE 6

ER-HF2A; FDAE/DPG/Piperazine

| Operating Limits | |
|---|---|
| Membrane Type | thin film composite |
| Operating pressure | 75-200 psi |
| Maximum operating pressure | 600 psi |
| Free Chlorine Tolerance: (200 ppm $Cl_2$) | 10,400 ppm-h (overall rejection) |
|  | 19,200 ppm-h ($MgSO_4$) |
| Maximum Feed SDI: | 5 (humic acid, cheese whey) |
| pH Range | 2-11 |
| Minimum Feed Flow Velocity | 0.5 m/s at 100 psi |
| Shelf Life | indefinite |

| Stabilized Salt Rejection (feed flow velocity 0.68 m/s, 200 psi, 20° C.) | | |
|---|---|---|
| $MgSO_4$ (2000 ppm): | $Mg^{2+}$ | 93-97% |
|  | $SO_4^{2-}$ | 97-99.4% |
| $CaCl_2$ (2000 ppm): | $Ca^{2+}$ | 96-97% |
|  | $Cl^-$ | 96-97% |
| NaCl (2000 ppm): | $Na^+$ | 60-63% |
|  | $Cl^-$ | 71-75% |
| $CuSO_4$ (200 ppm, pH 5.1): | $Cu^{2-}$ | 77-81% |
|  | $SO^{4-}$ | 73-75% |
| $H_2O_2$ (8,000 ppm) |  | 30% |

| Stabilized Permeate Flow (2000 ppm $CaCl_2$, 20° C.) | | | |
|---|---|---|---|
| 200 psi | 139 L/h/m² | (81.8 gfd) | 19.5% recovery* |
| 100 psi | 73.5 L/h/m² | (43.3 gfd) | 10.2% recovery* |
| 75 psi | 56.1 L/h/m² | (33.0 gfd) | 7.8% recovery* |
| 50 psi | 34.8 L/h/m² | (20.5 gfd) | 4.8% recovery* |

*% Recovery estimated for a 40 in. spiral wound module with 34 mil feed spacer and 38 inch feed flow path length. gfd = gal/day per ft².

As can be seen from Table 6, chlorine tolerance for ER HF-2A is greater than 19,000 ppm-h (for $MgSO_4$ rejection) which is 10-20 times greater than commercial membranes. The FDAE/DPG/piperazine (type ER-HF2A) membrane was very similar to the nonfluorinated version and provided salt rejections of up to 93% $Mg^{2+}$ and 97% $SO_4^{2-}$ before chlorine exposure and 96% $Mg^{2+}$ and 99.4% $SO_4^{2-}$ after chlorine exposure. The chlorine tolerance is quite high and permeate flux is high and stable.

Figure 32:
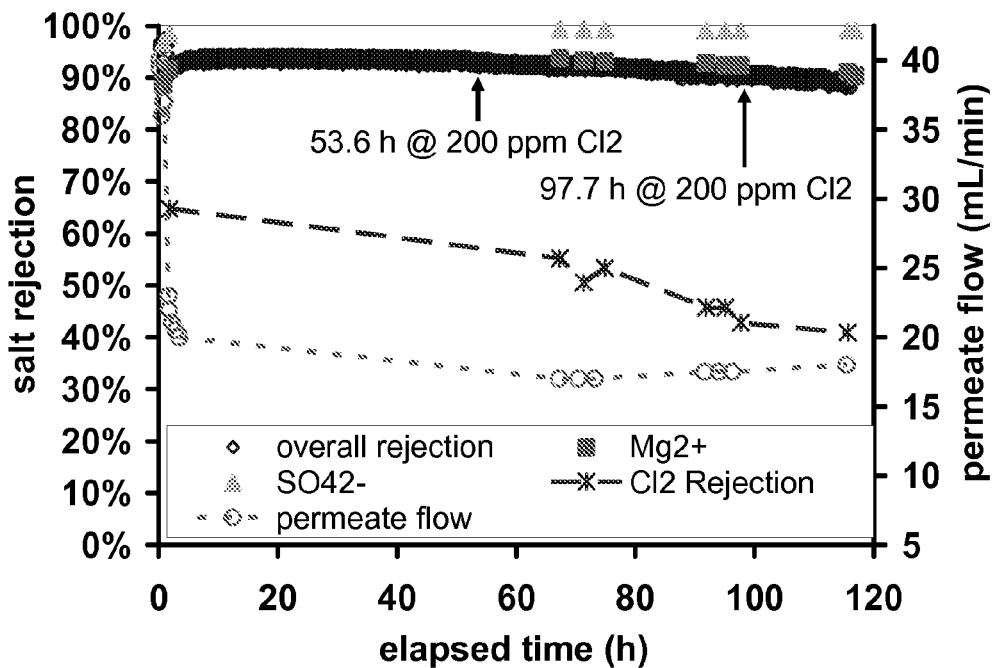
FIG. 32 is a plot of chlorine tolerance test for membrane 236-E101-108 (ER-HF2A) at 200 psi feed pressure, 2000 ppm $MgSO_4$, 20° C.

The example shown in FIG. 32 for membrane 236-E101-108 showed stable $MgSO_4$ rejection until 96.2 h (97.7 h total elapsed time) for 19,240 ppm·h chlorine tolerance (no significant decrease in chlorine concentration during experiment). The total rejection began to fall after 52.1 h (53.6 h total elapsed time) for 10,420 ppm-h chlorine tolerance. An example of salt rejection and permeate flux vs. feed pressure (constant feed flow) is given in FIG. 33 for $CaCl_2$ rejection. The best working range is 75-200 psi, although good salt rejection was attained even at 50 psi.

Salt rejection at 400-600 psi is essentially the same as at 200 psi with about a 2-fold and 3-fold increase in permeate flow, respectively. The membranes can withstand 800 psi, but the salt rejection decreases some.

All the performance characteristics of the fluorinated membrane type ER-HF2A including ion, pressure, flow, concentration and pH dependence are nearly identical to the non-fluorinated membrane. The FDAE derivative would be expected to increase chlorine tolerance if the phenyl rings of DAE were being chlorinated significantly. The DAE/DPG/piperazine and FDAE/DPG/piperazine membrane types described above have nearly the same chlorine tolerance. This suggests that the aromatic rings of DAE and FDAE are not easily accessible and/or reactive to chlorine. This may be a result of the aromatic rings for the two amines being merely side-group to the polymer backbone and are more important to creating the proper polymer packing structure.

The primary advantage of this membrane type, however, is the better solubility properties and/or greater reactivity leading to quality, consistency, and reproducibility of performance of the FDAE/DPG/piperazine+TAC membrane formulations. The solubility and reactivity of FDAE is better than that for DAE resulting in better polymer membranes.

Example 6

DPG+TAC Membranes; XDPG+TAC Membranes

Figure 34:
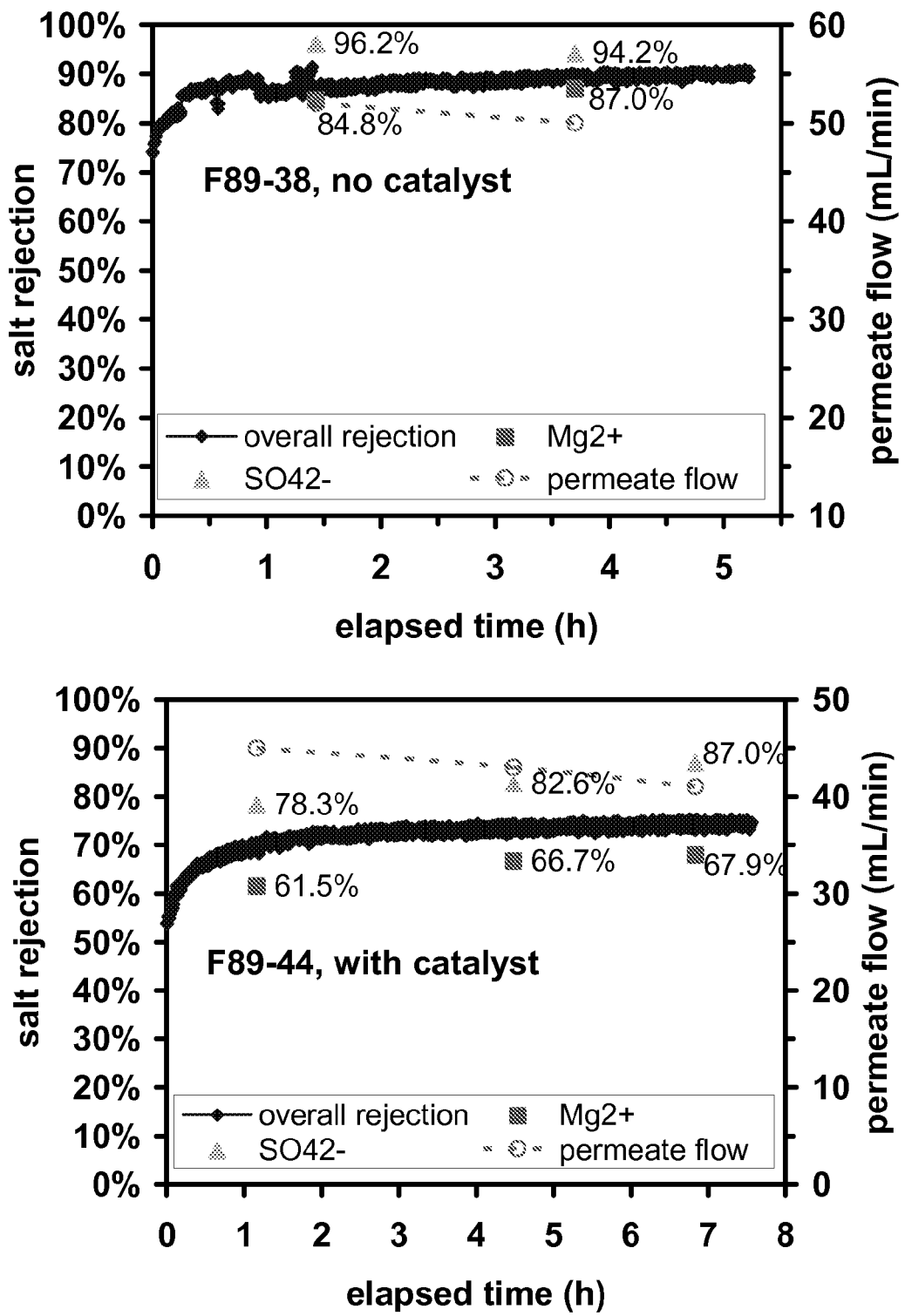
FIG. 34 is a plot of $MgSO_4$ performance data for the DPG+TAC formulation made without catalyst, F89-38 (upper panel), and with catalyst, F89-44 (lower panel). Feed conditions: 2000 mg/L $MgSO_4$, 20° C., 200 psig.

Membranes composed of DPG reacted with TAC could provide the good salt rejection obtained from the established DAE/DPG formulation. The use of bromine catalyst, however, was not beneficial to the DPG+TAC formulation as shown in FIG. 34, which compares membranes F89-38 (no $Br_2$) with F89-44 ($Br_2$ included). Adding catalyst may have a negative effect on charge distribution in the membrane. The best use of DPG is still in combination with DAE and a catalyst for stability and salt rejection.

An equally important membrane is the XDPG+TAC formulation since the non-halogenated formulation demonstrated high chlorine tolerance, nearly 22,000 ppm-h for $MgSO_4$ rejection. Another benefit of this membrane is the simplified, binary formulation.

Example 7

DAE/DPT+TAC Membranes

The use of 1,3-diphenylthiourea (DPT) and its halogenated derivative (XDPT) to promote greater water permeability and salt rejection were investigated. The DAE/DPT+TAC formulation demonstrated great promise. The sulfur atom of DPT, which resides within the pores, is not hydrogen bonding (unlike the C=NH nitrogen in DPG) potentially resulting in pores that have less resistance to water permeation. Water permeability was consistently about 15% greater for membranes containing DPT relative to DPG. Fluorine- or chlorine-substituted XDPT may be used to impart greater chlorine stability.

Figure 35:
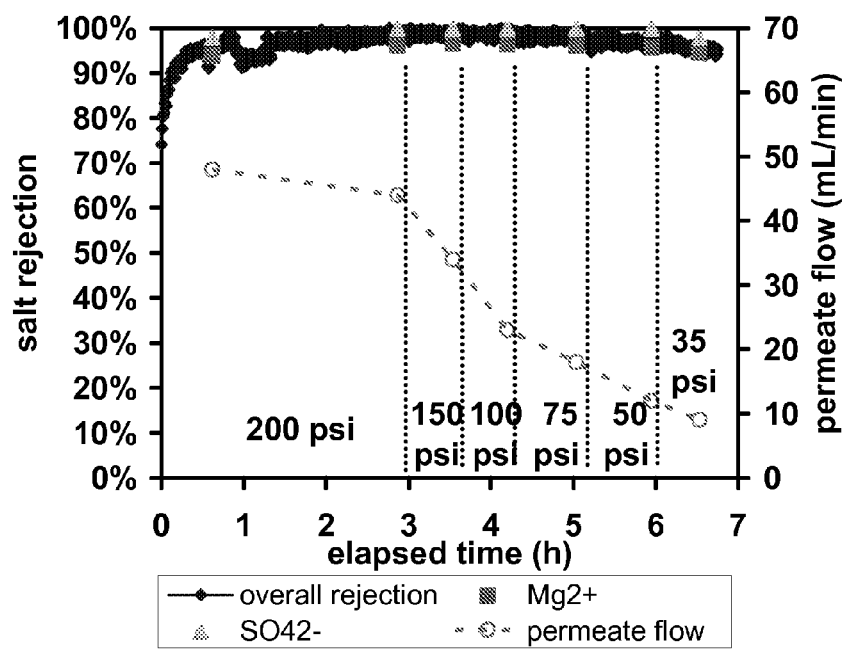
FIG. 35 is a plot of pressure-dependent $MgSO_4$ performance data for the DAE/DPT+TAC formulation, F89-28. Feed conditions: 2000 mg/L MgSO4, 20° C., 200 to 35 psig.

As can be seen in Table 2, the highest salt rejections and permeate flows obtained were from the DAE/DPT (1:1)+TAC formulation. In fact, the water permeability is best at lower pressures resulting in a practical feed pressure range down to 50 psig. The pressure-dependent performance of membrane F89-28 is shown in FIG. 35 between 35 and 200 psig feed pressure. The low pressure capabilities of the DAE/DPT membrane exceeds that of DAE/DPG formulation.

Figure 36:
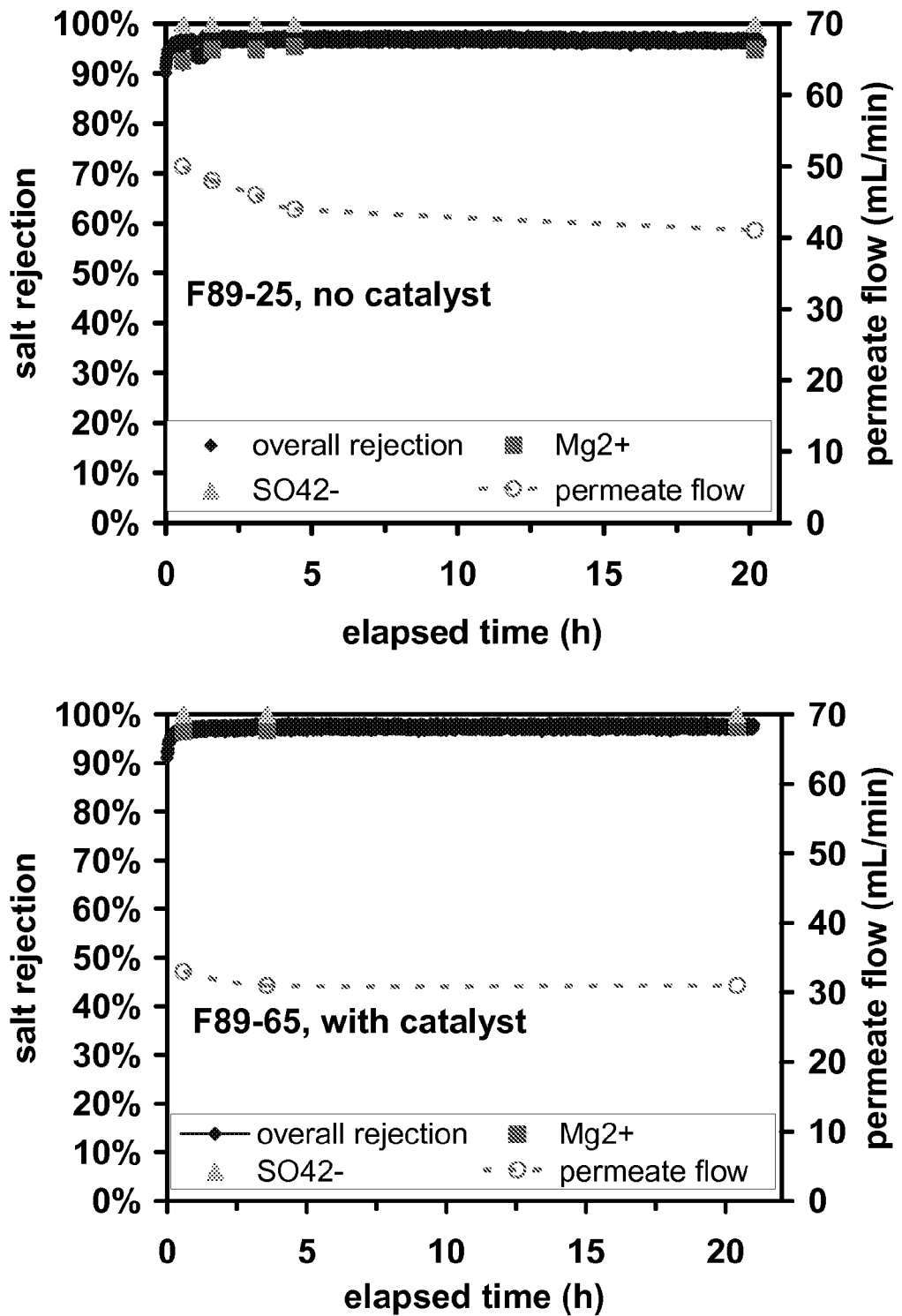
FIG. 36 is a plot of $MgSO_4$ performance data for the DAE/DPT+TAC formulation made without catalyst, F89-25 (upper panel), and with catalyst, F89-65 (lower panel). Feed conditions: 2000 mg/L MgSO4, 20° C., 200 psig.

The use of bromine as a polymerization catalyst resulted in decreasing the permeate flow (to values comparable with DAE/DPG formulation), but provided only a small enhancement in $Mg^{2+}$ rejection. The effect of bromine catalyst is shown in FIG. 36 comparing DAE/DPT membranes F89-25 (no $Br_2$) and F89-65 ($Br_2$ included).

Figure 37:
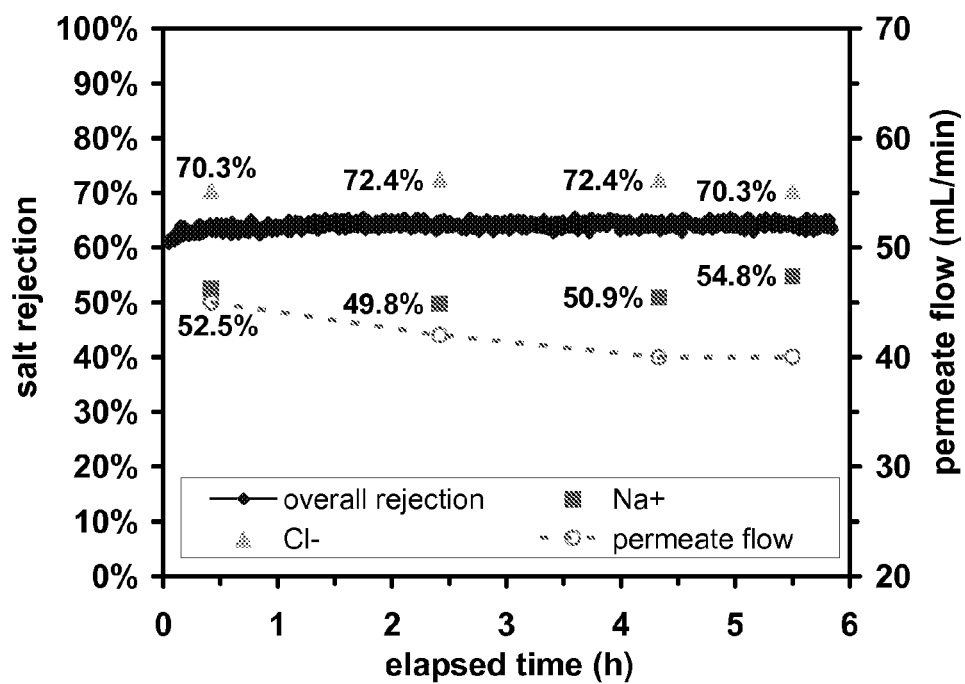
FIG. 37 is a plot of NaCl performance data for the DAE/DPT+TAC formulation made without catalyst, F89-25. Feed conditions: 2000 mg/L NaCl, 20° C., 200 psig.

Rejection of NaCl for DAE/DPT membrane F89-25 is shown in FIG. 37. The overall rejection is about 64%, which is on par with the DAE/DPG membranes having 55-65% NaCl rejection. A demonstrated water permeability of 1.97 gfd/psig is about eight times that of conventional seawater membranes which have about 0.25 gfd/psig water permeability.

Example 8

BTAC/DAE Membranes

In experiments, TAC was replaced by a substituted TAC or a non-aromatic acid chloride to produce new membranes for RO applications. The objective was to determine how the membrane pore structure and/or size are affected when amine compositions are polymerized with acid chlorides other than TAC and determine if pore structure and/or size can be manipulated by changing the size or molecular packing of the acid chloride constituent.

It was discovered that the acid chloride constituent should have a ring structure and that this (aromatic) ring has at least three reactive groups for crosslinking TAC is the industry-standard acid chloride for interfacial polymerization and it works well to create a 3-D polymer network while leaving enough unreacted carboxylate residues for charge exclusion effects. The unconventional 1,2,4,5-benzenetetracarboxylicacid chloride (BTAC) in FIG. 4 was found to be compatible with the disclosed polyamide membrane formulations and process conditions.

BTAC was very good at reacting to form a highly crosslinked polymer, but leaves few unreacted carboxylate or amine residues for charge exclusion effects. It was found that using BTAC as a minor component could increase crosslinking without significant loss of salt rejection performance as long as its relative and absolute concentrations were below certain levels.

The membrane structure in the disclosed family of polymers is thought to be dominated by the aromatic rings of the polyfunctional secondary amine(s) in the formulation. This concept is illustrated in FIG. 15 showing how aromatic ring stacking could occur for DAE in the disclosed polymer structures. In FIG. 15, the hydrophobic aromatic rings are expected to pack together in a separate phase from the hydrophilic amide linkages that are associated with the water permeable pores based on empirical observations. Candidate acid chlorides, both aromatic and aliphatic, were evaluated (FIG. 4).

BTAC was examined because a higher degree of crosslinking is known to increase a polyamide/polyimide's resistance to chlorination by creating a larger number of bonds and creating steric hindrance that blocks reactive sites from chemical attack. The additional crosslinking also reduces the pore volume in the disclosed nanofiltration polymers. Membranes that incorporated BTAC as a minor component (1:1 DAE/DPG+0.75:0.25 TAC/BTAC) had fair $MgSO_4$ rejections (96% $SO_4^{2-}$, 84% $Mg^{2+}$).

Membranes that utilized 100% BTAC as the acid chloride (DAE+BTAC) reliably gave membranes with selective cation rejection (79% $Mg^{2+}$~0% $SO_4^{2-}$), when no bromine was used as a polymerization catalyst. When the same formulation was made in the presence of bromine catalyst the polymerization reaction was more complete resulting in nearly zero $MgSO_4$ rejection. The lack of sulfate rejection indicates that there are very few residual anionic carboxylate residues provided by BTAC because its reaction is essentially complete.

Figure 38:
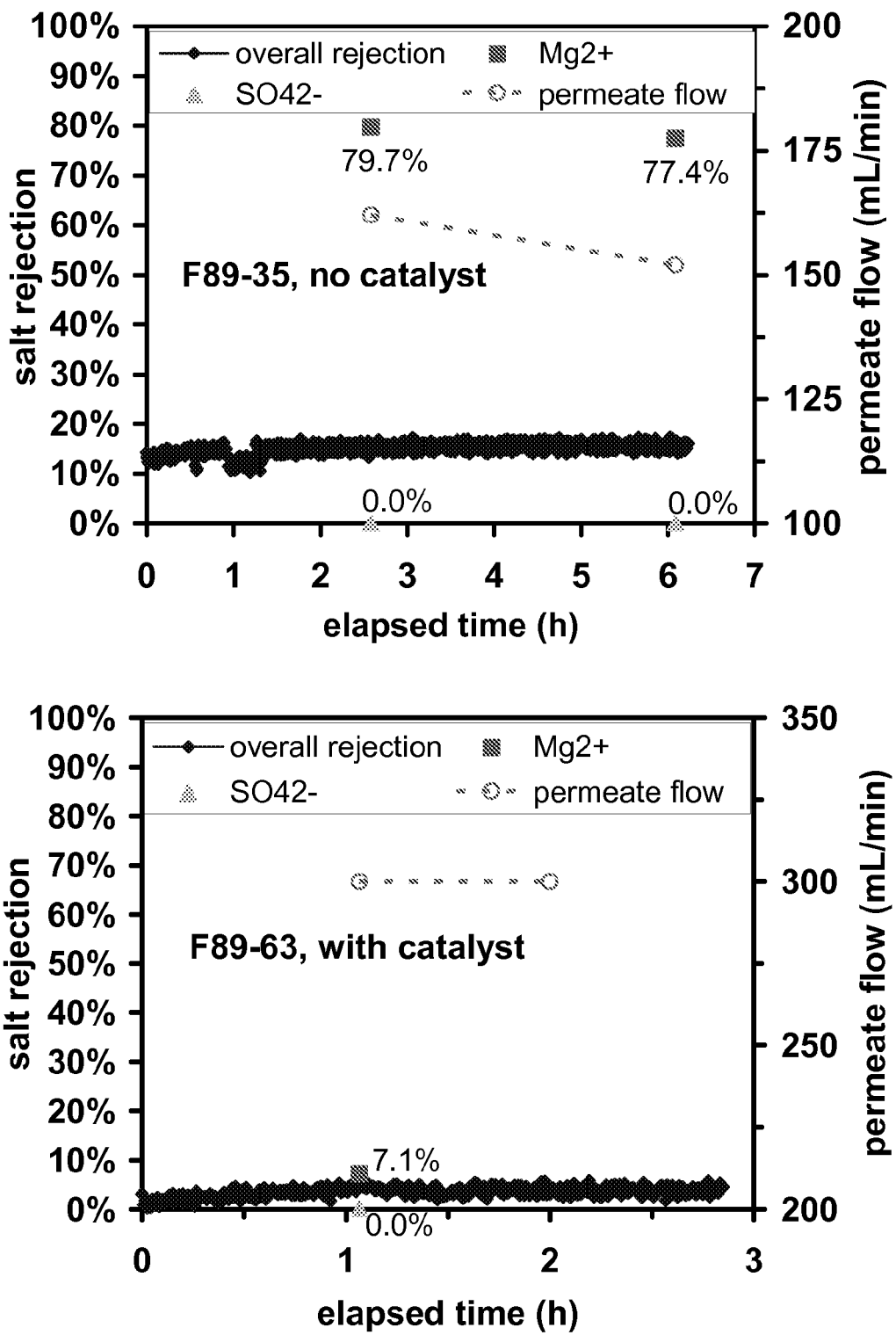
FIG. 38 is a plot of $MgSO_4$ performance data for the DAE+BTAC formulation made without catalyst, F89-35 (upper panel), and with catalyst, F89-63 (lower panel). Feed conditions: 2000 mg/L MgSO4, 20° C., 200 psig.

In embodiments, the selective cation rejection membrane (SCRM) is based on the DAE+BTAC formulation (see FIG. 38). This membrane demonstrated the greatest water permeation values ever observed in our work (as high as 0.28 L/min/membrane=3.2 gfd/psig, or approaching 90% recovery at 200 psi) with moderate cation rejection near 80% for $Mg^{2+}$ and 0% $SO_4^{2-}$ rejection.

The difference in salt rejection between conducting the polymerization with and without bromine as a catalyst indicates that DAE reacts more completely with bromine as a catalyst. When DAE is not fully reacted there are enough residual amine groups (likely in the cationic form in FIG. 13 reaction (2)) that can provide the cationic rejection selectivity observed. When the amine and BTAC are fully reacted the charge exclusion effects are eliminated and salt rejection ceases.

For example, membranes F89-34 through 37 in Table 2 show that membranes composed of DAE reacted with BTAC (without bromine catalyst) exhibit almost exclusive selectivity toward cation ($Mg^{2+}$) rejection. Magnesium rejection was 76-79% while sulfate rejection was only 0-10% and permeate flows were measured between 124 and 278 mL/min per membrane. When the same membrane formulation was made using bromine catalyst the result was a membrane with essentially zero salt rejection and somewhat higher permeate flow. The results shown in FIG. 38 compare performance between membranes F89-35 (no $Br_2$) and F89-63 ($Br_2$ included).

A membrane material dominated by cationic charge is expected to have selectivity for cation rejection. These results indicate that there is a significant number of unreacted amine groups that can carry the positive charge character (as the ammonium salt) while there is an insignificant number of anionically charged carboxylate residues left unreacted from BTAC. When bromine is added as a polymerization catalyst the number of unreacted amine groups in the membrane are greatly reduced resulting in loss of salt rejection.

Example 9

DAE/DPG+TAC/BTAC

Figure 39:
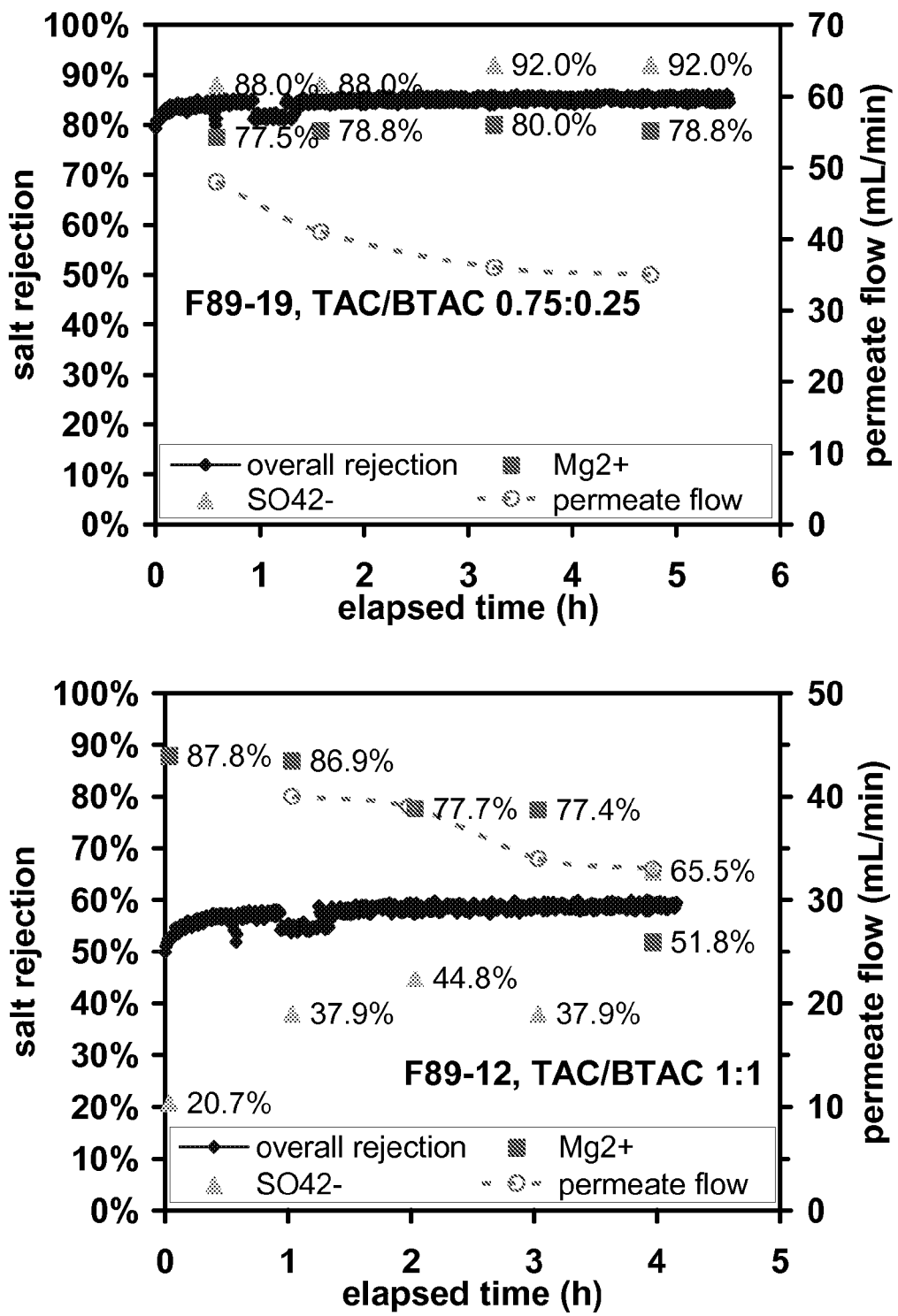
FIG. 39 is a plot of $MgSO_4$ performance data for the DAE/DPG+TAC/BTAC formulations for 0.75:0.25 TAC/BTAC, F89-19 (upper panel), and 1:1 TAC/BTAC, F89-12 (lower panel). Feed conditions: 2000 mg/L $MgSO_4$, 20° C., and 200 psig.

Membranes made with the DAE/DPG (1:1)+TAC/BTAC (0.75:0.25) could achieve moderately good $MgSO_4$ rejection. The use of catalytic bromine had a beneficial effect, but the biggest influence on salt rejection was the relative and absolute concentrations of BTAC. Too much BTAC reduced salt rejections (see Example 9 hereinabove). Performance of membranes F89-19 and F89-12 are compared in FIG. 39 showing the effect of BTAC concentration relative to TAC.

Permeate flow rates are very similar, but too much BTAC has a negative effect on charge density or distribution in the membrane. To avoid reducing salt rejection, lower concentrations of BTAC may be used as a crosslinking additive (to increase membrane stability).

Example 10

DAE/DPG Membranes with Nanoparticles

Membranes comprising DAE/DPG+TAC formulation as a catalyst host were impregnated with ionic metal salts and the membranes thermally reduced around 140° C. under 5% hydrogen atmosphere to metal particles (Ni, Pd, Pt, Au) less than 10 nm in diameter. Suitable metal forms are shown in Table 7. Such Nanoparticle Impregnated Membranes (NIMs) were examined with diffuse reflectance optical spectroscopy, energy dispersive X-ray elemental analysis, and X-ray diffraction studies with line broadening analysis. A polyethersulfone substrate (Tg≈230-285° C.) rather than polysulfone (Tg≈190° C.) allowed the relatively high temperature thermal treatment.

TABLE 7

| Catalysts Used for Metal Impregnation | |
| --- | --- |
| Metal Form | Purity, Price Per Gram * |
| $NiCl_2 \cdot 6H_2O$ | 99.9%, $0.10 |
| $K_2PdCl_4$ | 99%, $25.60 |
| $K_2PtCl_4$ | 99.9%, $29.00 |
| $HAuCl_4 \cdot 3H_2O$ | 99.9%, $28.00 |

* Strem Chemicals Price List

The DAE/DPG+TAC formulation yielded a membrane that was thermally and chemically stable to the process conditions required to impregnate the polyamide pores with metal nanoparticles.

One such membrane containing reduced platinum particles (light grey in color) was tested for the purposes of this program. Slightly better salt rejections were obtained (99.9% $SO_4^{2-}$ and 98% $Mg^{2+}$ rejection) than the membrane without particles at and above 500 psig. The water permeability was greatly reduced at 200 psig (only ~2 mL/min per membrane in contrast to >30 mL/min per membrane) presumably due to the presence of the platinum particles plugging the pores. At such low permeate flows the salt permeation must decrease as much as the water permeation to maintain the same salt rejections that are obtained at high permeate flows. A comparison of permeability constants was used to quantitatively evaluate the results.

In semipermeable membranes water permeability is pressure-dependent and salt permeability is nearly pressure-independent (at least up to the point where driving pressure overcomes membrane selectivity) according to the solution-diffusion model used to describe transport in dialysis, RO, gas permeation, and pervaporation membranes. In the solution-diffusion model water flux $J_i$ can be approximated by the expression in (5), $$J_i = A(\Delta p - \Delta \pi) \qquad (2)$$

Where $\Delta p$ is the pressure drop across the membrane and $\Delta \pi$ is the osmotic pressure of the feed solution (approximately 24.8 psi for a 2000 ppm NaCl solution). The constant A is the water permeability constant and is equal to the term $D_i K_i L\text{-}c_{io} v_i (IRT)$. ($D_i$ is the diffusion coefficient of component I, $K_i^L$ is the liquid phase sorption coefficient, $c_{io}$ is the feed concentration, $v_i$ is molar volume of component i, l is the membrane thickness, RT is the gas constant times temperature.)

Salt flux can be similarly approximated with (6), $$J_j = B(c_{jo} - c_{jl}) \qquad (3)$$

where $c_{jo}$ is the feed concentration and $c_{jl}$ is permeate concentration of component j. The constant B is the salt permeability constant and is equal to the term $D_j K_j L/l$. It is useful to evaluate both the water flux and salt flux through a membrane using the relationships in (5) and (6) above for relative comparison of membrane performance for RO applications. Ideally, pressure dependence is removed from the A and B permeability constants and ideal RO membrane behavior will give the same permeability constant at different pressures. Deviation from this ideal behavior can indicate a problem, such as pinholes, cracking, or non-selective pores (permeation mechanisms such as Knudsen diffusion, molecular sieving and Donnan charge exclusion effects) in the membrane. Permeability constants determined from experimental data for selected membranes are listed in Table 8. (Note: to convert water permeability from $L/h/m^2/psig$ to gfd/psig divide A by 0.448). A nanofiltration membrane with anionic or cationic character is expected to exhibit Donnan charge exclusion effects and Knudsen diffusion mechanisms as they are less selective (more porous) than RO membranes.

The membrane containing platinum particles showed very low sulfate permeation, B=0.0006 mg/min/m$^2$/ppm at 600 psig, which was the lowest observed for the disclosed membranes. For NaCl rejection the platinum particles gave a small increase overall, B=0.302 mg/min/m$^2$/ppm at 400 psig, however the sodium rejection was about 80%. The water permeability was low, A=0.060 L/h/m$^2$/psig, but this is still significantly greater than commercial seawater RO membranes, A≈0.0090 L/h/m$^2$/psig (based on DOW-Filmtec and GE-Osmonics product specifications).

These results indicate that imbedding nanoparticles with a dipolar or charged surface (such as zinc oxide) may be used to increase salt rejection for seawater desalination applications while maintaining superior water permeation.

These results indicate that imbedding nanoparticles with a dipolar or charged surface (such as zinc oxide) may be used to increase salt rejection for seawater desalination applications while maintaining superior water permeation.

The next lowest sulfate permeation observed for the disclosed membranes is the DAE/DPT-based membrane with B=0.0008 mg/min/m$^2$/ppm at 50 psig feed pressure. This membrane also had the greatest water permeability of A=1.32 L/h/m$^2$/psig (at 50 psig). Commercial NF membranes have water permeabilities of only A≈0.10-0.20 L/h/m$^2$/psig (at 70-100 psig, based on DOW-Filmtec and GE-Osmonics product specifications).

For direct experimental comparison, the GE-Osmonics brackish water polyamide and cellulose acetate RO membranes were analyzed and included in Table 8. The water permeability, A, of the herein disclosed membranes is generally 4-8 times greater than the GE-Osmonics membranes. The $SO_4^{2-}$ permeability, B, is about the same as commercial membranes.

water permeability (0.0351 gfd/psig) was still greater than the permeability for commercial seawater RO membranes (~0.020 gfd/psig).

Figure 41:
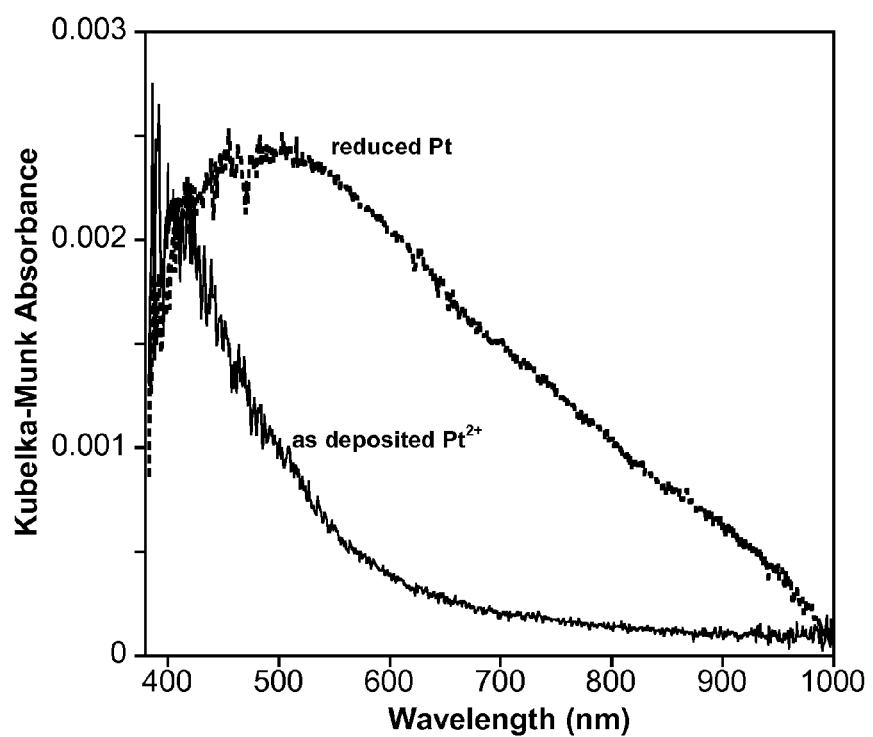
FIG. 41 is an example of the DAE/DPG+TAC formulation on PES substrate solution-impregnated with $Pt^{2+}$ and thermally reduced under hydrogen (photos) and corresponding diffuse reflectance optical spectra comparing $Pt^{2+}$-impregnated and reduced Pt membranes.

This preparation is based on results showing that these membranes have a finite ion exchange capacity for cations (and potentially anions) resulting in metal cations ($Ni^{2+}$, $Pd^{2+}$, $Pt^{2+}$, $Au^{3+}$) being selectively captured in the polyamide membrane pores, but not in the charge-neutral substrate or in bulk on the surface (determined by elemental analysis and depth profiling with EDX). These metals were readily reduced under $H_2$ or calcined in air at modest temperatures (below 160° C.) without degrading the membranes. An example of this is shown in FIG. 41 showing photos and diffuse reflectance optical spectra of a Pt-impregnated membrane before and after thermal reduction.

Example 11

Amine Deposition Conditions

Figure 42:
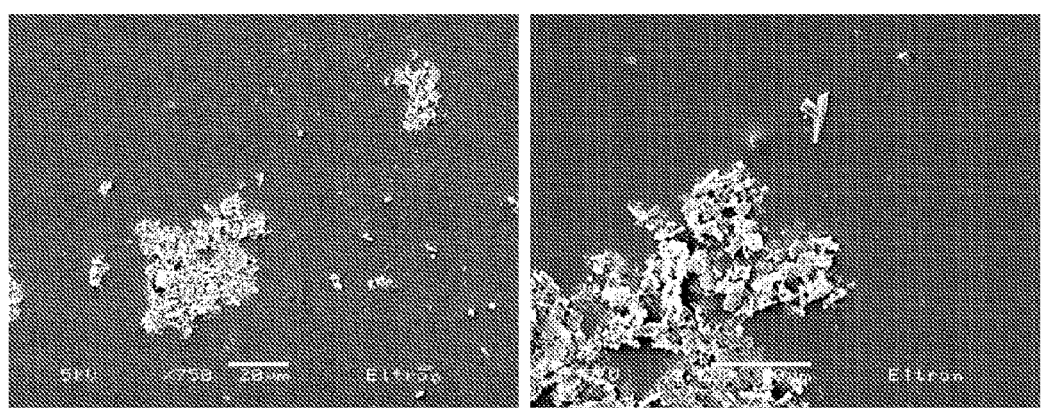
FIG. 42 shows surface SEM images of a DAE-coated PS substrate. The DAE is deposited onto 30 k MWCO polysulfone substrate, 20 μm bar (left image, 750×) and 10 μm bar (right image, 2500×).

FIG. 42 shows surface SEM images of a DAE-coated PS substrate. The DAE is deposited onto 30 k MWCO polysulfone substrate, 20 μm bar (left image, 750×) and 10 μm bar (right image, 2500×). The amine-coated substrate is generally smooth like the bare substrates with some crystallite formation.

Experiments were conducted to determine the composition of amines deposited onto PS substrates prior to polymer formation. Two primary amine systems studied, DAE/piperazine and DAE/DPG/piperazine, were deposited and washed off with alcohol. The alcohol was removed and the amine residue was dissolved in a deuterated NMR solvent for NMR analysis. The outcome was only DAE deposited from the

TABLE 8

Permeability Constants Determined for Select Membranes

| Membrane Amine Comp. | Feed Pressure, psig | Anolyte | Feed Conc. (mg/L) | % Anolyte Rejection | Permeate Flux (mL/min/memb.) | Salt Flux** (mg/min/m$^2$) | Water Flux** (L/h/m$^2$) | A** (L/h/m$^2$/psig) | B** (mg/min/m$^2$/ppm) |
|---|---|---|---|---|---|---|---|---|---|
| F90-55 | 200 | $(SO_4)^{2-}$ | 1250 | 98.0 | 2.2 | 3.5 | 8.52 | 0.0462 | 0.0029 |
| DAE/DPG w/Pt | 600 | $(SO_4)^{2-}$ | 1250 | 99.9 | 9.0 | 0.7 | 34.84 | 0.0596 | 0.0006 |
|  | 400 | NaCl | 1980 | 64.5 | 8.5 | 385.5 | 32.90 | 0.0876 | 0.3018 |
| F89-45 DAE | 200 | $(SO_4)^{2-}$ | 1250 | 98.0 | 42.0 | 67.7 | 162.58 | 0.8811 | 0.0553 |
| F89-39 DPG | 200 | $(SO_4)^{2-}$ | 1300 | 97.8 | 34.0 | 62.7 | 131.61 | 0.7157 | 0.0493 |
| F89-7 DAE/DPG | 200 | $(SO_4)^{2-}$ | 1350 | 97.0 | 31.0 | 81.0 | 120.00 | 0.6547 | 0.0619 |
| F89-28 DAE/DPT | 200 | $(SO_4)^{2-}$ | 1200 | 99.9 | 45.0 | 3.5 | 174.19 | 0.9409 | 0.0029 |
|  | 50 | $(SO_4)^{2-}$ | 1200 | 99.9 | 12.0 | 0.9 | 46.45 | 1.3220 | 0.0008 |
| F89-25 DAE/DPT | 200 | NaCl | 1980 | 64.0 | 40.0 | 1839.5 | 154.84 | 0.8824 | 1.4516 |
| GE Osmonics | 200 | NaCl | 2080 | 99.2 | 7.8 | 8.3 | 30.00 | 0.1722 | 0.0040 |
| brackish water | 400 | NaCl | 2080 | 99.8 | 18.5 | 5.0 | 71.61 | 0.1914 | 0.0024 |
| Polyamide RO | 600 | NaCl | 2080 | 99.9 | 30.5 | 4.1 | 118.06 | 0.2056 | 0.0020 |
|  | 800 | NaCl | 2080 | 99.9 | 39.5 | 5.3 | 152.90 | 0.1975 | 0.0026 |
| Cellulose Acetate | 400 | NaCl | 2000 | 95.0 | 9.3 | 60.0 | 36.00 | 0.0959 | 0.0316 |

Figure 40:
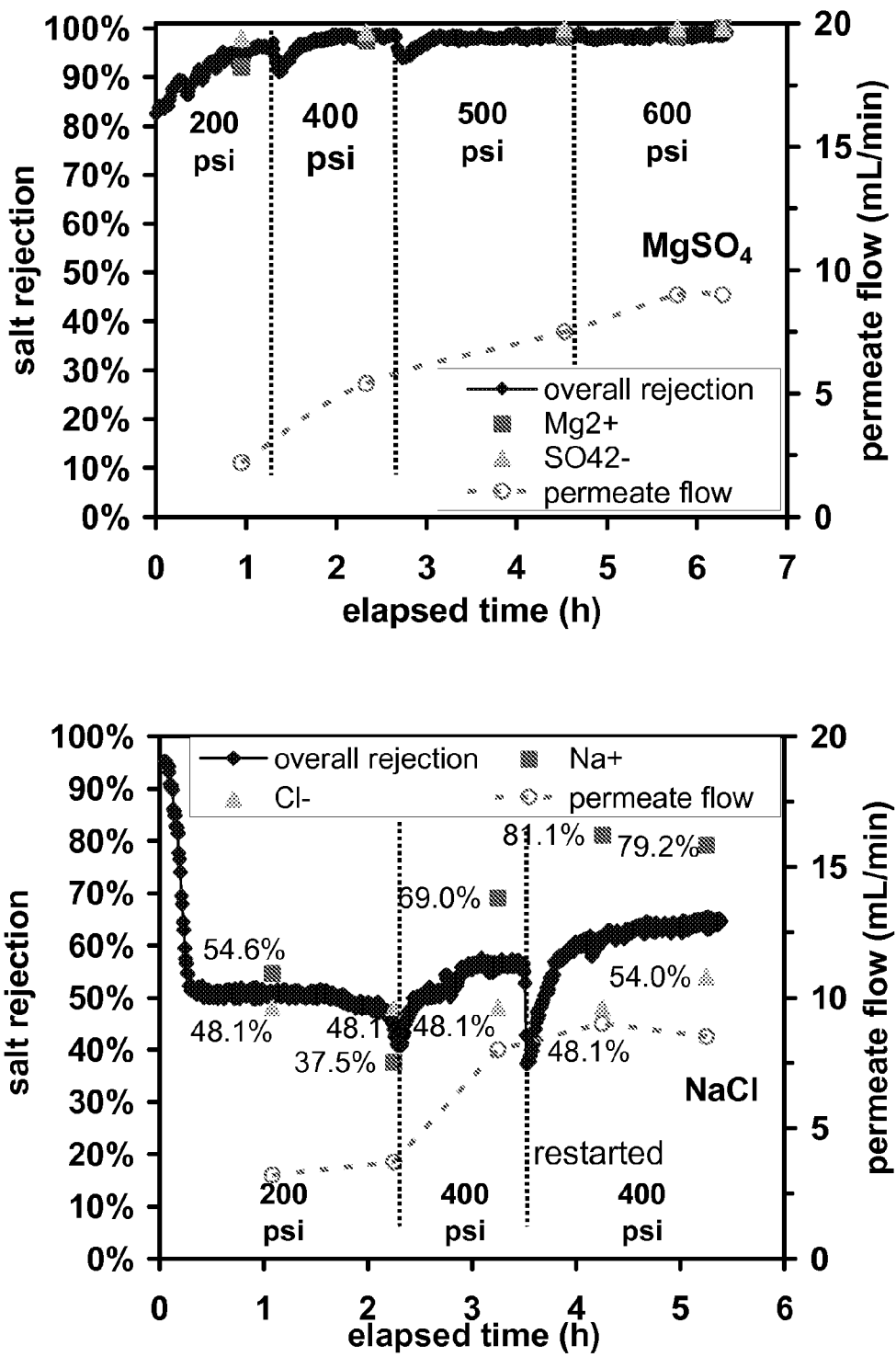
FIG. 40 is a plot of performance data for the DAE/DPG+TAC formulation impregnated with platinum nanoparticles, 282-F90-55 for MgSO4 rejection (upper panel), and NaCl rejection (lower panel). Feed conditions: 2000 mg/L MgSO4 or NaCl, 20° C., 200 to 600 psig.

**Calculated values, 0.0155 m$^2$/membrane Units conversion: A × 0.589 = gfd/psig FIG. 40 shows performance results of the DAE/DPG+TAC formulation impregnated with platinum nanoparticles for $MgSO_4$ rejection (upper panel) and NaCl rejection (lower panel). The experiment showed stable salt rejections at higher pressures without loss of platinum from the membrane (no change in membrane appearance or performance). The permeate flows were greatly reduced, a likely result of plugging the pores. However, the salt permeability was the lowest yet seen for the disclosed membranes (see Table 2 above) and the DAE/piperazine deposition solution and a 1:1 molar ratio of DAE/DPG deposited from the DAE/DPG/piperazine solution (DAE:DPG ratio of nearly 1:1 in solution). Piperazine did not deposit in either case.

The use of water mixed in with methanol was examined to determine if there are any beneficial effects to amine coating or polymer growth. Numerous patented polyamide membrane deposition processes include the use of non-reactive tertiary amines (i.e., triethyl amine, triethanol amine, tetrabutyl ammonium chloride, etc.) to promote higher water content of the reactive diamine coating (to promote better interfacial polymerization) and to act as acid scavengers for more complete polymerization. Attempts were made in this program to use a single one or a combination of the above mentioned non-reactive amines in 0.1% relative concentration with 10% water in the methanol amine solution. It was determined that water is detrimental to the overall polymer formation. It should also be noted that the DAE is insoluble in water, compared to the industry's polyamide standard amine, meta-phenylenediamine.

Example 12

Acid Chloride Solvent Ratio/Surface Morphology

Figure 43:
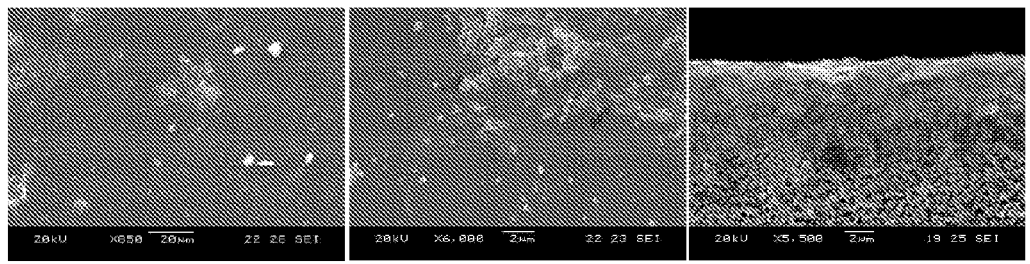
FIG. 43 shows SEM surface and cross sectional images of DAE/DPG/piperazine membranes deposited with increasing hexane content for the acid chloride solution, all other parameters equal.
Figure 43:
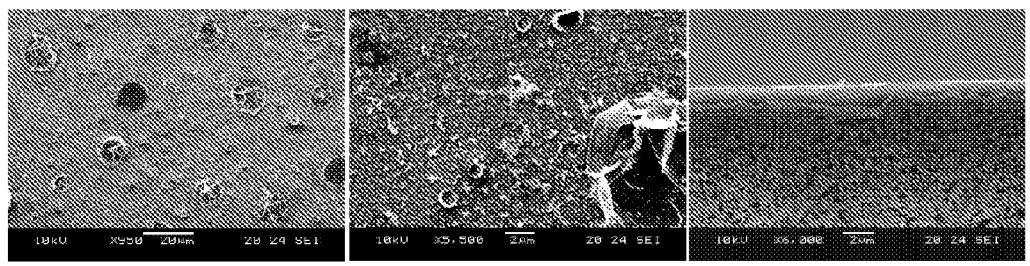
Figure 43:
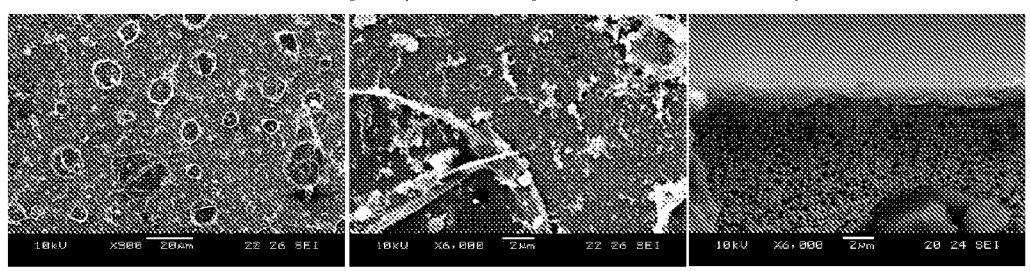
Figure 43:
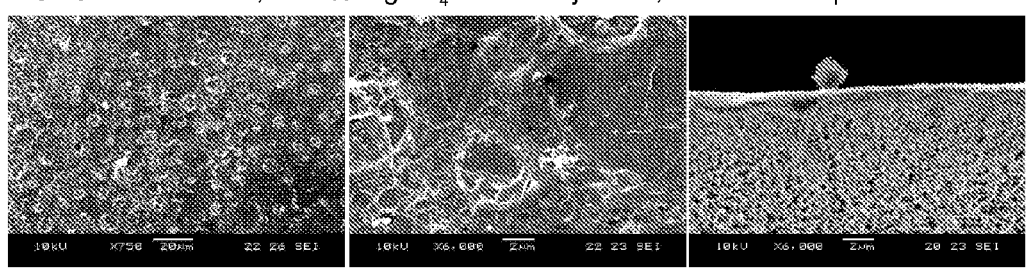
Figure 43:
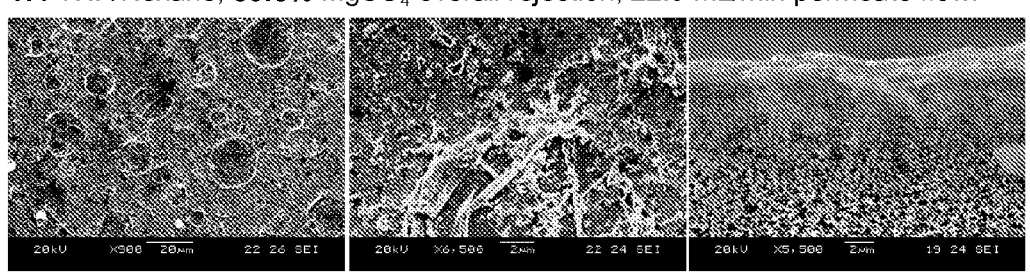

Acid chloride solvent ratio controls the polymerization reaction rate and precipitation rate of the polymer's growing macromolecular domains or nodules that coalesce to form the continuous membrane. The salt rejection and permeate flow rate are reliable indicators of the outcome, and membrane surface morphology and film thickness reflect systematic differences in the solvent ratios. An example is given in FIG. 43 comparing the solvent ratio-dependent surface morphology, membrane thickness, and filter performance for the particular membranes shown. All other deposition parameters are equal. The smooth morphology obtained with a 1:3 THF/hexane ratio gives way to increasing surface roughness as the hexane content increases. The 'burst bubble' features are thought to be the byproduct HCl gas being trapped under a skin layer of polymer that forms instantaneously when the acid chloride solution first contacts the amine-coated substrate. For the polymer to form, the amines react with the acid chloride as they dissolve into solution at the substrate surface. Dissolution of the amines will be slower with higher hexane (counter solvent) content thus generating the HCl byproduct slower than the polymer membrane formation rate resulting in trapped gas bubbles. At very slow reaction rates (1:5.25 THF/hexane), the generation of HCl byproduct is slow enough to not completely ruin the salt rejection performance. At higher reaction rates, the bulk of the HCl gas can escape the reaction before the membrane coalesces into a dense film.

Figure 44:
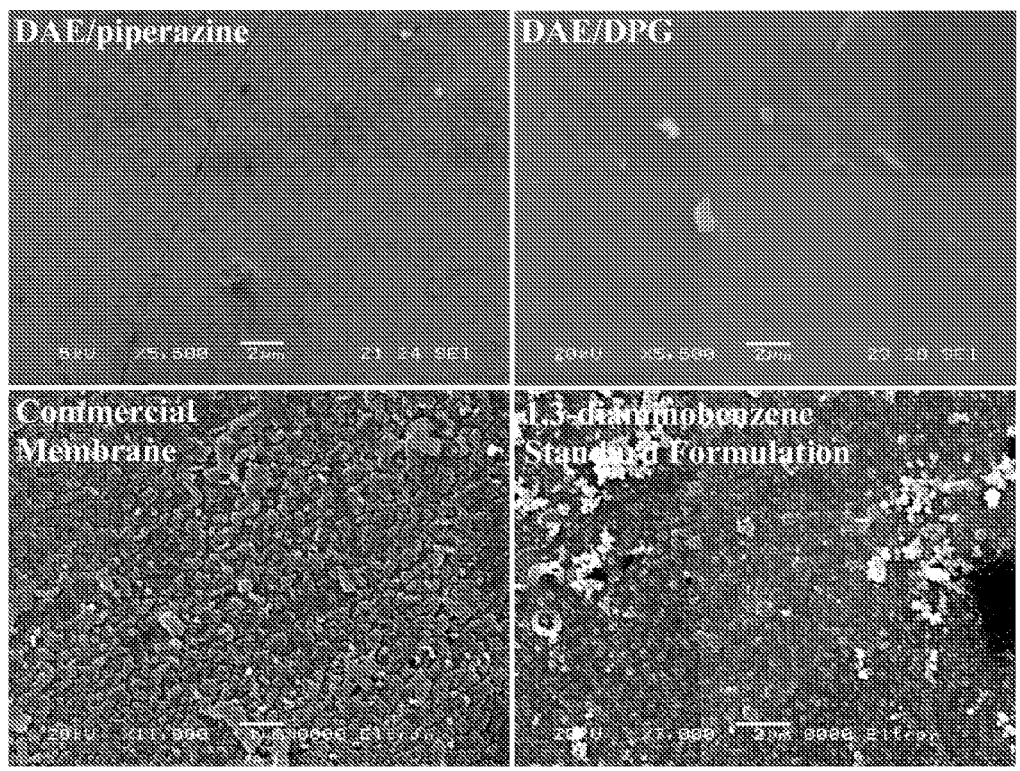
FIG. 44 is a picture of surface images of the disclosed membrane formulations (upper) and the industry standard formulations (lower).
Figure 45:
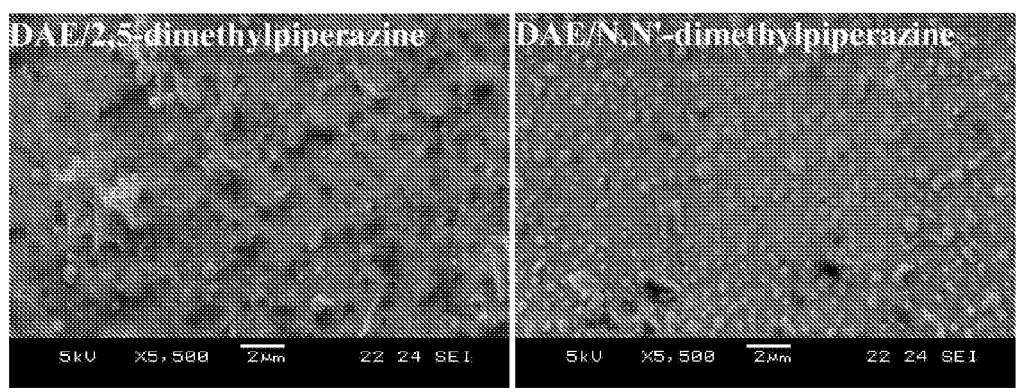
FIG. 45 shows surface images of the disclosed DAE/amine formulation made with 2,5-dimethylpiperazine and N,N'-dimethylpiperazine used in place of piperazine.

The surface morphology of the disclosed membranes is influenced by the polymer constituents and the type of acid-scavenging base used. Surface morphology is also influenced by the membrane deposition parameters. The disclosed membranes based on the TAC+DAE or DAE/DPG formulations are generally very smooth relative to the industry standard polyamide membranes based on TAC+1,3-diaminobenzene. These differences are illustrated in the SEM surface images of membrane in FIG. 44. The disclosed formulations are nearly featureless at 5500× magnification (2 µm bar scale) while the industry standard membrane formulations (either purchased or made in house) are "nodular" in appearance. The choice of acid scavenging amine base also has a distinct influence on surface morphology. Two examples are shown in FIG. 45 where 2,5-dimethylpiperazine and N,N'-dimethylpiperazine were used in place of piperazine for the TAC+DAE formulation. These both have "nodular" features on the surface in varying amounts. This could be interpreted as differences in reaction rates of the growing polymer. This interpretation is supported by the dependence of surface morphology on acid chloride deposition/reaction solvent strength as discussed above.

Example 13

Amount of Unreacted Amine Groups or Excess Carboxylic Acid Groups

Figure 46:
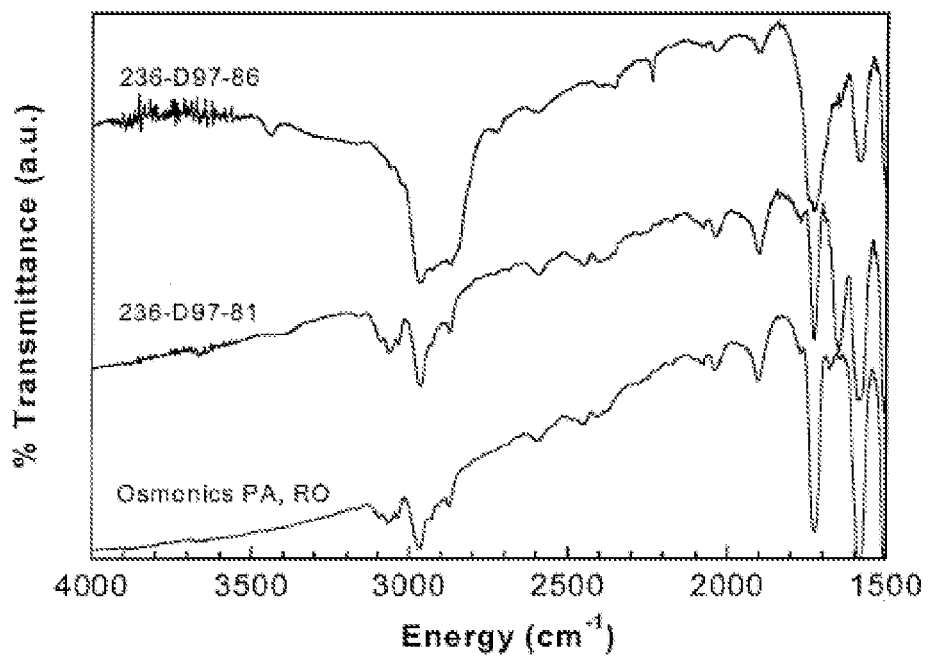
FIG. 46 is IR spectra of two of the disclosed polyamide membranes based on 0.9 DAE/0.1 piperazine+TAC and one Osmonics polyamide membrane based on m-phenylenediamine+TAC, each deposited on polysulfone.

The amount of unreacted amine groups or excess carboxylic acid groups has been monitored by IR analysis. IR samples of membranes were prepared by peeling the fiber backing off the polysulfone substrate and placing the substrate or substrate/polyamide composite membrane in a FTIR spectrometer in the standard transmittance configuration. Three examples of IR spectra of polyamide membranes on polysulfone substrates are shown in FIG. 46. One spectrum is of the Osmonics brackish water polyamide RO membrane while the other two are of the disclosed polyamide membranes. The spectral region of interest is between 1600 and 3500 cm$^{-1}$. Unreacted amine groups or secondary amides (as part of the polymer) show a relatively broad peak for N—H near 3400-3450 cm$^{-1}$ in these films. (See FIG. 23 for comparison with starting amine.) A strong peak for the carbonyl group, C=O, of a secondary aromatic polyamide linkage is expected around 1700-1720 cm$^{-1}$. A primary amide carbonyl peak is expected near 1650 cm$^{-1}$. A strong peak for the carbonyl of an aromatic ester (Ar—(C=O)—OR, where R=methyl, ethyl, etc.) is expected near 1730-1760 cm$^{-1}$. A strong peak for the carbonyl of an aromatic carboxylic acid (such as benzoic acid) is expected near 1650-1680 cm$^{-1}$.

In the IR spectrum of the Osmonics membrane (bottom trace) there is one major band for the amide linkage centered around 1715 cm$^{-1}$ and weaker bands at ~4760 and 1680 cm$^{-1}$ that are likely due to an ester (formed by reaction of an alcohol with an unpolymerized acid chloride group on TAC) and carboxylic acid (formed by water reacting with an unpolymerized acid chloride group on TAC), respectively. The 1760 cm$^{-1}$ could also be an overtone/combination band between a low frequency amide mode and the amide carbonyl peak. The aromatic and aliphatic C—H regions, described with FIG. 46, are dominated by the substrate. No amine/amide N—H peak is observed and very little carboxylic acid is detected indicating this is a well-crosslinked polymer.

The IR spectrum of herein disclosed polyamide membrane 236-D97-86 (top trace) shows a weak N—H peak indicating a small number of unpolymerized amine groups. The carbonyl region is dominated by a very strong amide band centered around 1720 cm$^{-1}$ with only a weak shoulder near 1650 cm$^{-1}$ for carboxylic acid. This spectrum shows a significant increase the intensity of the aliphatic C—H bands between 2950-2990 cm$^{-1}$, reflecting the aliphatic C—H groups of the DAE component of the polymer backbone for this relatively thick polyamide film. These results are desirable for good quality polyamide films.

The IR spectrum of inventive polyamide membrane 236-D97-81 (middle trace) shows a very weak N—H peak indicating a small number of unpolymerized amine groups. There is a strong carbonyl peak for the polyamide linkage at 1715 cm$^{-1}$, but there is also a strong peak for carboxylic acid at 1650 cm$^{-1}$. These results indicate there was either an excess in acid chloride or an incomplete crosslinking/polymerization between amines and acid chlorides.

Example 14

Tests for Presence of Piperazine in Membranes

Examination of amine mixtures and "pre-polymer" states were conducted by analysis of amines deposited onto substrates by the normal deposition procedure. The surface-deposited amines were partially analyzed in the solid state by standard infrared (IR) spectroscopy to observe the charged state of the amine functional groups. (IR analysis of membranes was also used to observe residual carboxylate or amine groups in the polymer, see Example 13 hereinabove). More information about composition of the deposited layer was obtained by washing the deposited amines off of the substrate with a solvent (prior to reaction with TAC), recovering the deposited amines in a deuterated solvent (possibly the same as the wash solvent), and analyzing by proton nuclear magnetic resonance ($H^1$-NMR) spectroscopy.

Figure 47:
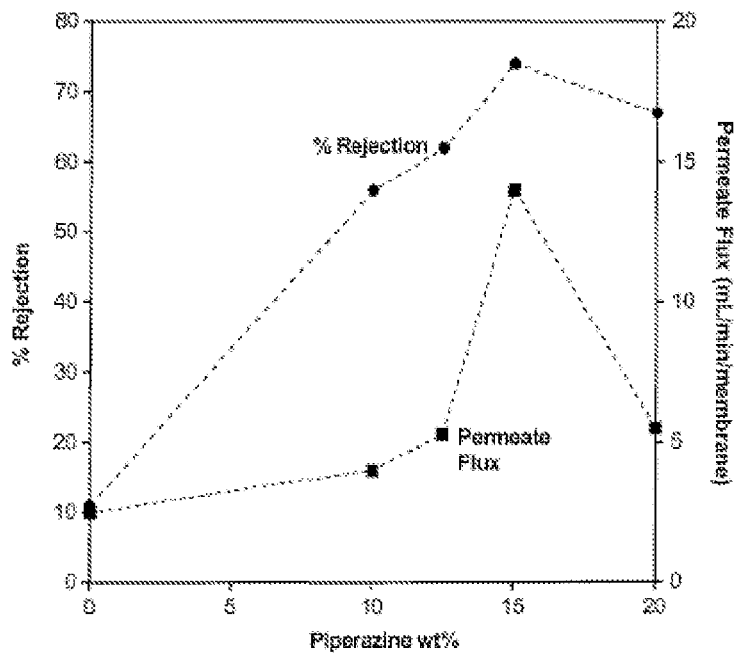
FIG. 47 is a plot of percent rejection and permeate flux as a function of piperazine concentration showing the effect of piperazine concentration on ER-HR1 membrane performance. Conditions: 2000 ppm NaCl, 200 psi, 25° C.

A series of experiments varied the concentration of piperazine relative to DAE in the DAE/piperazine deposition solution between 0 and 20 wt %. The performance of membranes made by varying the DAE/piperazine ratio between 0 and 20 wt % piperazine is summarized in FIG. 47 for experiments 236-E18-5, 14, 12, 8, and 9, respectively. In each of these experiments the only synthesis parameter varied was the DAE/piperazine ratio. The result, for this series of experiments and conditions, is that the optimal piperazine concentration is near 15% in the amine deposition solution. A similar result was found for the DAE/DPG/piperazine formulation. This dependence was also observed to be independent of solvent system used for polymer deposition.

A second set of experiments was to deposit the amines onto a substrate by the normal procedure with piperazine. The deposited amines were then washed off of the substrate with methanol (prior to reaction with TAC), dried and analyzed by $H^1$-NMR in $CDCl_3$. In all cases there was no evidence for the presence of piperazine in the deposited amines (DAE or DAE/DPG). The combination of piperazine with DAE in solution ($CDCl_3$ or $CD_3OD$) had no effect in NMR spectra, they appear as two independent molecules. There was evidence, however, from NMR spectra and empirical observations (i.e., dependence on process parameters) that the protonated state of the deposited DAE was altered by the presence of piperazine. The NMR resonance peak expected for the amine proton, N—H, was unobservable (likewise there was no evidence of a $NH_2^+$ ammonium salt) for DAE after it was deposited. This is possibly due to the different basicities (proton donor/acceptor strengths) of DAE and piperazine. These observations imply that the DAE deposited onto a membrane substrate has been put into a reactive pre-polymer state (which is somewhat moisture sensitive). Without this prepolymer state induced by piperazine, the polyamide membrane does not form properly; similar results were found for the DAE/DPG/Piperazine formulation.

Figure 23:
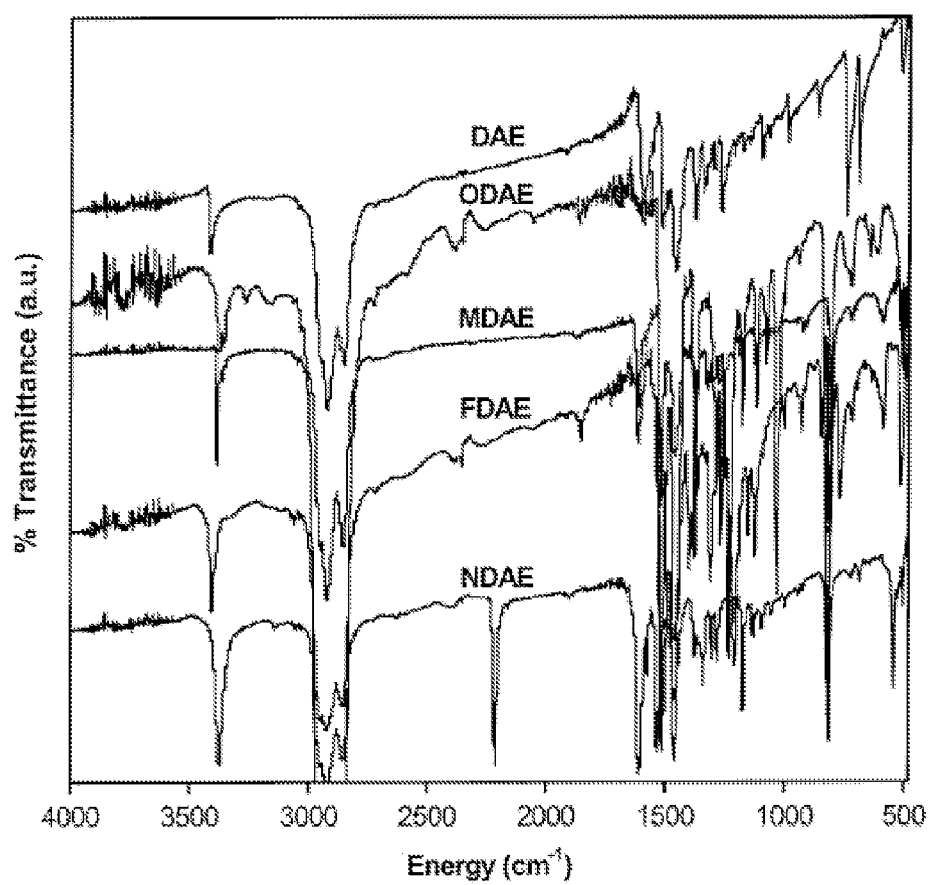
FIG. 23 shows IR spectra of DAE and para-substituted derivatives (mineral oil mulls).
Figure 24:
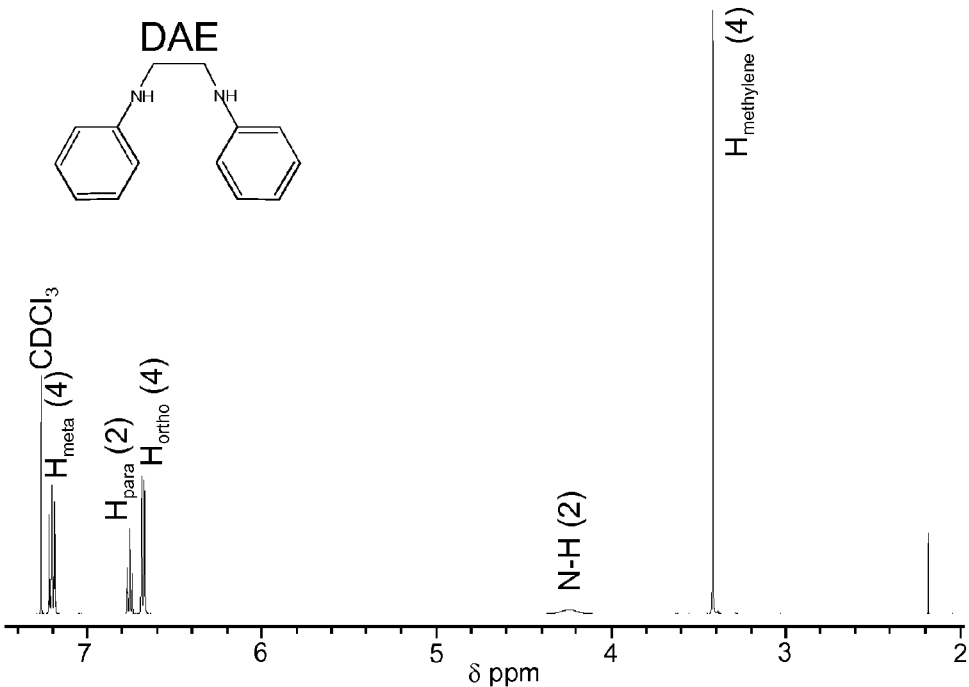
FIG. 24 is an $H^1$-NMR spectrum of DAE (purchased from Aldrich) in $CDCl_3$ (500 MHz).
Figure 25:
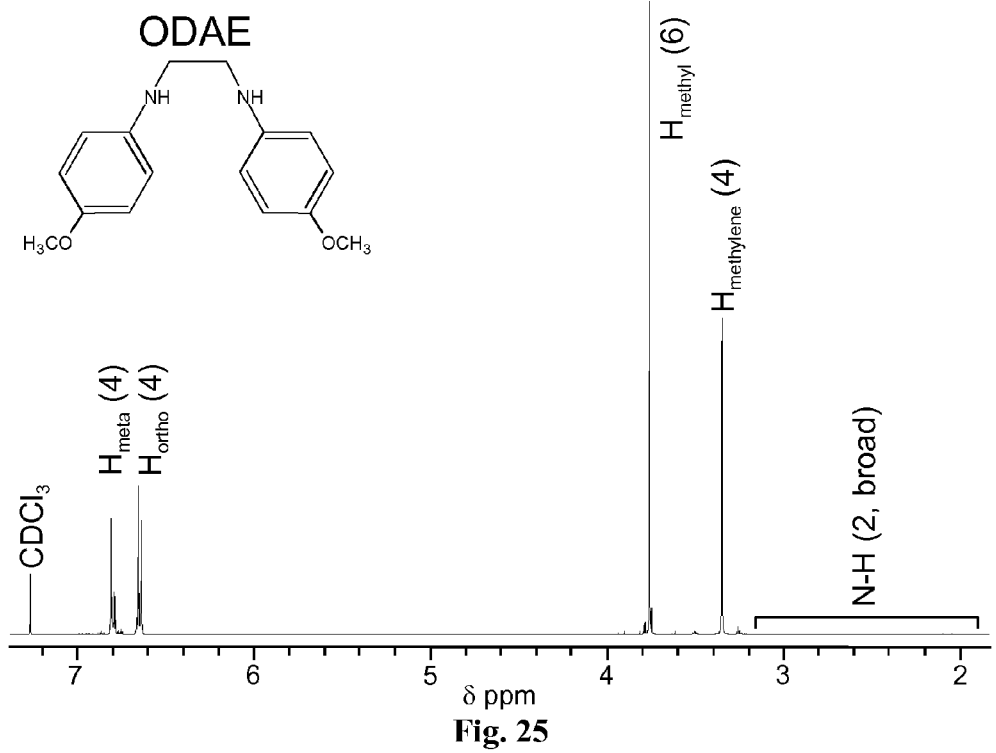
FIG. 25 is an $H^1$-NMR spectrum of ODAE in $CDCl_3$ (400 MHz).
Figure 26:
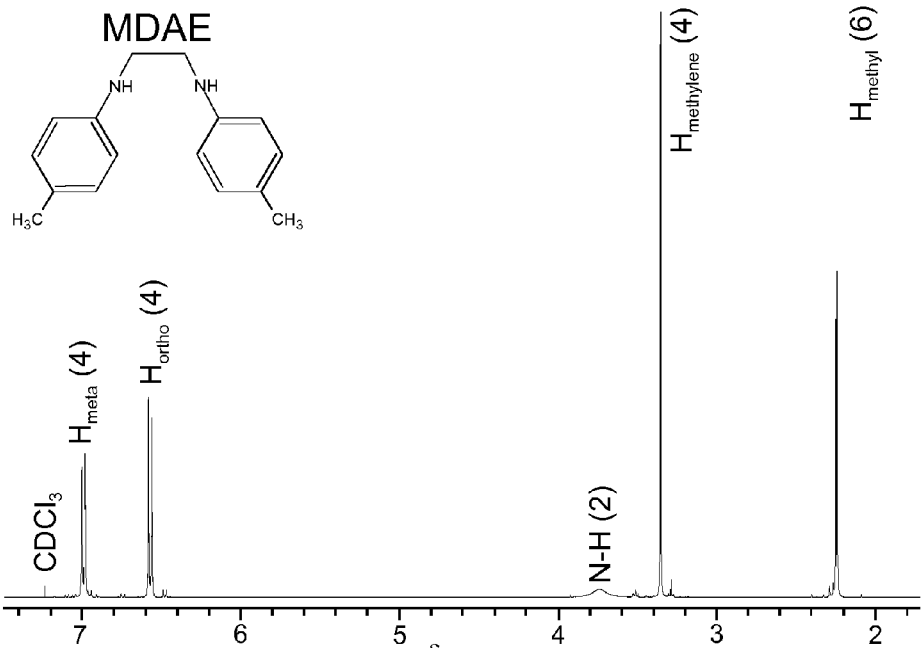
FIG. 26 is an $H^1$-NMR spectrum of MDAE in $CDCl_3$ (400 MHz).
Figure 27:
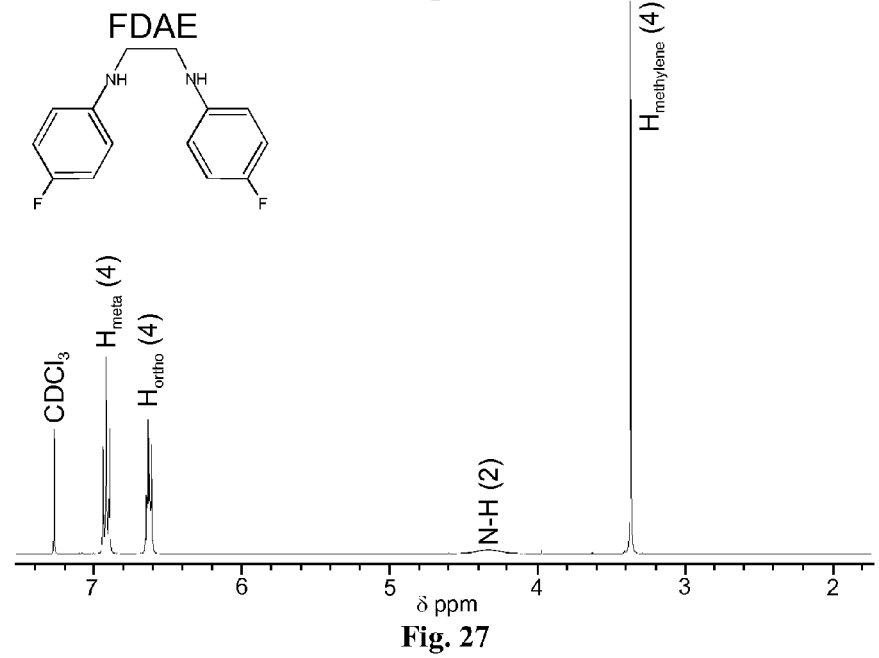
FIG. 27 is an $H^1$-NMR spectrum of FDAE in $CDCl_3$ (400 MHz).
Figure 28:
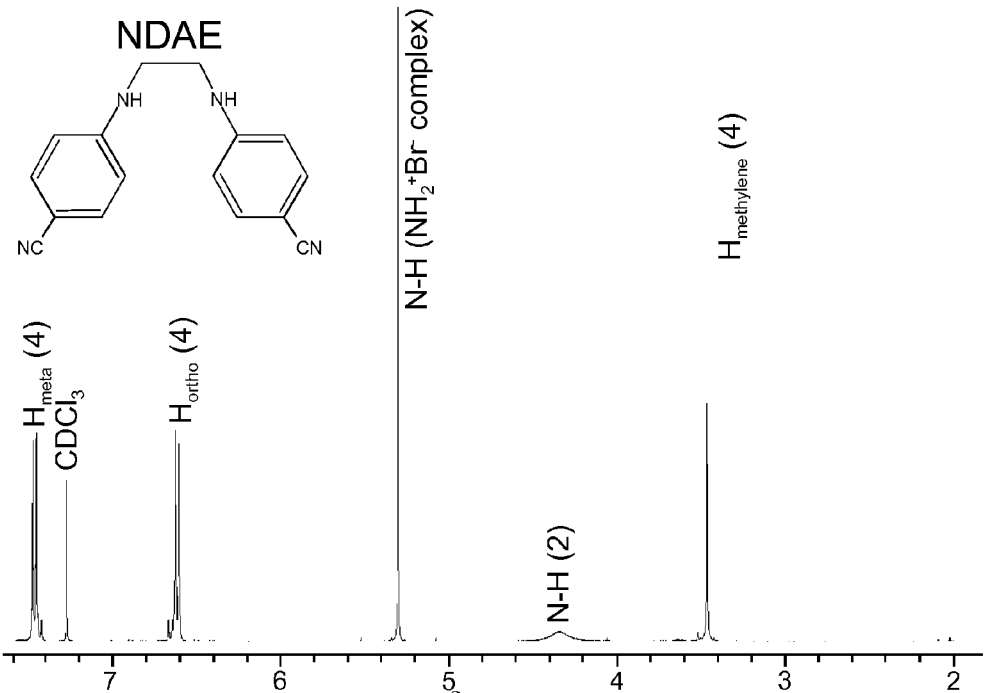
FIG. 28 is an $H^1$-NMR spectrum of NDAE in $CDCl_3$ (400 MHz).
Figure 48:
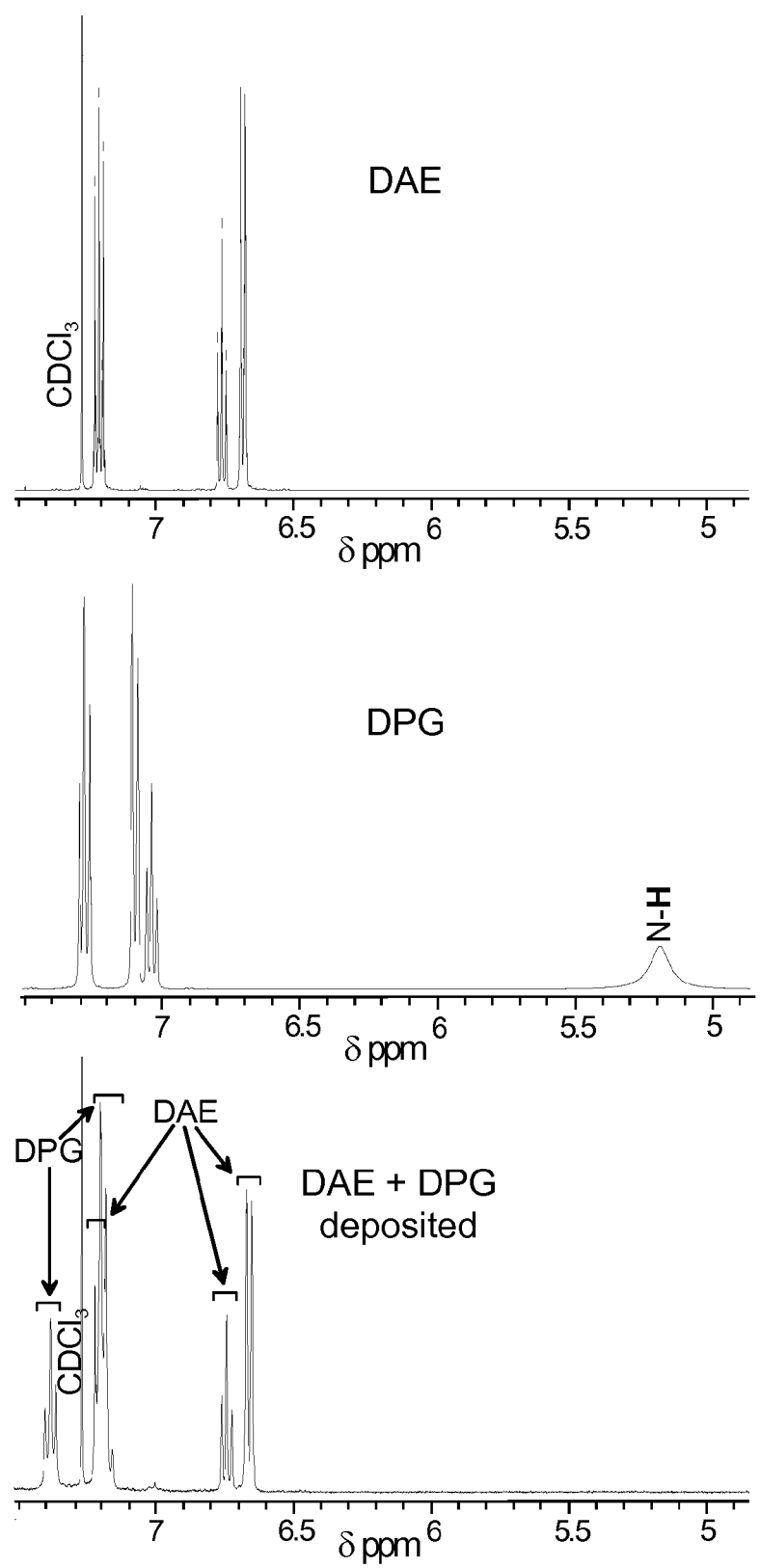
FIG. 48 is a plot of $H^1$-NMR spectra of DAE, DPG, and DAE/DPG (1:1) deposited onto a PS substrate and redissolved for analysis, ($CDCl_3$, 400 MHz).

A small set of NMR analysis experiments was also conducted on the DAE/DPG deposition process. These studies showed that there was a complex formation between the DAE and DPG when deposited onto a substrate surface. An example of this is shown in FIG. 48 showing DAE regions of the NMR spectra for DAE, DPG, and DAE/DPG deposited from a methanol solution (1:1 by weight, 20 min deposition time) onto a 30 k PS substrate. The deposited amine coating was washed off with methanol, dried, and redissolved in $CDCl_3$, for NMR analysis. (The full NMR spectrum for DAE is shown in FIG. 23 above). The N—H peak for DPG is no longer observable in the complex spectrum while the aromatic ring proton resonances are shifted strongly down-field. This is consistent with the DPG acting as a proton acceptor and forming a positively charged amine salt complex. The N—H peak of the DAE (not displayed) narrowed in line width and is shifted up-field by about 0.36 ppm. The aromatic ring proton resonances are not significantly changed. Additionally, the DAE/DPG ratio deposited favors a 1:1 molar ratio when the amount of DPG is in excess of DAE by 5-10%. This is another pre-polymer state that is important to membrane performance. From these observations it is believed that there are acid-base (proton donor-acceptor) interactions between the different amines.

A series of pH-dependent membrane deposition experiments was conducted to determine pH effects on filtration performance for the DAE/piperazine based membranes. It was found that in a pH range of 9.8-11.0 the DAE/piperazine membrane performance was essentially unchanged. Outside of this range membrane performance was very poor. Additionally, the use of a strong base, such as potassium hydroxide (KOH) or tetrabutylammonium hydroxide (TBAOH), in place of piperazine produced membranes with poor performance. From these results it was concluded that a strong base in the form of an amine promotes the proper pre-polymer state and provides good membrane performance. The measured solution pHs and literature $pK_a$ values for several relevant amines are compared in Table 9. Piperazine is a very strong base (Bronstead-Lowry definition) relative to DAE and easily deprotonates DAE.

TABLE 9

Comparison of pH (in methanol) at Relevant Deposition Solution Concentrations and pKa Values (in Water) for Selected Amines

| Compound | Concentration | pH (Measured) | $pK_a$ (literature value) |
| --- | --- | --- | --- |
| 1,2-dianilinoethane | 0.0400 mol/L | 8.8-10.6 (readings drift) | — |
| piperazine | 0.0174 mol/L | 10.1 | 9.78, 5.33 |
| 2,5-dimethylpiperazine | 0.0166 mol/L | 10.2 | — |
| N,N'-dimethylpiperazine | 0.0166 mol/L | 9.0 | 8.54 |
| piperidine | 0.0176 mol/L | 10.9 | 11.12 |
| 1,3-diphenylguanidine | 0.0473 mol/L | 11.1 | — |
| N-ethylaniline | Structurally similar to ½ the DAE molecule | | 5.11 |

$pK_a$ values from Lange's Handbook of Chemistry, $13^{th}$ Edition; J. A. Dean Ed., McGraw-Hill, NY, 1985; Table 5-8.

A series of experiments was performed to examine potential replacements for piperazine. FIG. 1 shows the structures of the amines examined, including the structurally similar homopiperazine, 2,5-dimethylpiperazine, N,N'-dimethylpiperazine, piperidine, and pyrazine. Homopiperazine provided the closest performance to piperazine. Surprisingly, all other amines surveyed were not effective. This peculiarity cannot be based purely on the acid/base proton donor/acceptor strengths of the amines alone. There may be a structural parameter (size, shape) that is also required.

Several smaller amines may be used as additives to enhance the polymerization reaction (i.e., scavenge the HCl acid byproduct), but are not incorporated into the polymer membrane. These non-reactive amines include pyridine, pyrazine, N,N'-dimethylpiperazine. Other small amines that function in a manner similar to the non-reactive amines also assisted in creating a reactive pre-polymer state of the DAE, XDAE, and DPG for reaction with TAC. These include piperidine, piperazine, homopiperazine, 1,4-dimethylpiperazine and 1,3-di-4-piperidylpropane. These were not incorporated into the membranes.

Example 15

Chlorine Tolerance

Chlorine tolerance of membranes was tested under various feed-water compositions containing nominally 500, 200, or 150 ppm chlorine in the form of sodium hypochlorite (bleach). Membranes were tested using feed solutions containing 2000 ppm NaCl and chlorine, 2000 ppm $MgSO_4$ and chlorine, or feed solutions that were simply chlorine. (The actual chlorine concentration was determined by a standard iodometric titration method modified from Hach, Inc.) Membrane exposure is approximately linear with concentration and time as known in the filter industry and confirmed in experimental work. Loss of salt rejection performance was considered to be >0.5% decrease in overall salt rejection or rejection for a particular ion of interest, such as sulfate.

For chlorination control experiments, commercial brackish water polyamide RO membranes (rated for 1000 ppm-h chlorine tolerance) were tested using two different Sepa CF filtration cells. At 0.42 m/s linear feed velocity, 200 psi and 20° C., loss of salt rejection was seen after 1020-1080 ppm·h (feed solutions for three individual experiments contained NaOCl only, NaCl and NaOCl, or $MgSO_4$ and NaOCl). Two experiments conducted at 600 psi (0.68 m/s linear feed velocity) with a feed solution containing NaCl and NaOCl resulted in loss of salt rejection after 2000 and 2760 ppm·h).

Salt rejection and permeate flux were measured as a function of chlorine exposure under accelerated chlorination conditions. Chlorine tolerance of membranes was tested under accelerated conditions using feed-water compositions that contained nominally 300 mg/L chlorine in the form of sodium hypochlorite (bleach) and 2000 mg/L $MgSO_4$. The industry standard for chlorine tolerance is 1000-2000 ppm-h and this has been confirmed previously using the apparatus in FIG. 8 above.

The most informative results were for membrane formulations of DAE+TAC with bromine catalyst, DPG+TAC, and DAE/DPT (1:1)+TAC with and without bromine catalyst. The high concentration of chlorine spiked into the feed solution for accelerated testing is initially very disruptive to the charge equilibrium of the membrane and causes an initial sharp decrease in overall rejection, which then recovers. Time zero is taken at the time of the chlorine spike and the chlorine concentration is measured periodically during the experiment. Individual measurements for $Mg^{2+}$ and $SO_4^{2-}$ rejections are taken to monitor rejection.

Figure 49:
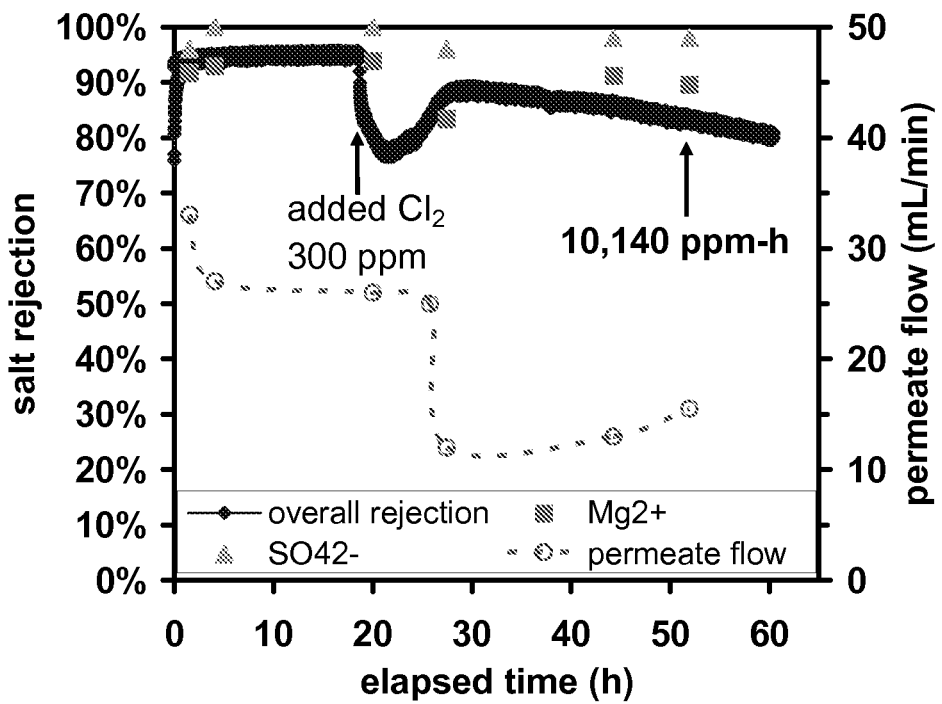
FIG. 49 is a plot of chlorine stability test data for the DAE+TAC formulation made with catalyst, F89-56. Feed conditions: 2000 mg/L $MgSO_4$, 20° C., 200 psig, spiked with 300 mg/L free available chlorine (from bleach).

The DAE+TAC formulation made using bromine as a polymerization catalyst was found to have approximately 10,140 ppm-h of chlorine tolerance for $MgSO_4$ rejection, FIG. 49 (membrane 280-F89-56 in Table 2). The total salt rejection values after adding the chlorine bleach are not corrected for the increase in dissolved solids concentration. After recovery from the chlorine addition the $MgSO_4$ rejection begins to show signs of falling after 10,140 ppm-h where the $Mg^{2+}$ rejection begins to decrease. The sulfate rejection remains steady. The overall rejection (for $Na^+$, $OCl^-$, $Cl_2$) decreases by more than 0.5% after only about 4000 ppm-h (at 32 hours elapsed time). The $MgSO_4$ rejection results are fairly consistent to the DAE+TAC formulation without using bromine as a polymerization catalyst. In some cases the overall rejection persisted for more than 10,000 ppm-h. Overall it appears that using bromine or chlorine as a polymerization catalyst, while improving polymer quality or extent of crosslinking, does not necessarily improve chlorine tolerance of the DAE+TAC formulation.

Figure 50:
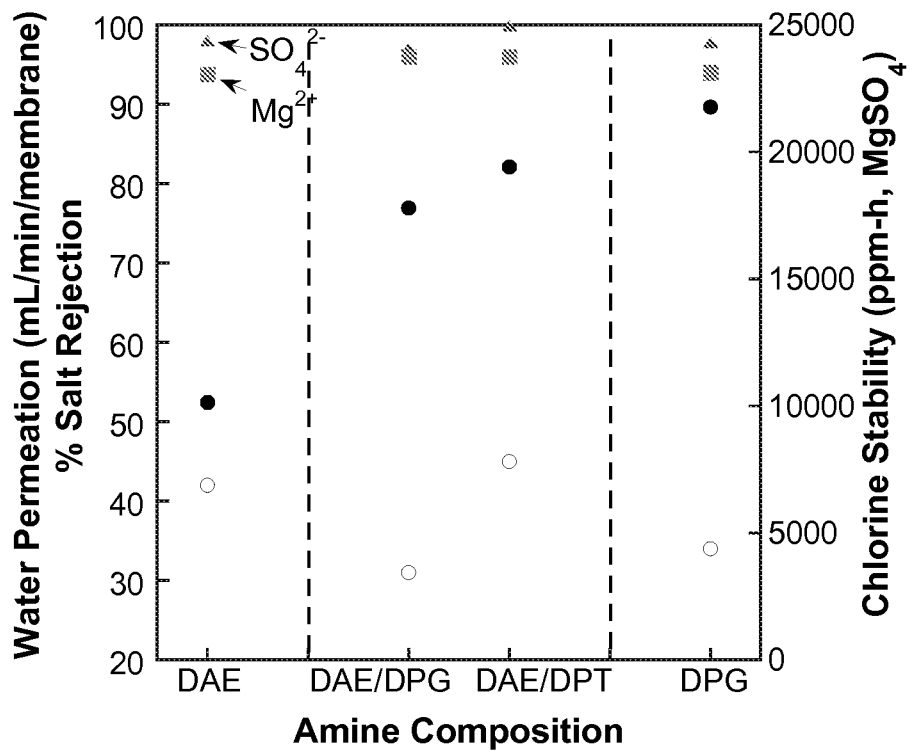
FIG. 50 is a comparison of performance results for four amine compositions tested under the same conditions (200 psig feed, 20° C., 2000 mg/L MgSO4); water permeation (open circles), salt rejection (squares and triangles), chlorine stability (solid circles).

As mentioned in Examples 5C, 6, and 10 hereinabove, DPG was found to be desirable for its compatible structure and basicity with DAE. A blend of DAE and DPG together in a membrane imparts greater chlorine stability than DAE alone. The DPG itself provides significant chlorine stability enhancement. Test results shown in FIG. 50 compare chlorine stability, water permeation, and magnesium sulfate rejection of three different membranes composed of DAE, DAE/DPG (1:1), and DPG as the amine components.

Membranes comprising DPG+TAC gave slightly better salt rejections than membranes comprising DAE/DPG (1:1)+ TAC. The greatest water permeation rates, but lowest salt rejections were obtained with the DAE+TAC formulation. It is thought that the extra C=NH group of the DPG resides in the pore space where it creates resistance to water permeation, perhaps due to hydrogen bonding effects. However, this functional group is formally charge neutral and has little effect on the charge density around the pores, which is necessary for ion rejection (i.e., Donnan exclusion effects).

The effect of chlorine or bromine as a polymerization catalyst is less pronounced for the DAE/DPG membranes, but does provide good performance reproducibility and slightly better salt rejections. With these new findings a crucial comparison can be made on previous chlorine stability testing results. The previously established DAE/DPG (1:1)+TAC provides about 17,800 ppm-h chlorine stability for $MgSO_4$ rejection and ~6000 ppm-h stability for $Na^+$, $OCl^-$ rejection. The previously established FDAE/DPG (1:1)+TAC provides about 19,200 ppm-h chlorine stability for $MgSO_4$ rejection and ~10,400 ppm-h stability for $Na^+$, $OCl^-$ rejection. [FDAE is DAE with fluorine groups substituted onto each aromatic ring in the para position relative to the amine nitrogen.]

Previously, it was not known if these differences in chlorine stability were due to small differences in DAE and FDAE reactivity or the electronic effect of fluorine substitution. [The electron-withdrawing fluorine group reduces the electron density at the nitrogen and is supposed to, in theory, make the nitrogen less reactive to electrophilic attack by chlorine.] These previous membranes were made using chlorine as a polymerization aid/catalyst and is now understood to minimize differences in reactivity and polymer quality. The primary difference in chlorine stability should, therefore, be due to the electron-withdrawing fluorine substitution on FDAE that deactivates the amide polymer linkages to electrophilic chlorine attack making the FDAE/DPG+TAC formulation more stable than the non-fluorinated formulation.

Supporting this interpretation is the high chlorine stability obtained for the DPG+TAC formulation. This formulation was found to have the best chlorine tolerance yet observed for the disclosed membranes (21,770 ppm-h tolerance for $MgSO_4$ rejection). Without wishing to be limited by theory, one plausible explanation for the greatly increased chlorine tolerance of the DPG+TAC formulation over the DAE+TAC formulation is the presence of the electron-withdrawing C=NH group of guanidine that can reduce electron density on the neighboring amino groups. This electronic effect would serve to deactivate the amide polymer linkages to electrophilic chlorine attack. A similar chlorine tolerance enhancement would therefore be expected for membranes incorporating DPT having an electron-withdrawing C=S group. This is in fact the case.

It is an extremely important conclusion that the use of electron-withdrawing groups to deactivate the amide nitrogen linkages will promote greater chlorine tolerance. Substituting the DPG with the para-fluorinated FDPG is expected to further enhance stability. Also, adding fluorine groups to the ethylene bridge of DAE is expected to have a similarly strong effect on stability. In the future, the use of electron-withdrawing groups to deactivate amide linkages will be the primary approach to increasing chlorine stability.

Example 16

Membrane Fouling Experiments

Figure 51:
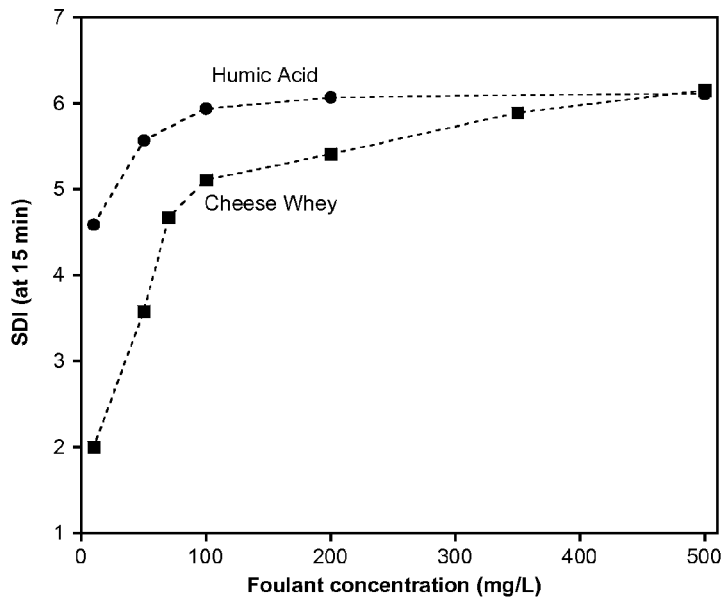
FIG. 51 is a plot of silt density index (SDI) for various concentrations of humic acid (circles) and cheese whey (squares) determined by the ANSI standardized method.

Membrane fouling was evaluated on membranes under simulated dirty feedwater conditions in order to determine the acceptable level of suspended solids or silt density index (SDI) for feed solutions. The SDI is a standardized relative test to quantify how 'fouling' a filter feed solution is without knowing the foulant composition. Typical ratings for commercial RO and NF membranes are a SDI of 3-5 for the feed solution. Control experiments were first conducted to develop the method for standardized ANSI measurement of SDI and to determine solids loading for membrane fouling rate comparison experiments with humic acid and cheese whey. The SDI vs. solids loading (mg/L) for humic acid and cheese whey are shown in FIG. 51. Humic acid was selected to simulate decomposing organic plant matter in natural waters while cheese whey was selected to simulate proteinaceous matter encountered in biological materials, dairy processing, and bioreactor product processing. The SDI is a standardized relative test to quantify how 'fouling' a filter feed solution is without knowing the foulant composition. The ANSI standard procedure is to filter an unknown solution through a 47 mm diameter nitrocellulose filter with 0.45 micron pore size at a constant 30 psi feed pressure. The SDI is calculated from Equation (1) hereinabove.

The total time is 15 minutes (ANSI standard) for SDI calculations. To check for consistency, permeate flow rates were recorded at 5, 10, and 15 minutes. The permeate flow rate at 15 minutes is the final flow rate used in the above equation. Each analysis was repeated at least three times to ensure consistent results. The experimental setup used for SDI measurements was similar to the membrane filtration test apparatus, except the SepaCF membrane cell was replaced by a small disc membrane filter cartridge as just described. The standardized SDI fouling experiments with humic acid and cheese whey are described here. Several concentrations of each foulant were selected to map out the SDI versus solids loading as shown in FIG. 51. The concentrations for humic acid used were 10 mg/L, 50 mg/L, 100 mg/L, 200 mg/L and 500 mg/L. Humic acid was selected to simulate decomposing organic plant matter in natural waters while cheese whey was selected to simulate proteinaceous matter encountered in biological materials, dairy processing, and bioreactor product processing. The concentrations for cheese whey used were 10 mg/L, 50 mg/L, 70 mg/L, 100 mg/L, 200 mg/L, 350 mg/L and 500 mg/L. The pure water flow rate before foulant was added was over 200 mL/min. Once humic acid was added to solution the permeate flow rate dropped rapidly. Because of this initial rapid decrease a lower, arbitrary flow rate was selected to be time zero. For consistency, the initial flow rate (at time zero) selected for all tests was 30 mL/min, about 30 sec after the filter pump was turned on.

Membrane fouling experiments were conducted on the new NF membrane types ER-HR1A and ER-HF2A as well as industry standard brackish water RO and low pressure NF membranes purchased from GE-Osmonics for comparison. Brackish water RO membranes were examined as well, but these provide very different results due to significantly lower permeate flux. It is important to compare membranes with similar permeate flow rates as this has a large impact on concentration polarization and gel layer formation of the foulant on the membrane surface. Feed solutions containing concentrations of foulants within the working SDI range (SDI<6) and at much greater concentration were used to compare fouling rates between membranes. Humic acid solutions were made containing 2000 ppm NaCl and membranes tested at 20° C., 200 psi feed pressure, 6.4 m/s feed flow velocity. No additional salt was added to cheese whey solutions. Membranes were cleaned between experiments with Citronox™ cleanser and water flushing according to the cleanser recommended use and standard membrane cleaning protocols.

Figure 52:
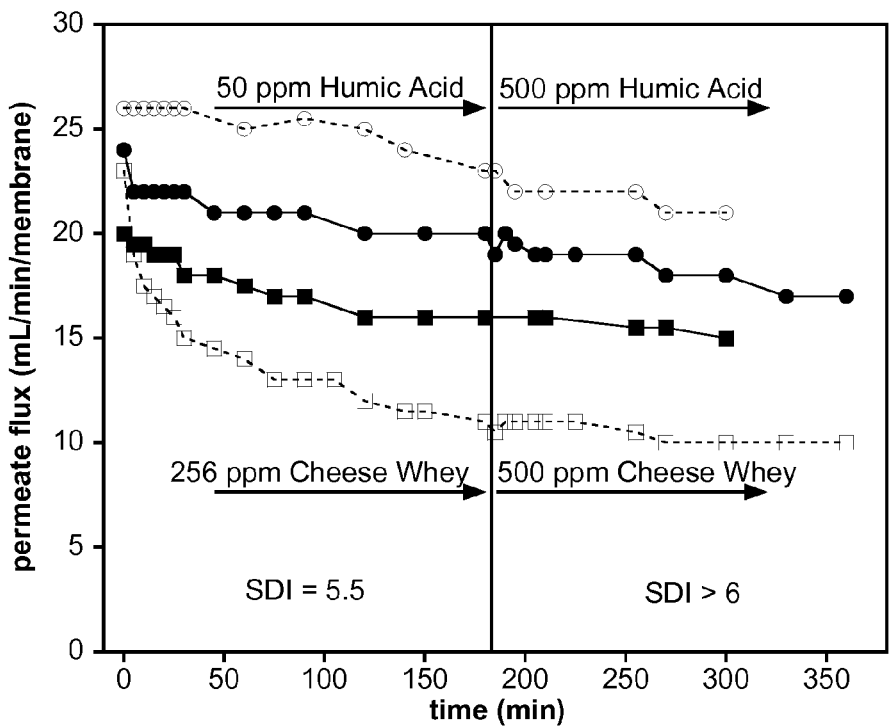
FIG. 52 is a fouling rate comparison for ER-HF2A membrane (236-F6-22, solid symbols) and GE-Osmonics TF-NF membrane (open symbols) for humic acid (circles) and cheese whey (squares).

The key examples of these results are shown in FIG. 52 for the disclosed type ER-HF2A, membrane 236-F6-22 (solid symbols), and GE-Osmonics TF-nanofiltration membrane (open symbols). The fouling resistance (flux stability) of the ER-HF2A membrane was significantly better at a SDI of 5.5 for both humic acid (circles) and cheese whey (squares). The loss of permeate flux was not significantly different between humic acid and cheese whey for the disclosed membrane. Cheese whey caused a significant loss in permeate flux for the GE Osmonics NF membrane. The results indicate superior fouling resistance for the disclosed NF membrane, especially for cheese whey (proteins, casein) over one of the industry standard materials. The disclosed membranes will be safe to use with feed solution SDI of 5 or less.

Example 17

Membrane Failure Testing

Figure 53:
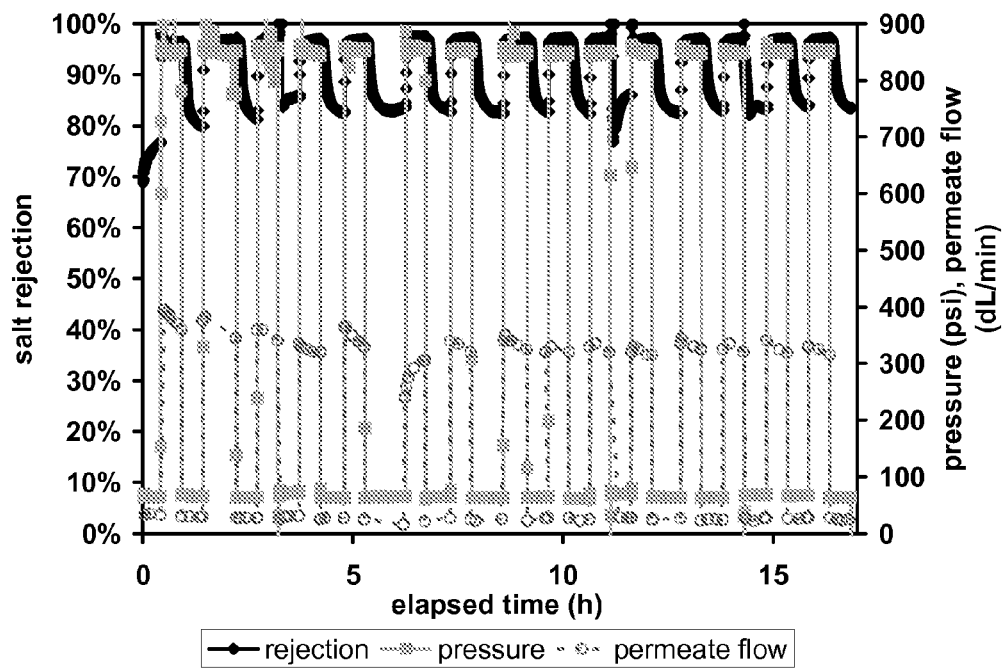
FIG. 53 is a plot of a disclosed polyamide RO membrane (no failure).

Tests were performed to determine a suitable accelerated method for membrane delamination evaluation. In one type of experiment a membrane was cycled between RO filter conditions at high pressure (850 psi), then low pressure (50 psi) and the cycle repeated (FIG. 53). Each pressure change was made about every 20 min. The salt rejection was expected to suddenly decrease and the flux suddenly increase when a delamination/membrane failure occurred. After 15 cycles there was no change in performance for the Osmonics RO membrane tested in FIG. 50. The same experiment was conducted on a disclosed membrane, and no failure was observed. A second method, involved placing a membrane in the filter cell in a back-flow configuration (up side down). Increasing the feed pressure above 150 psi did cause the membrane to fail (FIG. 51), but failure was likely due to rupture of the substrate rather than delamination of the polyamide since the fiber reinforcing backing was on the feed side.

Another method involved running a filter membrane for >3 hours at 200-800 psi under a variety of filter conditions and turning off the filter overnight (16 hours) to determine if the time allowed for membrane compression and decompression was important in these tests. (SEM images on membranes tested at 200-800 psi for several hours show compression of the substrate had occurred.) This testing required considerably more time to carry out and was evaluated during extended testing runs that were started and abruptly shut down numerous times, 6-15 pressure cycles with as much as 150 hours of cumulative run time. No delamination or failure issues were observed for the disclosed ER-HF membranes.

Example 18

Permeability Constants

Membrane performance was also evaluated by comparing permeability constants. Selected membranes were evaluated in this manner and the results are listed in Table 10.

Entries 236-D97-78b through 236-E67-64 evidence the evolution of the TAC+DAE/piperazine membrane for NaCl rejection as the membrane quality and process parameters were improved. For comparison, the GE-Osmonics brackish water polyamide and cellulose acetate RO membranes were analyzed and included here. The water permeability, A, is comparable between the disclosed membrane and the Osmonics RO membranes.

Entries 236-F6-88 and 236-F6-56 illustrate the dependence of permeability constants on feed concentration and observed salt rejection of the TAC+DAE/DPG/piperazine (ER-HFIA) membrane for $SO_4^{2-}$. While the salt flux clearly increases with increasing feed concentration, the observed rejection is higher at the higher concentrations. For membrane 236-F6-88, the normalized water permeability is essentially constant at all salt concentrations while the salt permeability constant reaches a constant value only at the higher feed concentrations. Entry 236-F6-22 shows that the TAC+FDAE/DPG/piperazine (ER-HF2A) membrane has very similar behavior to the non-fluorinated version.

Example 19

Post-Polymerization Treatment

Figure 54:
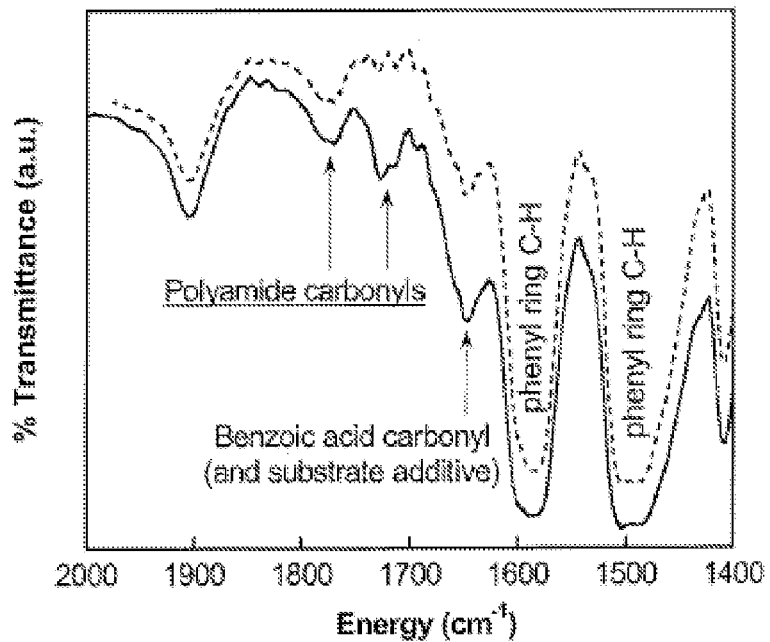
FIG. 54 is IR spectra comparing polyamide films with post-deposition drying (solid line) and without drying (dotted line). Spectral intensities are normalized on the phenyl ring C—H peaks.

As mentioned hereinabove, post-deposition treatment is important to membrane performance. The amount of moisture-free dry time and subsequent alcoholic and/or aqueous washing steps affect membrane performance. A post drying/annealing step was found to be beneficial to completion of the polymer crosslinking reactions. This was shown by control experiments monitored by IR spectroscopy shown in FIG. 54. One membrane was dried/annealed after the acid chloride polymerization and another was not. The membrane that was post-dried/annealed showed an additional polyamide carbonyl peak(s) that was not present in the membrane that was not post-dried. Too much drying, however, becomes detrimental to membrane performance.

Example 20

Thermal and Chemical Stability Tests

Thermal stability of the disclosed membranes was studied to determine stability of the membranes to, for example, hot-water sanitation and high temperature treatment. Thermal stability was examined using the DAE/DPG (1:1)+TAC formulation (with catalyst) deposited onto polyethersulfone substrates. Polyethersulfone substrate can tolerate significantly greater temperatures (Tg≈230-285° C. depending on formulation) in contrast to polysulfone (Tg≈190° C.). The thermal stability of the non-woven fiber backing of the substrate is important at very high temperatures.

Figure 55:
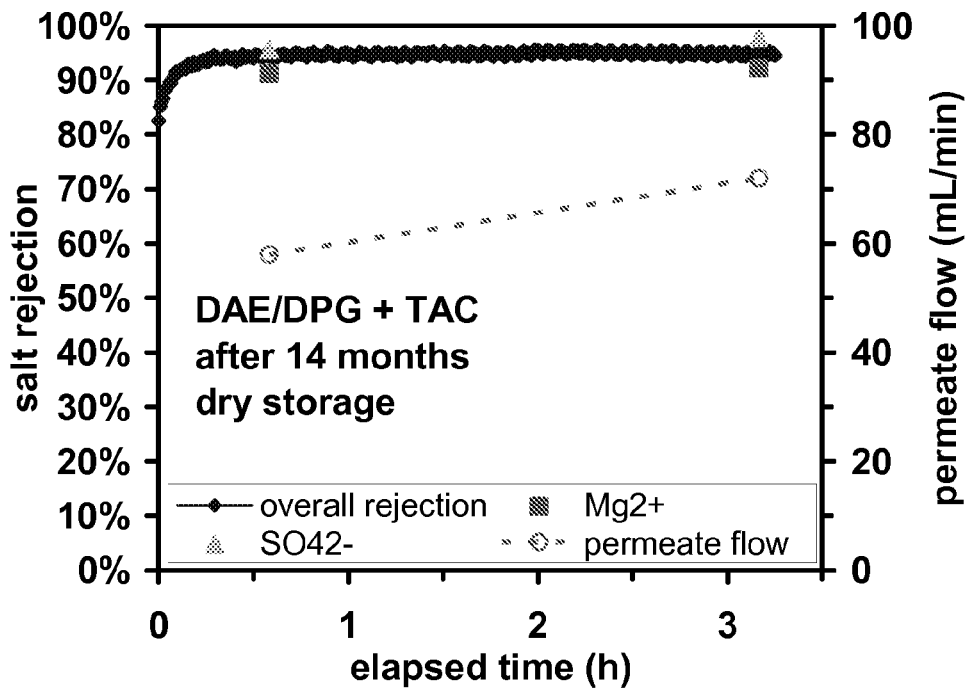
FIG. 55 is a plot of $MgSO_4$ performance data for the DAE/DPG+TAC formulation made 14 months earlier and stored dry, 236-F6-114.

The membrane used for thermal testing was made 14 months earlier (236-F6-144) and stored dry making this a good test for storage stability as well. There was no change in color of this membrane over time, which starkly contrasts with commercial polyamide membranes that turn yellow-brownish in color and discolor a container in 3-4 months. FIG. 55 is a plot of performance data for the DAE/DPG+TAC formulation made 14 months earlier and stored dry. Feed conditions were 2000 mg/L $MgSO_4$, 20° C., 200 psig. As seen in FIG. 55, the $MgSO_4$ rejection and water permeability met or exceeded the performance specifications under standard conditions.

Figure 56:
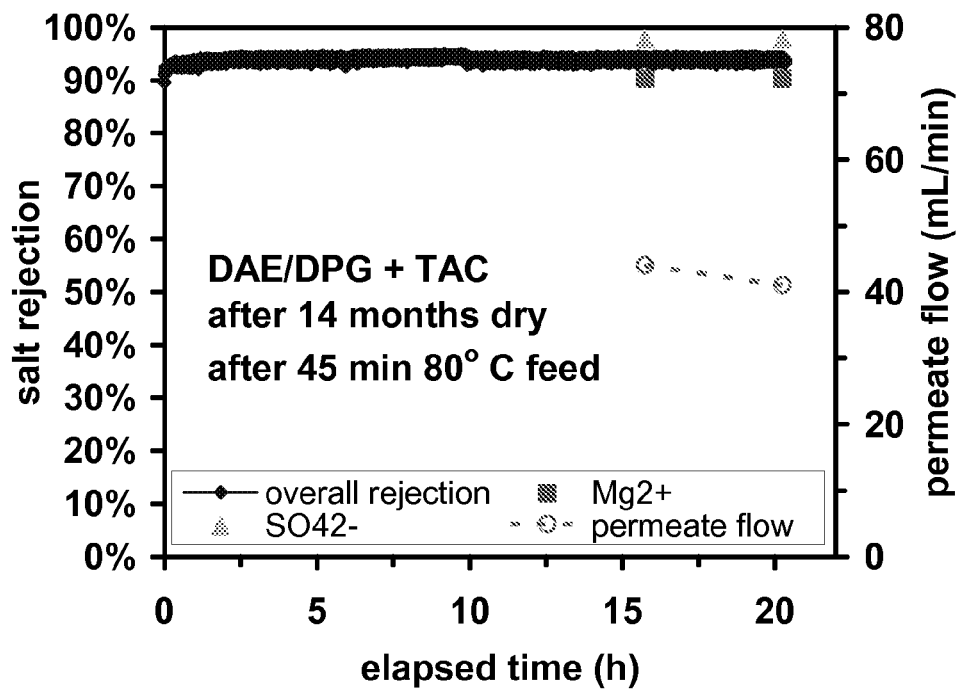
FIG. 56 is a plot of $MgSO_4$ performance data for the DAE/DPG+TAC formulation made 14 months earlier and stored dry, then exposed to 80° C. deionized feed water for 45 minutes, 236-F6-114.

This membrane was then subjected to a filter system flush with deionized water at 80° C. for 45 minutes. The first 15 minutes were at 200 psig feed pressure then the pressure was decreased to 35 psig for the remainder of the time. The feed solution was then circulated under normal conditions showing stable rejection. Performance data for the DAE/DPG+TAC formulation made earlier and stored dry and then exposed to 80° C. deionized feed water for 45 minutes, 236-F6-114, is presented in FIG. 56. Feed conditions were 2000 mg/L $MgSO_4$, 20° C., 200 psig. The $Mg^{2+}$ rejection had decreased slightly and the permeate flow was back down to

TABLE 10

Permeability Constants Determined from Experimental Performance Results

| Membrane | Feed Press. (psi) | Anolyte | Feed Conc. (mg/L) | % Salt Rejection | Permeate Flux (mL/min/memb.) | Salt Flux** (mg/min/m²) | Water Flux** (L/h/m²) | A** (L/h/m²/psi) | B** (mg/min/m²/ppm) |
|---|---|---|---|---|---|---|---|---|---|
| 236-D97-78b | 200 | NaCl | 2000 | 53.4 | 1.8 | 105.2 | 6.77 | 0.0387 | 0.0985 |
| | 600 | NaCl | 2000 | 77.6 | 6.0 | 173.4 | 23.23 | 0.0404 | 0.1117 |
| 236-D97-80 | 200 | NaCl | 2025 | 61.7 | 6.5 | 325.2 | 25.16 | 0.1438 | 0.2603 |
| | 600 | NaCl | 2025 | 79.3 | 14.0 | 378.6 | 54.19 | 0.0943 | 0.2358 |
| 236-D97-106 | 200 | NaCl | 2025 | 45.8 | 2.5 | 177.0 | 9.68 | 0.0553 | 0.1909 |
| | 600 | NaCl | 2025 | 73.7 | 3.5 | 120.3 | 13.55 | 0.0236 | 0.0806 |
| 236-D97-124 | 200 | NaCl | 2000 | 59.0 | 4.3 | 227.5 | 16.65 | 0.0950 | 0.1928 |
| | 600 | NaCl | 2000 | 84.8 | 8.5 | 166.7 | 32.90 | 0.0572 | 0.0983 |
| 236-18-60 | 200 | NaCl | 2120 | 83.0 | 8.5 | 197.6 | 32.90 | 0.1894 | 0.1123 |
| 236-E67-64 | 200 | NaCl | 2075 | 76.3 | 6.7 | 212.6 | 25.94 | 0.1488 | 0.1343 |
| | 600 | NaCl | 2075 | 83.0 | 14.5 | 330.0 | 56.13 | 0.0977 | 0.1916 |
| 236-F6-88 | 200 | $SO_4^{2-}$ | 150 | 87.3 | 28.0 | 34.4 | 108.39 | 0.5470 | 0.2628 |
| | 200 | $SO_4^{2}$ | 1700 | 93.1 | 25.7 | 194.5 | 99.48 | 0.5559 | 0.1229 |
| | 200 | $SO_4^{2}$ | 2950 | 92.4 | 24.3 | 351.5 | 94.06 | 0.5754 | 0.1289 |
| 236-F6-56 | 200 | $SO_4^{2}$ | 2000 | 98.8 | 26.0 | 40.3 | 100.65 | 0.5744 | 0.0204 |
| 236-F6-22 | 200 | $SO_4^{2}$ | 1775 | 98.6 | 26.5 | 42.5 | 102.58 | 0.5762 | 0.0243 |
| GE Osmonics brackish water Polyamide RO | 200 | NaCl | 2080 | 99.2 | 7.8 | 8.3 | 30.00 | 0.1722 | 0.0040 |
| | 400 | NaCl | 2080 | 99.8 | 18.5 | 5.0 | 71.61 | 0.1914 | 0.0024 |
| | 600 | NaCl | 2080 | 99.9 | 30.5 | 4.1 | 118.06 | 0.2056 | 0.0020 |
| | 800 | NaCl | 2080 | 99.9 | 39.5 | 5.3 | 152.90 | 0.1975 | 0.0026 |
| Cellulose Acetate | 400 | NaCl | 2000 | 95.0 | 9.3 | 60.0 | 36.00 | 0.0959 | 0.0316 |

**Calculated values more normal rates. The disclosed membrane is suitable for applications requiring hot-water disinfection.

More supporting evidence of both high chemical and thermal stability was shown for the DAE/DPG (1:1)+TAC formulation (with catalyst) deposited onto polyethersulfone substrates. This membrane type used for the development of catalytic polymer membranes and processes, as discussed in Example 10 hereinabove. One of these membranes was tested to determine the salt rejection and permeation behavior after the harsh treatment conditions used for producing the membranes. (Membranes were impregnated with ionic metal salts over a 3-12 h period and thermally treated up to 140° C. for several hours under dry 5% hydrogen atmosphere or air without visible degradation of the polyamide.)

One such membrane containing reduced platinum particles (light grey-brown in color) was tested for the purposes of this program, membrane 282-F90-55 shown in FIG. 40 above. Observed salt rejection was slightly better than usual (99.9% $SO_4^{2-}$ and 98% $Mg^{2+}$ rejection) above 500 psig. Water permeability was greatly reduced at 200 psig (only ~2 mL/min per membrane in contrast to >30 mL/min per membrane) presumably by the presence of platinum particles plugging the pores. A discussion of permeability constants for this membrane is above in Example 10.

The membrane showed no detectable loss of platinum particles from the membrane as indicated by stable performance and no visible change in membrane appearance after testing, even at 600 psig feed pressure. The fact that this membrane functioned as a semipermeable membrane after going through its fabrication process is unexpected.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent they provide exemplary, procedural or other details supplementary to those set forth herein.

What is claimed is:

1. A polyamide membrane comprising reaction product of (i) an anhydrous solution comprising an anhydrous solvent, at least one polyfunctional secondary amine and a pre-polymer deposition catalyst, wherein said polyfunctional secondary amine comprises at least two aromatic rings, having at least three bridging atoms therebetween; and (ii) an anhydrous, organic solvent solution comprising a polyfunctional aromatic amine-reactive reactant comprising one ring, and wherein said pre-polymer deposition catalyst is a polyfunctional secondary or tertiary amine that possesses structural features having a compatible shape or size to the at least three bridging atoms of said polyfunctional secondary amine.

2. The polyamide membrane of claim 1 wherein (ii) further comprises a polymerization catalyst.

3. The polyamide membrane of claim 2 wherein the polymerization catalyst is selected from the group consisting of elemental chlorine, elemental bromine, elemental iodine, and combinations thereof.

4. The polyamide membrane of claim 1 wherein in said polyfunctional secondary amine the at least three bridging atoms comprise at least two secondary amine groups that are reactive for condensation with an acyl halide or alkyl halide.

5. The polyamide membrane of claim 4 wherein the polyfunctional secondary amine is selected from the group consisting of dianilinomethane; 1,2-dianilinoethane; 1,3-dianilinopropane; N,N'-dibenzylethylenediamine; 1,3-diphenylguanidine; 1,3-diphenylurea; 1,3-diphenyl-2-thiourea.

6. The polyamide membrane of claim 5 wherein the polyfunctional secondary amine comprises, bonded to carbon atoms, functional groups or atoms of greater electronegativity than hydrogen from the group consisting of fluoride, chloride, bromide, iodide, trifluoromethane, cyanide, carbonyl, sulfonyl, nitro, oxygen, and sulfur.

7. The polyamide membrane of claim 1 wherein the anhydrous solution of (i) comprises a plurality of polyfunctional secondary amines.

8. The pre-polymer deposition catalyst of claim 1 selected from the group consisting of piperazine; 1,4-dimethylpiperazine; homopiperazine; pyrazine; 2,3-dimethylpyrazine; and combinations thereof.

9. The polyamide of claim 1 wherein said anhydrous solvent comprises a solvent selected from the group consisting of protic solvents, a-protic solvents, and combinations thereof.

10. The polyamide of claim 9 wherein said protic solvent is selected from the group consisting of linear and branched chain alcohols comprising from one to twelve carbon atoms.

11. The polyamide of claim 9 wherein said a-protic solvent is selected from the group consisting of polar organic solvents comprising from one to twelve carbons and one or more heteroatoms selected from the group consisting of hydrogen, oxygen, nitrogen, sulfur, fluorine, chlorine, and bromine, arranged in linear or branched chains or cyclic arrangements.

12. The polyamide of claim 9 wherein the a-protic solvent is selected from the group consisting of non-polar organic solvents comprising from six to twelve carbons arranged in linear or branched chains or cyclic arrangements.

13. The polyamide membrane of claim 1 wherein said amine-reactive reactant comprises at least one component selected from the group consisting of polyfunctional aromatic acid halides and sulfonyl halides.

14. The polyamide membrane of claim 13 wherein the polyfunctional aromatic acid halide is selected from the group consisting of trimesoyl chloride; 1,2,4,5-benzenetetracarboxylicacid chloride; 1,3-isophthaloyl dichloride; 2,6-pyridinedicarbonyl dichloride; and 1,3-benzenedisulfonyl chloride.

15. The polyamide membrane of claim 1 wherein the polyfunctional aromatic amine-reactive reactant comprises at least three reactive groups.

16. The polyamide membrane of claim 1 wherein the organic solvent solution comprises an a-protic solvent selected from the group consisting of (i) polar organic solvents selected from the group consisting of a-protic solvents comprising from one to twelve carbons and one or more heteroatoms selected from the group consisting of hydrogen, oxygen, nitrogen, sulfur, fluorine, chlorine, and bromine, arranged in linear or branched chains or cyclic arrangements; and (ii) non-polar organic solvents comprising from six to twelve carbons arranged in linear or branched chains or cyclic arrangements.

17. A composite semipermeable membrane comprising: (i) a porous support, and (ii) a polyamide membrane of claim 1 on said porous support.

18. The composite semipermeable membrane of claim 17 wherein the membrane is impregnated with nanoparticles.

19. The composite semipermeable membrane of claim 17 wherein said porous support comprises a polymer from the group consisting of polysulfone, polyethersulfone, polyvinyldifluoride, polytetrafluoroethylene, polyamide, polyimide, and polycarbonate.

20. The composite semipermeable membrane of claim 17 wherein said porous support comprises a ceramic selected from the group consisting of silica, alumina, aluminosilicate, zirconia, titania, and combinations thereof.

21. The composite semipermeable membrane of claim 17 having suitable performance as a nanofiltration membrane; reverse osmosis membrane; a catalytic membrane for filtration, desalination, gas separation, pervaporation, catalysis; and combinations thereof.

22. The composite semipermeable membrane of claim 17 comprising at least one type of nanoparticle selected from the group consisting of heavy metals, oxides of heavy metals and combinations thereof.

23. The composite semipermeable membrane of claim 22 wherein the at least one type of nanoparticle comprises a heavy metal having a density greater than about 4 g/cm3 selected from the group consisting of chromium, manganese, iron, cobalt, nickel, copper, zinc, molybdenum, ruthenium, rhodium, palladium, silver, cadmium, indium, tin, tantalum, tungsten, rhenium, osmium, iridium, platinum, gold, lead, and the lanthanides (lanthanum, cerium, praseodymium, neodymium, samarium, europium, gadolinium, terbium, dysprosium, holmium, erbium, thulium, ytterbium, lutetium).

24. The composite semipermeable membrane of claim 22 wherein said nanoparticles are produced by thermal or chemical treatment of heavy metal precursors diffused or adsorbed into the polyamide membrane.

25. The composite semipermeable membrane of claim 22 wherein the heavy metal precursor is selected from the group consisting of chemical complexes of heavy metal cations soluble in aqueous, alcoholic and organic solutions to be applied in the liquid state; and chemical complexes of heavy metal cations with sufficient vapor pressure to be applied in the vapor state.

26. The composite semipermeable membrane of claim 17 wherein the stability of the membrane to chlorine exposure is greater than about 20,000 ppm-h.

27. The composite semipermeable membrane of claim 17 wherein the stability of the membrane to chlorine exposure is greater than about 80,000 ppm-h.

28. The composite semipermeable membrane of claim 17 wherein the membrane has a water permeability greater than 0.1 gfd/psi.

29. The composite semipermeable membrane of claim 17 wherein the membrane has a water permeability greater than 1 gfd/psi.

* * * * *